United States Patent
Futsuhara et al.

(10) Patent No.: US 6,459,656 B1
(45) Date of Patent: Oct. 1, 2002

(54) INFORMATION GENERATING APPARATUS USING ELASTIC WAVES

(75) Inventors: Koichi Futsuhara; Masayoshi Sakai; Toshihito Shirai; Akira Morisada; Hitoshi Nozawa; Katsuichi Inose, all of Urawa (JP)

(73) Assignee: The Nippon Signal Co., Ltd., Tokyo (JP)

(*) Notice: Subject to any disclaimer, the term of this patent is extended or adjusted under 35 U.S.C. 154(b) by 0 days.

(21) Appl. No.: 09/917,921

(22) Filed: Jul. 31, 2001

Related U.S. Application Data

(62) Division of application No. 09/466,172, filed on Dec. 17, 1999, now Pat. No. 6,292,432, which is a division of application No. 09/051,707, filed as application No. PCT/JP97/02897 on Aug. 20, 1997, now Pat. No. 6,031,790.

(30) Foreign Application Priority Data

| Aug. 20, 1996 | (JP) | 8-218583 |
| Nov. 19, 1996 | (JP) | 8-307897 |
| Nov. 21, 1996 | (JP) | 8-310647 |

(51) Int. Cl.[7] ............... G01V 1/00; B61L 29/28
(52) U.S. Cl. ........... 367/96; 436/167 R; 73/636
(58) Field of Search ............ 367/96; 246/167 R, 246/122 R; 73/636; 340/531

(56) References Cited

U.S. PATENT DOCUMENTS

| 4,429,576 A | 2/1984 | Norris |
| 4,578,665 A * | 3/1986 | Yang ............ 340/48 |
| 4,932,618 A | 6/1990 | Davenport et al. |
| 5,462,244 A * | 10/1995 | Van Der Hoek et al. ............ 246/122 R |
| 5,627,508 A * | 5/1997 | Cooper et al. ............ 73/636 |

FOREIGN PATENT DOCUMENTS

| JP | 60-34600 | 2/1985 |
| JP | 62-35725 | 2/1987 |
| JP | 3-19768 | 2/1991 |
| JP | 6-18491 | 1/1994 |
| JP | 6-251264 | 9/1994 |
| JP | 9-188250 | 7/1997 |
| JP | 8-225147 | 9/1998 |

* cited by examiner

Primary Examiner—Ian J. Lobo
(74) Attorney, Agent, or Firm—Finnegan, Henderson, Farabow, Garrett & Dunner, L.L.P.

(57) ABSTRACT

The present invention relates to an information generating apparatus for transmitting and receiving elastic waves through a rail for a train. The information generating apparatus comprises elastic wave transmitting means for transmitting elastic waves to said rail, elastic wave receiving means for receiving elastic waves transmitted from said elastic wave transmitting means through said rail, and information generating means for generating information that is necessary for controlling/monitoring associated elements of a control system for performing control operations on said train, based on an elastic wave reception signal received by said elastic wave receiving means. The information generating means has detection means for detecting presence/absence of said train in said rail, based on a reception condition of an elastic wave received by said elastic wave receiving means and for generating information representing presence/absence of said train in said rail.

12 Claims, 37 Drawing Sheets

FIG.40
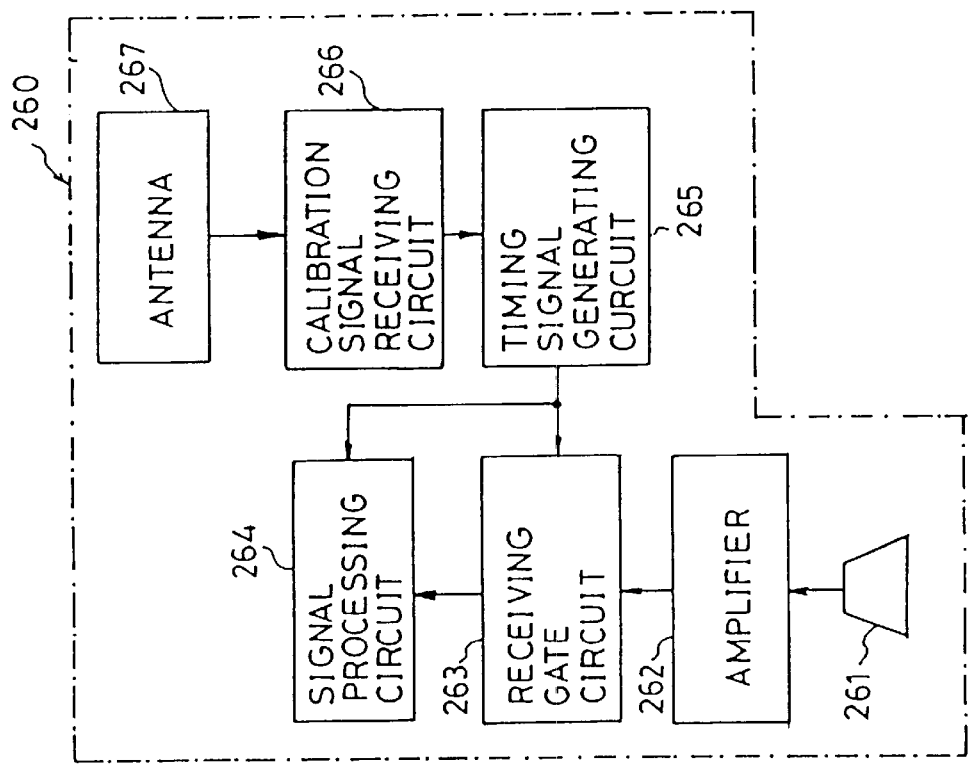
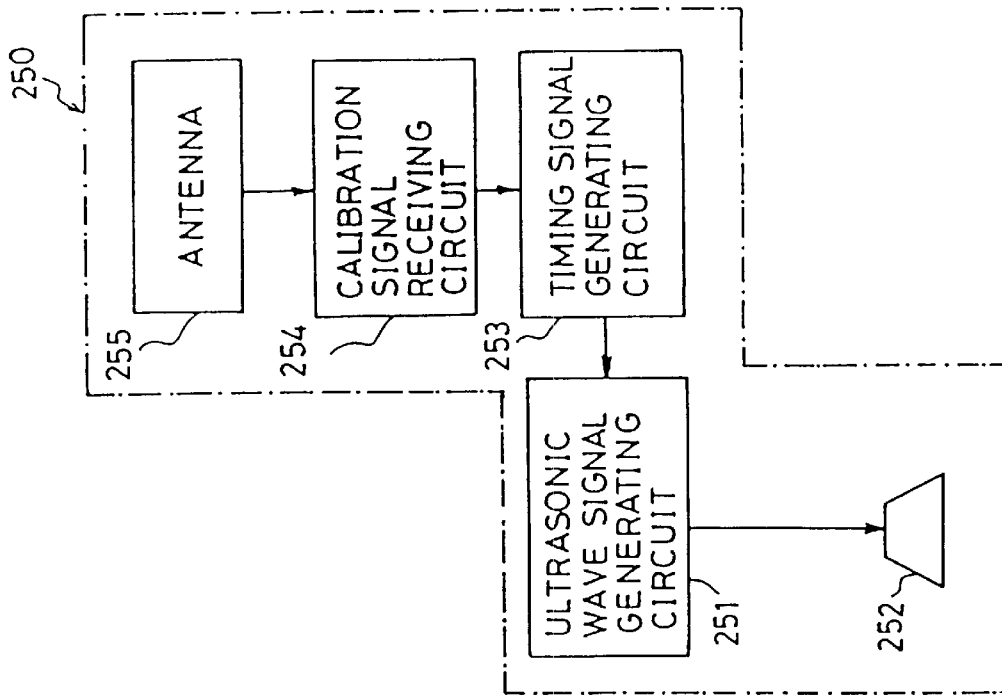

INFORMATION GENERATING APPARATUS USING ELASTIC WAVES

This is a division of application Ser. No. 09/466,172, filed Dec. 17, 1999, now U.S. Pat. No. 6,292,432, which is a divisional application of U.S. application Ser. No. 09/051,707 filed Oct. 1, 1998 filed as application No. PCT/JP97/02897 on Aug. 20, 1997, now U.S. Pat. No. 6,031,790, all of which are incorporated herein by reference.

TECHNICAL FIELD

The present invention relates to an information generating apparatus for transmitting and receiving elastic waves through a propagation medium and for generating information to be used for controlling/monitoring a system.

BACKGROUND ART

For example, a railroad crossing gate control operation performed in a current railway transportation system will be described hereinbelow.

When a train is detected by a train detection device that is provided at an approach detection point which is established at a predetermined place before a railroad crossing, a warning device starts sounding, and after a lapse of a predetermined time period since a sounding start point of time, a gate arm of a railroad crossing gate is caused to descend, as illustrated in FIG. 1. Thereafter, when it is detected that the train having entered the railroad crossing leaves there, the sounding operation of the warning device is stopped and moreover, the gate arm is caused to ascend.

Incidentally, a time period Tx between a moment from when the gate arm starts descending until the train enters the railroad crossing, should be secured as, for example, a time period required for an automobile or the like left in the railroad crossing to get out there, and should be equal to or longer than a predetermined time period (of, for instance, 15 seconds). Additionally, the sounding operation of the warning device, which is performed to inform an automobile or the like traversing the railroad crossing of the fact that the train approaches the railroad crossing, should be commenced a predetermined time (To shown in this figure, which is, for example, 30 seconds) or more before a train enters the railroad crossing.

Hitherto, for the purpose of securing the aforementioned time periods Tx and T0, the timing with which the sounding operation of the warning device is started (namely, the timing with which a crossing inhibition command is issued) is controlled on the assumption that, among trains passing through the railroad crossing, the fastest one passes therethrough.

However, there are various kinds of trains, which run through a same running section, from a high-speed express train to a low-speed freight train. Thus, if the sounding operation is started with the same timing by assuming that, among trains passing through a railroad crossing, the fastest one passes therethrough, in the case that a train of which speed is lower than that of the assumed train, passes through the railroad crossing, it takes time, which is longer than required, until the train reaches the railroad crossing after the sounding operation of the warning device is started, or after the gate arm descends. Consequently, the aforementioned time periods T0 and Tx become extremely long, so that a time period, during which automobiles and passers-by are prohibited from traversing the railroad crossing, becomes longer than required.

To solve the aforesaid problems, there has been employed a railroad crossing gate control operation that is referred to as a constant time control operation of timing-controlling in such a manner that the lengths of the time periods T0 and Tx are constant (see, for instance, Yoshimura and Yoshikosi, "Signal", Koyusha, 1958).

A method for performing a constant time control operation is a delayed control method by which kinds of trains such as an express, a local train and a freight train is detected and then, if a train is of the kind that runs at a low speed, the sounding operation of the warning device and the operation of the gate arm are delayed.

However, in the case of employing such a delayed control method, when a train which usually travels at a high speed, runs by reducing the travelling speed thereof owing to an occurrence of a trouble over train operations, a sounding time period, during which the warning device sounds, and a railroad crossing closing time period, during which the railroad crossing is closed by the crossing gate, become long, similarly as in the aforementioned case. Further, trains assigned to the kinds of low-speed trains, for example, a freight train should run at a speed, which is lower than a speed limit, after passing through the approach detection point (namely, the train detection point), even in the case where the freight transported by the train is light and the train is thus in the condition that the travelling speed thereof can be easily increased. Moreover, the delayed control method requires troublesome operations of allocating the kinds to each train and of managing data representing the allocated kind.

Moreover, there has been employed a control method, by which the travelling speed of a train is detected at an approach detection point and the timing is controlled on the basis of the speed detected at that time, as another method of performing a constant time control operation. In this case, the troublesome operations for managing the allocated kinds of trains are unnecessary.

However, in the case of this method, if the train is accelerated after passing the approach detection point, the time periods T0 and Tx are shortened. Thus, there are still restraints imposed on the speed at which the train runs after passing through the approach detection point.

As above stated, conventional railroad crossing gate control systems have various defects which should be improved in various respects.

Furthermore, in the case of managing train traffic, a track is partitioned into a plurality of sections. Then, the presence/absence of a train is detected in each of the sections. Subsequently, the entrance of the train into each of the sections and the leaving thereof from each of the sections are controlled. In such a train traffic management control system, a tracking circuit is employed as a conventional train detection device for detecting the presence/absence of a train in each of the sections.

Principle of the train detection performed by using such a track circuit will be described hereinbelow.

In each of a plurality of sections (referred to as a block section) obtained by partitioning a track, on which a train travels, thereinto, a power supply for feeding a signal current to be used to detect a train is connected to a pair of rails at the terminating side (namely, at the side from which the train leaves), while a track relay to be excited and driven by the aforementioned signal current is connected to a pair of rails at the beginning side (namely, at the side into which the train comes). Thus, a closed circuit for driving the track relay is constituted by utilizing a pair of rails as a part of an energizing path.

In such a constitution, when no train is present in a block section, electric current flows through the aforementioned closed circuit, so that the track relay is exited (thus, is raised) and an output signal indicating the absence of a train is generated as a result of a relay contact operation. In contrast, when the train enters the block section, wheels provide a short circuit between a pair of rails. Thus, electric current does not reach the track relay provided at the beginning side of the block section, so that the track relay is in a non-excited condition (thus, falls) and an output signal indicating the presence of a train is produced as a result of a relay contact operation. In this way, the presence/absence of a train is detected correspondingly to each of the block sections.

However, the conventional train detecting system, in which a train is detected by a track circuit utilizing the aforementioned electric circuit, has encountered a problem in that, although this system can detect whether or not a train is present in a block section, the system cannot specify a place, at which the train is present, in the block section.

Additionally, it is important for achieving a safe running operation of a train in a railroad transportation system to detect whether or not there is a rupture in rails.

There have been provided conventional devices for detecting a rupture in rails, an example of which will be described hereinafter.

Namely, a rail is insulated at predetermined intervals. Therefore, in a segment between insulated parts thereof, a transmitter is provided at an end portion thereof and a receiver is provided at the other end portion thereof. Thus, an electric current path is formed by utilizing the non-insulated segment of the rail. Further, if rupture takes place in the rail and portions of the rail are separated at a rupture part from one another, no electric current sent from the transmitter is transmitted to the receiver through a segment of the rail. Consequently, the device is adapted so that the presence/absence of a rupture in the rail is checked according to whether or not electric current supplied from the transmitter is transmitted to the receiver.

However, although the rupture occurring in the rail can be reliably detected by the conventional device in the aforementioned case of the ruptured condition in which the portions of the rail are separated at the rupture from one another, an electric current fed from the transmitter is allowed to flow through a part, which is not completely broken off, and can be received by the receiver according to the conventional method in the case that the rail is not completely ruptured but the portions thereof are partly connected at the rupture with each other. Moreover, in the case that the portions of the rail are in contact with each other even if the rail is completely ruptured, an electric current flows through the port ions thereof can be received by the receiver. Consequently, the conventional rupture detection system has faced a problem in that this conventional system can detect only a condition where the rail is ruptured to the extent that the portions, into which the rail is divided at the rupture, are completely separated from one another.

In recent years, there have been demands for high-speed and high-density transportation in the railroad transportation system, with the intention of enhancing the efficiency in carrying passengers. Moreover, it has been requested that the aforementioned problems in respect of the railroad crossing gate control system, the train detection or the rail rupture detection are solved by simultaneously securing the higher safety and reliability than ever.

The present invention is accomplished in view of the aforesaid circumstances and aims at solving the aforementioned problems by transmitting and receiving elastic waves through a movement path of a mobile unit as a transmission medium and by generating information to be used for controlling/monitoring associated elements of a control system for performing control operations on the mobile unit, such as a railroad crossing gate control operation, a train detection operation or an operation of detecting an occurrence of rupture in the movement path, based on an elastic wave reception signal.

DISCLOSURE OF THE INVENTION

Thus, there is provided an information generating apparatus using elastic waves in accordance with the present invention, which employs a movement path of a mobile unit as a transmission medium, and which is constituted by comprising an elastic wave transmitting device for transmitting elastic waves to the transmission medium, an elastic wave receiving device for receiving elastic waves transmitted from the elastic wave transmitting device through the transmission medium, and an information generating device for generating information that is necessary for controlling/monitoring associated elements of a control system for performing control operations on the mobile unit based on an elastic wave reception signal received by the elastic wave receiving device.

With such a constitution, information needed for controlling/monitoring a mobile unit control system, for example, for performing various control operations on a railroad transportation system can be generated by using elastic waves.

In this case, the apparatus of the present invention may as well be constituted so that a transmitter of the elastic wave transmitting device and a receiver of the elastic wave receiving device are in contact with the transmission medium.

With such a constitution, the propagation speed of elastic waves is high and thus the information can be obtained quickly.

In the case that the mobile unit is a train, the apparatus of the present invention is constituted so that the information generating device comprises a propagation time measuring device for measuring an elastic wave propagation time during which an elastic wave propagates between the train and a railroad crossing placed partway through a train movement path, a distance computing device for computing a distance between the train and the railroad crossing, based on the measured propagation time, a speed computing device for computing a train speed based on a change in the computed distance, and a control device for controlling timing, with which railroad crossing traversing inhibition command information is generated, based on the latest computed distance and train speed, and the railroad crossing traversing inhibition command information is generated under the control of the control device.

With such a constitution, the distance between the train and the railroad crossing and the train speed are computed every transmission of an ultrasonic wave. Further, the timing, with which the railroad crossing traversing inhibition command information is generated, is controlled on the basis of the latest computed distance and train speed. Thus, even if the train speed changes after the train passes through the approach detection point, the traversing inhibition command information can be generated with suitable timing in response to the change in the train speed.

Further, the apparatus of the present invention may as well be constituted so that a running pattern information transmitting device for transmitting a train running pattern information signal is provided in the train, while a running pattern discriminating device for discriminating running pattern information transmitted from the train is provided in the information generating device, the control device comprises an individual-running pattern boundary distance setting device for setting a boundary distance between the railroad crossing and the train, by which a previously set time can be secured from the generation of sounding operation starting command information until when the train enters the railroad crossing, based on the computed train speed correspondingly to each of the running patterns, a selection device for selecting a boundary distance corresponding to a running pattern discriminated by the running pattern discriminating device, and a judgment device for comparing the distance, which is computed by the distance computing device, with the boundary distance selected by the selection device and for judging whether or not the computed distance is equal to or less than the boundary distance, and a moment, at which the computed distance becomes equal to or less than the boundary distance, is set as a time at which the sounding operation starting command is generated.

With such a constitution, the train transmits a train running pattern, such as an acceleration pattern, a deceleration pattern or a constant speed pattern, to a ground facility that controls the timing with which the sounding operation starting command information corresponding to the transmitted running pattern is generated. Thus, even in the case that the running pattern of the train approaching the railroad crossing is different, the timing, with which the sounding operation starting command information is generated, can be controlled suitably.

The apparatus of the present invention may as well be constituted so that an elastic wave transmitting device and an elastic wave receiving device are provided in the train and the ground facility, respectively, and, when an elastic wave transmitted through a rail from the ground facility is received by the train, an elastic wave is transmitted from the train as a reply without delay, and the elastic wave propagation time, during which an elastic wave propagated between the train and the railroad crossing, is measured, based on a time between a moment, at which the ground facility starts transmitting an elastic wave to the train, and another moment at which the ground facility receives an elastic wave from the train.

With such a constitution, the necessity for synchronizing a transmitting-side device with a receiving-side device is eliminated. Consequently, the constitution of the apparatus can be simplified.

Furthermore, the apparatus of the present invention may as well be constituted so that the information generating device has a reception acknowledgement device for acknowledging reception of the elastic wave, and, when no reception acknowledgement signal is sent from the reception acknowledgement device in a condition that a detection signal indicating the detection of a train approaching the railroad crossing is generated, traversing inhibition command information is immediately generated.

With such a constitution, in the case that the reception of an ultrasonic wave reception signal cannot be confirmed and thus no information on the distance and speed of a train approaching the railroad crossing can be obtained, a traversing inhibition command is immediately issued. Thus, the safety of an automobile or a passenger traversing the railroad crossing can be secured.

The apparatus of the present invention may as well be constituted so that the information generating device has a detection device for detecting the presence/absence of the mobile unit based on a reception condition of an elastic wave received by the elastic wave receiving device and for generating mobile unit presence/absence.

With such a constitution, the mobile unit presence/absence information can be obtained by using an elastic wave. This can be applied to the detection of a train in the railroad transportation system.

In the case that the mobile unit runs on two rails which are parallel with each other, the apparatus of the present invention may as well be constituted so that the elastic wave transmitting device is placed at an end portion of one of the two rails, the elastic wave receiving device is placed at an end portion, which is on the same side as the elastic wave transmitting device, of the other of the two rails, and, when an elastic wave is transmitted from the one of the two rails to the other thereof through wheels of the mobile unit and is then received by the elastic wave receiving device, the detection device generates mobile unit presence information.

With such a constitution, if no mobile unit is present, the elastic wave receiving device receives no elastic waves. In contrast, if a mobile unit is present, an elastic wave is propagated from one of the rails to the other thereof through the mobile unit and is received by the elastic wave receiving device. The detection device is adapted in such a manner as to detect the presence of the mobile unit by inputting an elastic wave reception signal. Moreover, the position of the mobile unit can be detected by measuring the time between the initiation of the transmission of an elastic wave and the reception of this elastic wave.

The apparatus of the present invention may as well be constituted so that a sliding contact member, which rides astride and slides on the two rails and exhibits an elastic wave propagation speed characteristic being superior than that of the mobile unit, is provided at a front portion of the mobile unit.

With such a constitution, the transmission loss of elastic waves propagated through the mobile unit can be suppressed. Thus, the mobile unit can be detected further surely.

Additionally, the apparatus of the present invention may as well be constituted so that a connecting member for connecting between rails is provided at a rail position that is a previously set predetermined distance, away from the elastic wave transmitting device and the elastic wave receiving device.

With such a constitution, if the elastic wave propagation speed characteristic of the connecting member is already known, the distance, which is measured from the propagation time of the signal received through the mobile unit, therefrom to the mobile unit can be corrected from an amount of a change in the propagation time of the reception signal propagated through the connecting member. Thus, the position of the mobile unit can be detected with good precision by reducing the influence of a change in the elastic wave propagation speed characteristic of the rails or the like, which is caused by a change in temperature. Moreover, if the elastic wave propagation speed characteristic of the connecting member is set in such a manner as to be nearly the same as that of the mobile unit, the position of the mobile unit can be detected only by detecting that the signal received through the connecting member is matched with the signal received through the mobile unit.

The apparatus of the present invention may as well be constituted so that the elastic wave propagation speed characteristic of the connecting member is slower than that of the mobile unit.

With such a constitution, the connecting member can be utilized as a delay element for the elastic wave propagation. The position of the connecting member can be set in the vicinity of the elastic wave transmitting device/the elastic wave receiving device. Consequently, the operation of establishing the connecting member and the maintenance thereof can be facilitated.

The apparatus of the present invention may as well be constituted so that, when the mobile unit travels on the two rails, which are parallel with each other, in the case where the presence/absence of the mobile unit is detected by comparing the level of a reception signal with a threshold value, the elastic wave transmitting device is placed at an end portion of one of the two rails, and the elastic wave receiving device is placed at an end portion, which is at the same side as the elastic wave transmitting device, of the other of the two rails, and a plurality of connecting members, which are superior to the mobile unit in elastic wave propagation speed characteristic, are established in such a way as to be spaced from one another and to connect between the two rails, and so that a distance from the elastic wave transmitting device to each of the connecting members and a distance from the elastic wave receiving device to each of the connecting members are previously set.

With such a constitution, a reception signal received through each of the connecting members is received with time delay corresponding to the connection position thereof. Thus, the position of the mobile unit can be immediately detected by sensing a reduction in the signal level of the reception signal due to an increase in propagation loss that is generated as a result of the fact that the mobile unit passes through each of the connecting-member mounting positions.

Further, the apparatus of the present invention may as well be constituted so that a detection device is established in a block section equipped with a track circuit for detecting a train, and a system of detecting a train by using a track circuit is utilized together with a system of detecting a train by using an elastic wave.

With such a constitution, the detection of a train can be achieved by a duplex system for detecting a train by using a track circuit and for detecting a train by using an elastic wave. Consequently, the reliability of the detection of a train is enhanced.

The apparatus of the present invention may as well be constituted so that the information generating device has a judgment device for making a judgment on presence/absence of rupture in the movement path, based on a reception condition of an elastic wave received by the elastic wave receiving device and for generating information representing presence/absence of rupture in the movement path.

With such a constitution, the detection of rupture in the movement path is performed by using elastic waves. Thus, even in the partial rupture case that portions of the movement path are still in contact with one another although the movement path has been ruptured, it is possible to detect rupture in the movement path, because the reception condition of an elastic wave is different from that of the wave in the case of a normal state.

The apparatus of the present invention may as well be constituted in such a manner as to have a checking device for checking a receiving function based on a reflection wave at a movement path joint in an end portion of a rupture checking section.

With such a constitution, it can be monitored at all times whether or not the function of the elastic wave receiving device is normal. Consequently, the reliability of the detection of rupture is enhanced.

The apparatus of the present invention may as well be constituted so that, when the movement path consists of a plurality of running sections electrically insulated from one another at rail joints, respectively, close section end portions of at least adjacent running sections among the plurality of running sections are connected by device of insulating bypass propagation media adapted to propagate an elastic wave by bypassing the rail Joint portions, and the plurality of running sections connected by the bypass propagation media are employed as the rupture checking sections, and a connecting member for connecting between the rails parallel with each other, is formed with an insulating matter.

With such a constitution, the rupture detection device can be also used together with the track circuit for detecting a train. In addition, the presence/absence of rupture in a plurality of track circuits can be monitored only by such a single rupture detection device.

Furthermore, the apparatus of the present invention may as well be constituted so that an elastic wave and an electric signal are transmitted from a predetermined position in the vicinity of a home signal to a train through rails by being synchronized with each other, a train speed is calculated in the train based on a time delay between the receptions of the transmitted electric signal and elastic wave, and speed pattern information, which corresponds to a distance from the home signal stored in an information storage device mounted on the train, is compared with the calculated train speed, and when the home signal is in a stop aspect, a braking device of the train is operated if a stopping calculated train speed is higher than a pattern speed.

With such a constitution, an ATS (Automatic Train Stop) apparatus using elastic waves can be realized.

Further, the apparatus of the present invention may as well be constituted so that elastic waves are transmitted from each elastic wave transmitting device to two rails which are parallel with each other, respectively, the elastic waves from the rails are received by each elastic wave receiving device in the train, respectively, and limit speed information representing a limit speed of the train is imparted to the elastic waves to be transmitted to the rails, respectively, and then the elastic waves are transmitted thereto, respectively.

With such a constitution, the elastic waves to be transmitted to the rails, respectively, are easily made to be independent of one another. Thus, according to the present invention, the ATC (Automatic Train Control) apparatus can be easily constituted as a duplex system, which could not been constituted in the conventional apparatus in which the limit speed information is given to the train by using an electric signal.

BRIEF DESCRIPTION OF THE DRAWINGS

FIG. 40 is a diagram showing the constitution of each of an ultrasonic transmitting apparatus and an ultrasonic receiving apparatus of FIG. 39;

BEST MODE FOR CARRYING OUT THE INVENTION

Hereinafter, the embodiments of the information generating apparatus of the present invention using elastic waves will be described with reference to the accompanying drawings.

Figure 2:
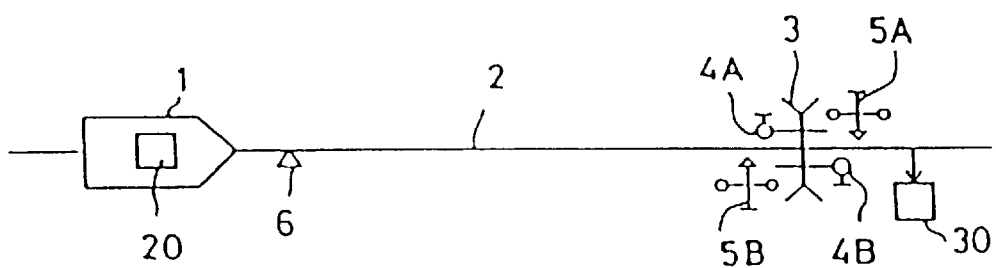
FIG. 2 is a schematic diagram showing the entire constitution of a first embodiment in the case where the information generating apparatus of the present invention is applied to a railroad crossing control apparatus.

First, there will be described the case where the present invention is applied to a railroad crossing control device, FIG. 2 is a schematic diagram illustrating the entire constitution of a first embodiment of the apparatus.

As shown in FIG. 2, a pair of railroad crossing gates 4A and 4B and a pair of warning devices 5A and 5B are provided at a railroad crossing 3 that is placed in an operating section of a train 1 acting as a mobile unit running on rails 2 serving as a movement path. Further, at a point (namely, an approach detection point) which is established at a predetermined distance before the railroad crossing 3, there is provided a train detector 6 for detecting that the train 1 passes therethrough.

An ultrasonic transmitting apparatus 20 serving as an ultrasonic transmitting device adapted to transmit, for example, ultrasonic waves as elastic waves is mounted in the train 1. Further, a receiving apparatus 30 serving as an ultrasonic receiving device for receiving ultrasonic waves, which are propagated through the rails 2, is connected to the rails 2 in the railroad crossing 3 to which a train approaches.

Figure 3:
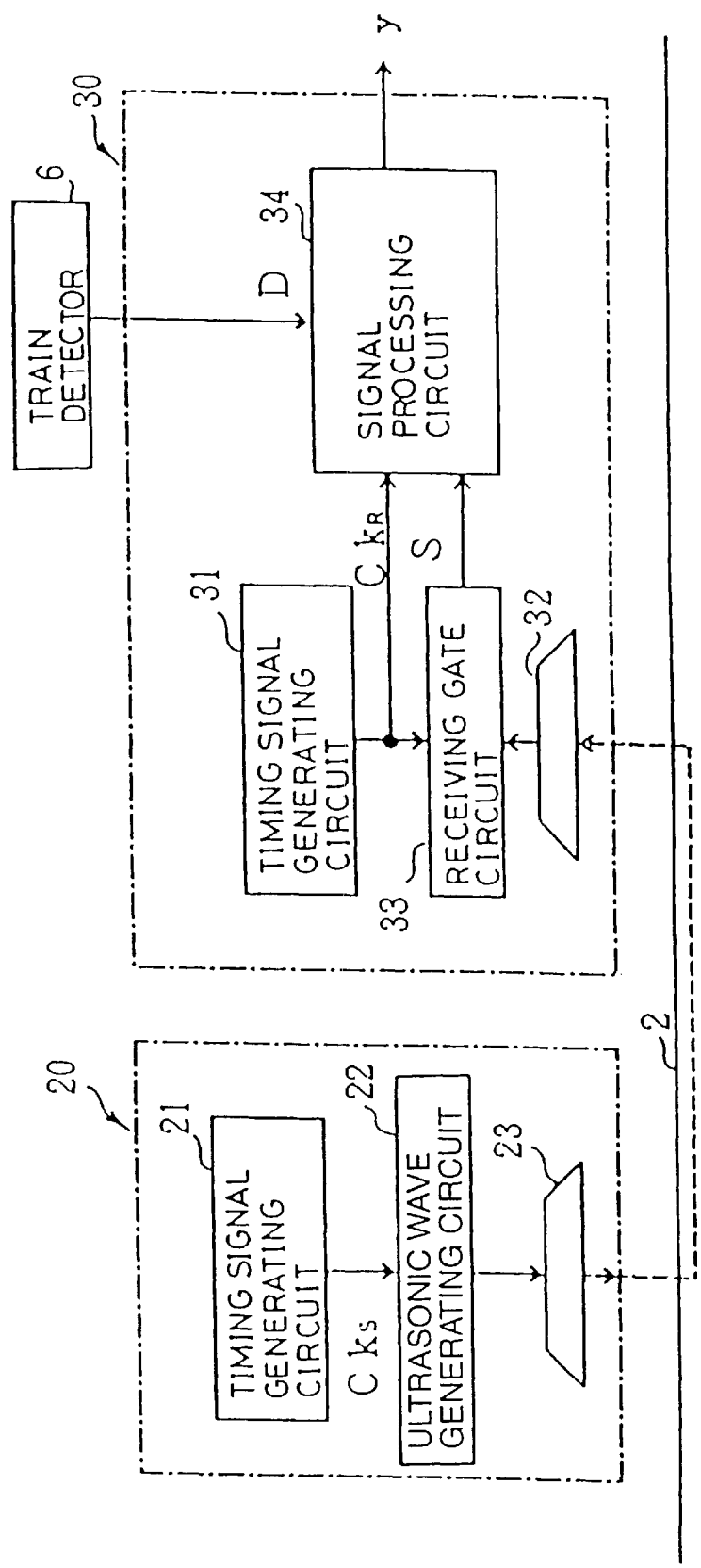
FIG. 3 is a diagram showing the constitution of each of a transmitting apparatus and a receiving apparatus of FIG. 2.

The ultrasonic transmitting apparatus 20 and the ultrasonic receiving apparatus 30 have the constitution as shown in FIG. 3.

As shown in FIG. 3, the ultrasonic transmitting apparatus 20 is provided with: a transmitting-side timing signal generating circuit 21, which generates transmitting-side timing signal CKs at a constant period tck; an ultrasonic wave generating circuit 22 which generates ultrasonic waves at the generating period tck corresponding to the transmitting-side timing signal CKs; and a transmitter 23 for transmitting ultrasonic waves. Incidentally, the transmitter 23 is established in such a manner that a transmitting face is directly contact to a metallic axle supporting member. Thus, a reduction in the ultrasonic-wave receiving sensitivity can be prevented by transmitting ultrasonic waves to the rail 2 through the axle supporting member, the metallic axle and the metallic wheel.

The ultrasonic wave receiving apparatus 30 is constituted by comprising: a receiving-side timing signal generating circuit 31, which generates receiving-side timing signal CKR in synchronization with the transmitting-side timing signal generating circuit 21; a receiver 32 for receiving ultrasonic waves which are propagated through the rail 2; a receiving gate circuit 33 for enabling a gate in response to the input of the receiving-side timing signal CKR and for passing the ultrasonic waves received by the receiver 32 therethrough; and a signal processing circuit 34 serving as an information generating device to which a reception signal S is input through the receiving gate circuit 33.

Figure 36:
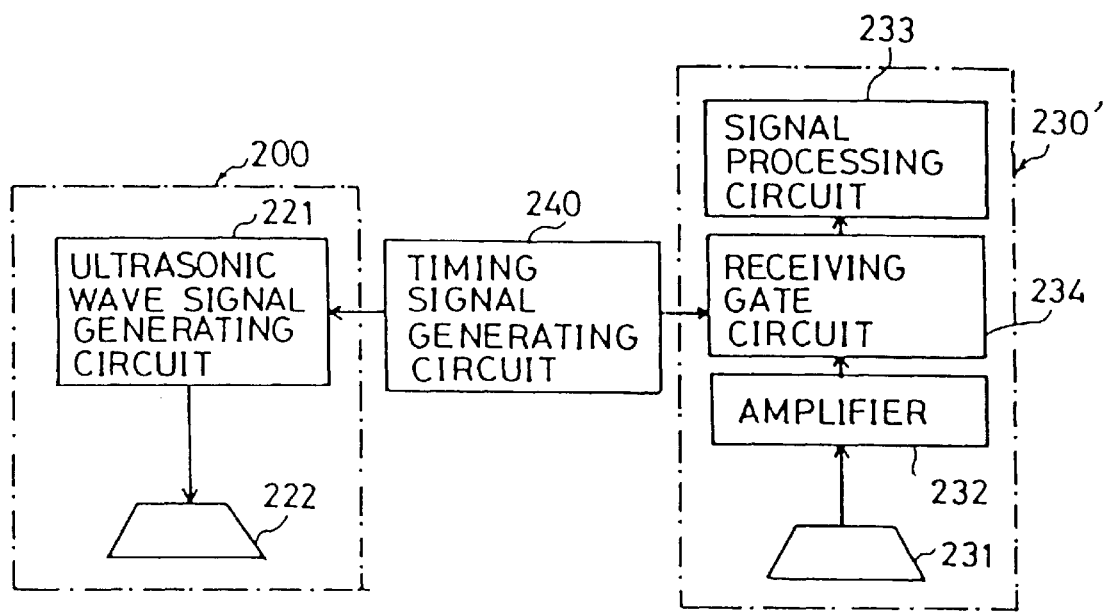
FIG. 36 is a diagram showing the constitution of each of an ultrasonic transmitting apparatus and an ultrasonic receiving apparatus of FIG. 35.

Incidentally, both of the timing signal generating circuits 21 and 31 are provided with calibration signal receiving apparatuses (not shown) for synchronizing both of timing signals CKs and CKR with each other, respectively, similarly as in the case of FIG. 36 (to be described later). Method of synchronizing both of timing signals CKs and CKR with each other is to generate calibration signals from the same calibration signal generating source periodically and to forcibly reset the timing signal generating operations when a calibration signal is received by each of the calibration signal receiving apparatuses through, for instance, wireless communication. Thus, the transmitting side and the receiving side can be prevented from being out of synchronization.

Figure 4:
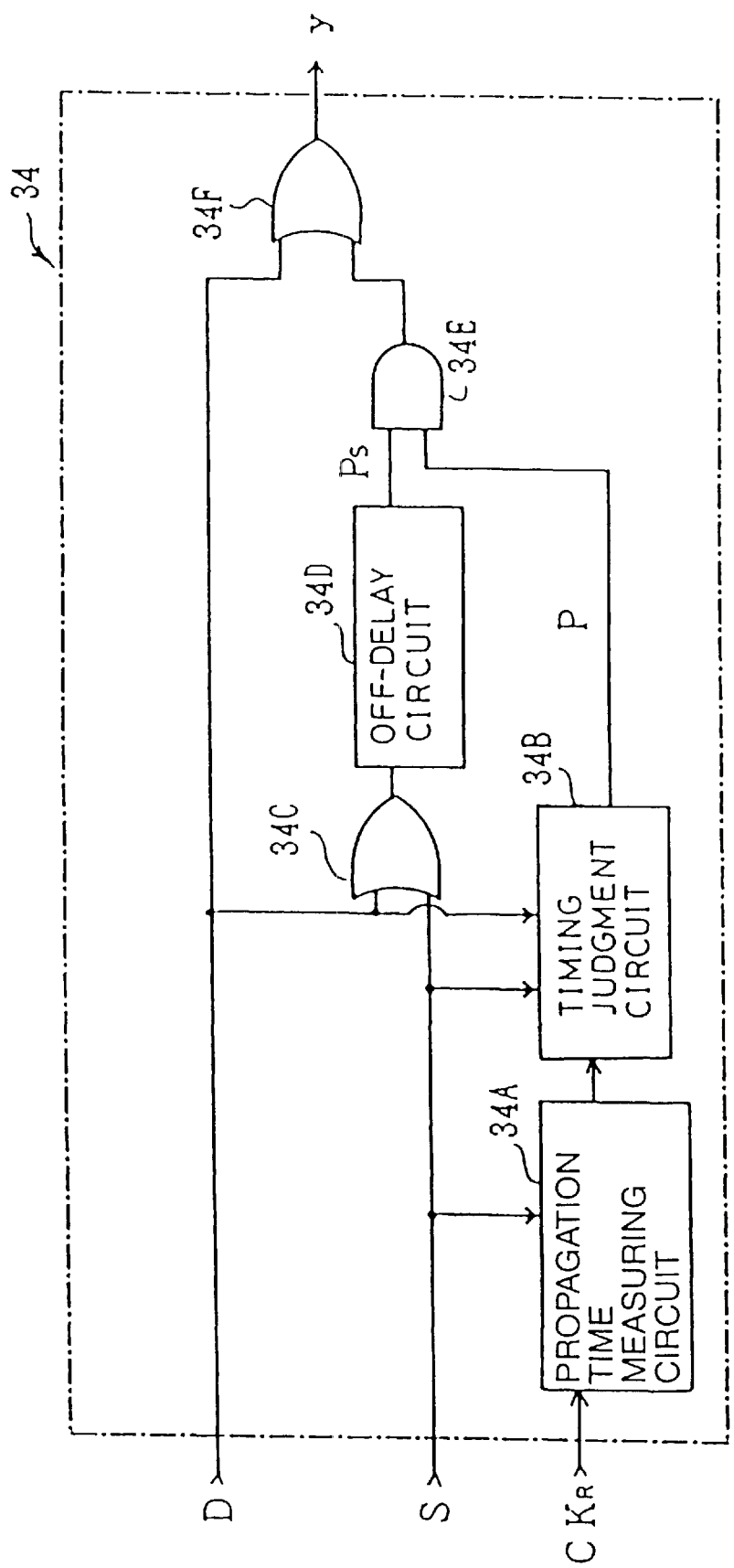
FIG. 4 is a diagram showing the constitution of a signal processing circuit provided in the receiving of FIG. 3.

As shown in FIG. 4, the signal processing circuit 34 is constituted by comprising: a propagation time measuring circuit 34A serving as a propagation time measuring device for measuring a propagation time t from the aforementioned reception signal S and the receiving-side timing signal CKR; a timing judgement circuit 34B for computing the distance x (or the position of a train) from the railroad crossing 3 to the train 1 and the train speed v on the basis of the measured propagation time t and for generating traversing inhibition timing judgment signals P correspondingly to the timing of initiation of sounding operations of warning devices 5A and 5B and the timing of a descent of a crossing gate arm, based on these computed values; a first OR gate 34C for computing a logical OR of a train detection signal D from the train detector 6, and a reception signal S; an off-delay circuit 34D for delaying a fall of an output of the first OR gate 34C by a predetermined time; an AND gate 34E for computing a logical AND of a delay signal Ps from the off-delay circuit 34D and the judgment signal P generated by the aforementioned timing judgment circuit 34B; and a second OR gate 34F for outputting a timing control signal y by computing the logical OR of an output of an AND gate 34E and a train detection signal D. Further, as will be described later, an output y of the second OR gate 34F drops when a sounding operation starting time comes on condition that the train 1 is detected. Then, a sounding operation starting command is generated. Incidentally, the aforementioned timing judgment circuit 34B has the functions of the speed computing device and the control device.

Further, the aforementioned first OR gate 34C and the off-delay circuit 34D are used to confirm that the reception signal S is received at a predetermined interval (corresponding to the interval between transmissions of ultrasonic waves) after the train 1 passes through the approach detection point. Moreover, the aforementioned first OR gate 34C and the off-delay circuit 34D compose a reception acknowledgement device. Namely, when a train is detected by the train detector 6, the signal level of a train detection signal D sent from the train detector 6 falls. After the signal level of the train detection signal D drops, a delay signal Ps (corresponding to the reception acknowledgment signal) is still generated from the off-delay circuit 34D if the reception signal S is input at the predetermined interval. However, when there is no reception signal S, the signal level of the delay signal Ps for the off-delay circuit 34D drops. Then, an output operation of the AND gate 34E stops. Consequently, an output operation of the OR gate 34F is ceased, and a sounding operation starting command is generated. Thus, there can be prevented an occurrence of a delay in starting a sounding operation owing to the fact that no reception signal S is received and no judgment cannot be made on the traversing inhibition timing.

Next, a propagation time measuring operation of the propagation time measuring circuit 34A will be described hereunder.

Figure 5:
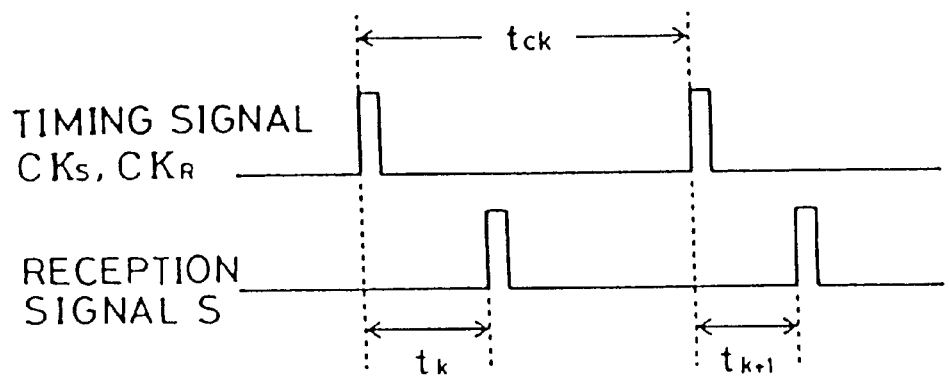
FIG. 5 is a time chart illustrating the principle of measurement of a propagation time.

Ultrasonic waves are transmitted from the ultrasonic wave transmitter 22 at the period tck at which the transmitting-side timing signals CKs are generated, and are propagated through the rail 2. In the receiving apparatus 30, an ultrasonic wave is received every transmission period tck, and a reception signal S is produced. Simultaneously, a receiving-side timing signal CKR is generated in synchronization with the transmitting-side timing signal CKs. As shown in FIG. 5, the reception signal S is input from the receiving gate circuit 33 to the propagation time measuring circuit 34A of the signal processing circuit 34 almost at the period tck. In the propagation time measuring circuit 34A, each time a reception signal S is input, a time tk, tk+1, . . . between the input of the receiving-side timing signal CKR and the input of the reception signal S is counted by a counter, so that the propagation time t is obtained.

Next, a judgment method on the traversing inhibition timing in this embodiment will be described hereinbelow.

Figure 1:
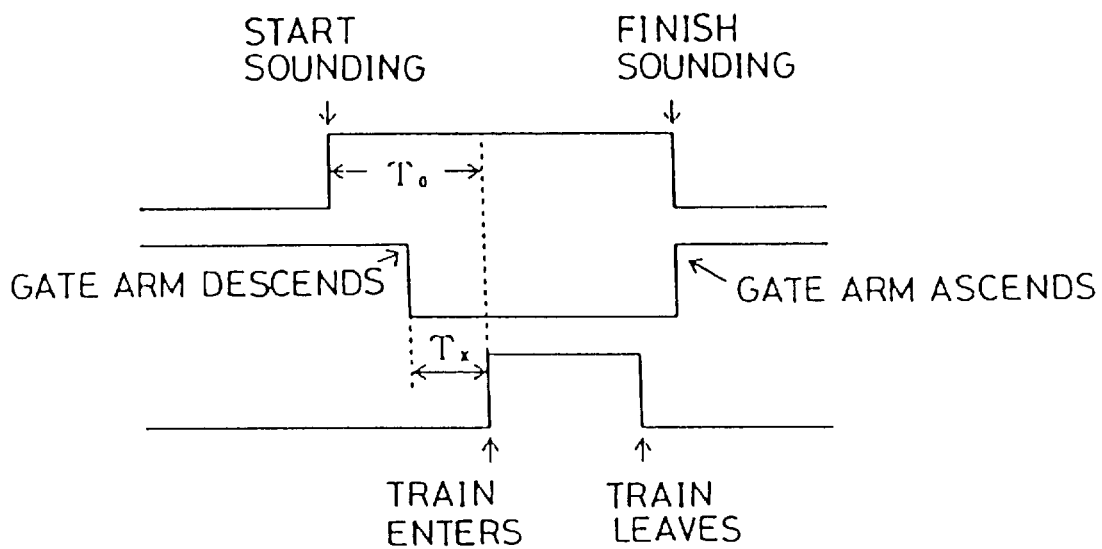
FIG. 1 is a diagram illustrating the railroad crossing control timing.

In this embodiment, a judgment on the traversing inhibition timing is made by judging whether or not the position of the train (namely, the distance x to the railroad crossing 3) obtained from the propagation time of the ultrasonic wave is a distance capable of securing the time T0 illustrated in FIG. 1, even when the train increases the speed thereof from the value v at that time at the maximum acceleration αmax. Incidentally, the maximum acceleration αmax is defined as the maximum value of accelerations obtained by all trains which run through the section.

When the train, whose speed is v, increases the speed at the maximum acceleration αmax, the distance x', which the train runs for the time period T0, is obtained by the following equation:

$$x'=vT0+(\alpha max T0^2)/2 \qquad (1)$$

Therefore, the condition for securing the time T0 is obtained by comparing the distance x from the train to the railroad crossing with the distance x' and thus is given by:

$$x-x'>0.$$

Incidentally, the aforementioned distance x' is a boundary distance by which the time T0 can be secured.

The distance x from the railroad crossing to the train is obtained from the measured propagation time t and the ultrasonic wave propagation speed Cm by the following equation (2):

$$x=Cmt \qquad (2)$$

The train speed v is obtained from the difference Δt between the last value and the currentt value of the measured propagation time Δt (in the case illustrated in FIG. 5, Δt=tk−tk+1) and the generation period of the timing signal CKR (CKs), by the following equation (3):

$$v=Cm\Delta t/tck \qquad (3)$$

It is understood from the equations (2) and (3) that the distance x is in proportion to the propagation time t and that the train speed v is in proportion to the propagation time difference Δt.

The following equation (4) is obtained by substituting the equation (3) into the equation (1) and assuming the difference between the distances x and x' as a function f(t, Δt) of t and Δt:

$$f(t, \Delta t)=Cm-[Cm\Delta t T0/tck+(\alpha max T0^2)/2] \qquad (4)$$

Figure 6:
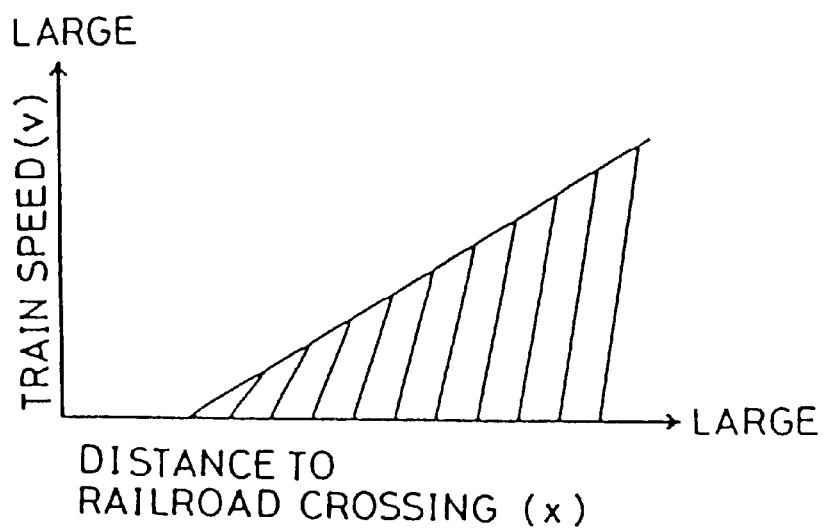
FIG. 6 is a diagram showing a range in which the time T0 can be secured when assuming an acceleration running pattern.

Therefore, the condition for securing the time T0 is f(t, Δt)>0. This condition is met in a diagonally shaded region in a graph of FIG. 6 which shows the relation between the train speed v and the distance x therefrom to the railroad crossing based on the equation (1). Thus, the timing judgment circuit 34B has the functions of a boundary distance setting device and the judgment device.

Next, a traversing inhibition timing control operation of this embodiment will be described hereinbelow.

Ultrasonic waves are transmitted at the period tck from the train 1 approaching the railroad crossing 3 and are propagated through the rail 2. In the receiving apparatus 30, a receiving-side timing signal CKR is generated at the aforementioned period tck, and further, a reception signal S and the receiving-side timing signal CKR are input to the signal processing circuit 34. The propagation time measuring circuit 34A measures the propagation time t of the aforementioned reception signal S every input thereof.

Figure 7:
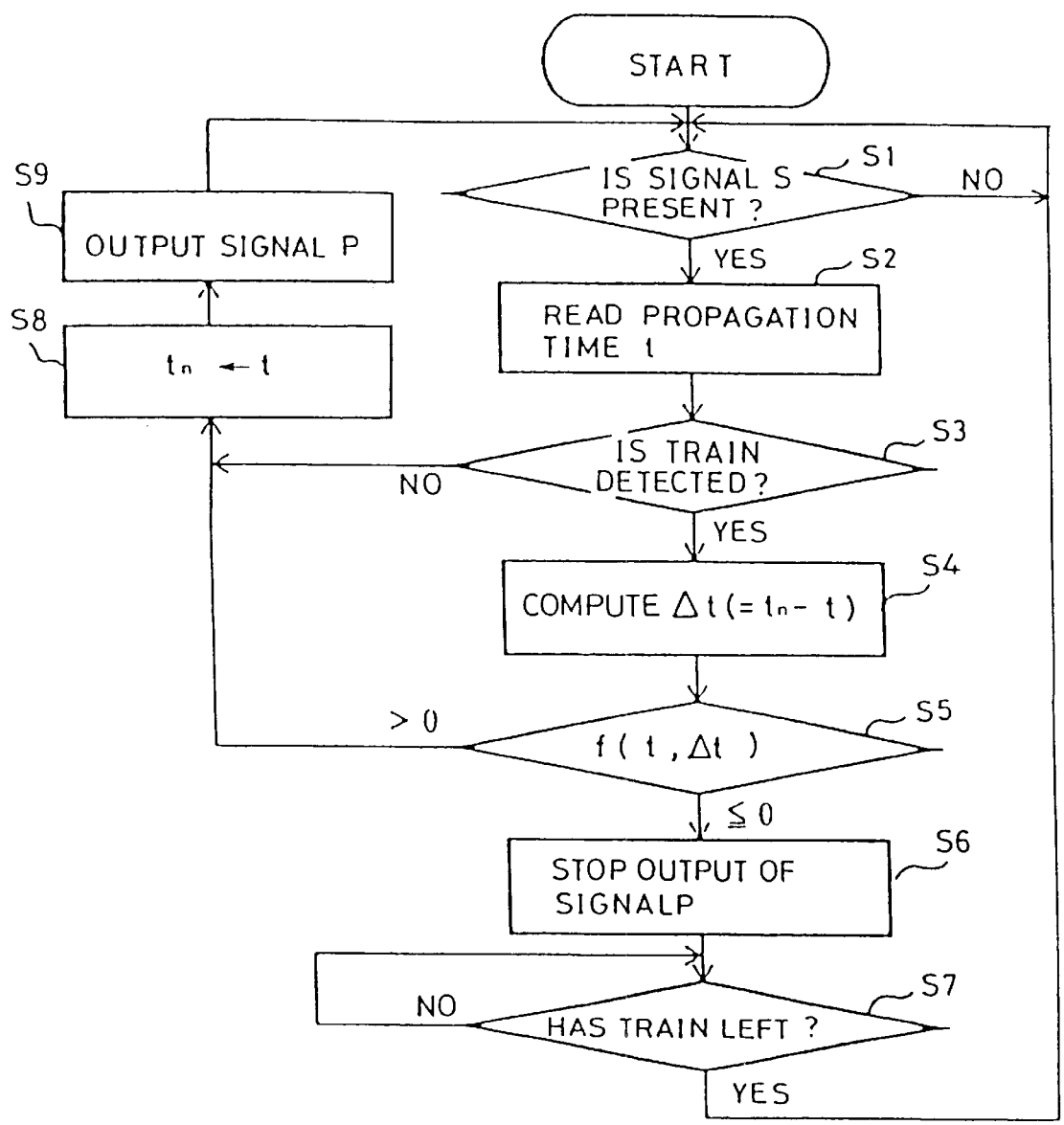
FIG. 7 is a flowchart illustrating a timing judgment operation of the first embodiment of the present invention.

Moreover, the timing judgment circuit 34B performs a traversing inhibition timing judgment operation according to the flowchart of FIG. 7.

In step 1 (incidentally, in this figure, this step is indicated by reference character S1 and further, the subsequent steps are indicated by reference characters in a similar manner), it is judged whether or not the reception signal S is input thereto. If the reception signal S is input thereto, the process advances to step 2.

In step 2, the propagation time t measured by the propagation time measuring circuit 34A is read.

In step 3, it is judged based on the train detection signal D sent from the train detector 6, which is placed at the approach detection point, whether or not the train 1 is detected. The train detection signal D output from the train detector 6 has a low signal level when the train 1 is detected. Therefore, if the train detection signal D has a high signal level, it is judged that no train approaches the railroad crossing. Then, the process proceeds to step 8 wherein the propagation time t measured this time is stored as the last time value tn. Subsequently, in step 9, it is judged that there is no necessity for performing a sounding operation, and then, a judgment signal P is produced. If the train 1 is detected and the signal level of the train detection signal D drops, it is judged that the train is present. Then, the process advances to step 4. Incidentally, in a condition in which the train 1 is not detected and the signal level of the train detection signal D rises, a high-level output is generated from the second OR gate 34F.

In step 4, the difference Δt between the propagation time t measured this time and the value tn of the propagation time measured the last time is computed.

In step 5, the aforementioned function f(t, Δt) is computed on the basis of the read propagation time t and the difference Δt to thereby judge whether or not a sounding operation is to be started. If f(t, Δt)≦0, it is judged in step 6 that it is time to start a sounding operation, and thus, the generation of the judgment signal P is stopped. Consequently, an output of the AND gate 34E is stopped, so that the signal level of an output of the second OR gate 34F becomes low and a sounding operation starting command is generated.

In step 7, it is judged based on the train detection signal D whether or not the train 1 leaves the railroad crossing 3. Further, an output of the judgment signal P is stopped until the train 1 leaves the crossing 3. When leaving the crossing 3, the timing judgment circuit 34B is reset at the rising edge of the train detection signal D and thus the process prepares for the approach of the next train. Subsequently, a sounding operation stop command and a crossing gate arm raising command are generated at the rising edge of the second OR gate 34F.

In contrast, if f(t, Δt)>0, it is judged as being too early to start a sounding operation. Thus, operations in the aforementioned steps 8 and 9 are performed. At that time, both of a delayed output Ps of the off-delay circuit 34D and the judgment output P output from the timing judgment circuit 34B are produced. Thus, an output of the second OR gate 34F has a high signal level.

Figure 8:
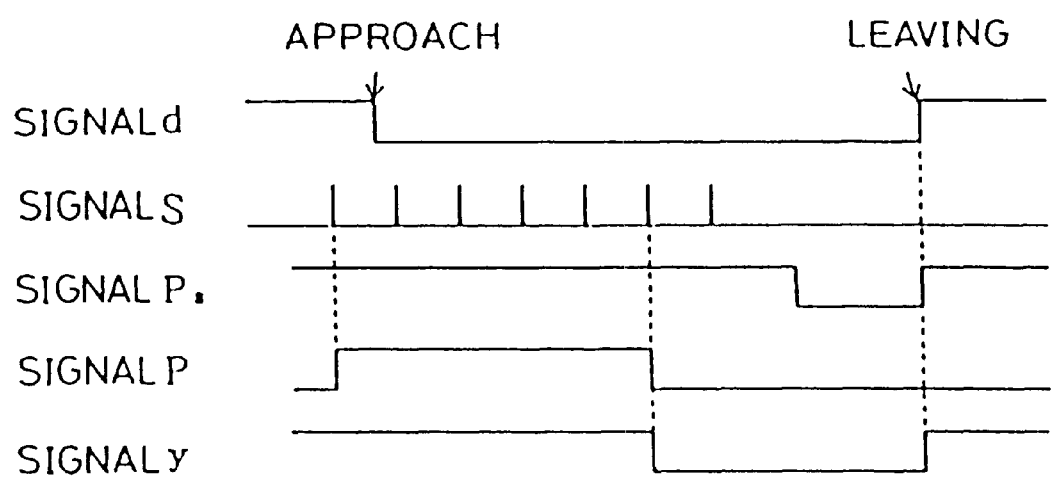
FIG. 8 is a flowchart illustrating an operation of the signal processing circuit.

FIG. 8 is a time chart illustrating an operation of the aforementioned signal processing circuit 34.

With such a constitution, the sounding operation initiation timing is controlled by monitoring the train speed even after the train passes through the approach detection point. Thus, the sounding operation start timing and the crossing gate arm descend timing, which are necessary for the safety of an automobile or a passenger traversing the railroad crossing, can be secured. Moreover, as compared with the conventional railroad crossing gate control apparatus, a waste sounding operation time or a waste railroad crossing closing time by the crossing gate arm can be reduced. Therefore, the safety of an automobile or a passenger traversing the railroad crossing can be secured and moreover, the railroad crossing traversing inhibition time can be prevented from being unnecessarily extended.

Next, the second embodiment of the railroad crossing gate control apparatus of the present invention will be described hereinafter.

There are various running patterns in the case that a train approaches a railroad crossing. For example, in the case where the railroad crossing is placed in the proximity of a station, it is often that a train having departed from the station approaches the railroad crossing while accelerating and that, in contrast, a train to be stopped at the station approaches the railroad crossing while decelerating. Moreover, in the case that the railroad crossing is provided in a running section between stations, it is frequent that a train approaches the railroad crossing at a constant speed.

Thus, if a judgment on the sounding operation start timing is made by assuming that all of the running patterns are of the type in which a train approaches the railroad crossing while accelerating, similarly as in the first embodiment, there is the fear that the time T0 between the initiation of a sounding operation and the entrance of a train to the railroad crossing becomes longer than required, in the case where the running pattern of the train approaching the railroad crossing is of the type in which the train decelerates or runs at a constant speed. The second embodiment is developed so as to eliminate such fear.

The second embodiment is obtained by imparting a running pattern information generating function to the transmitting apparatus and further imparting a running pattern discriminating function to the receiving apparatus of the ground facility, in addition to the constitution of the first embodiment.

Figure 9:
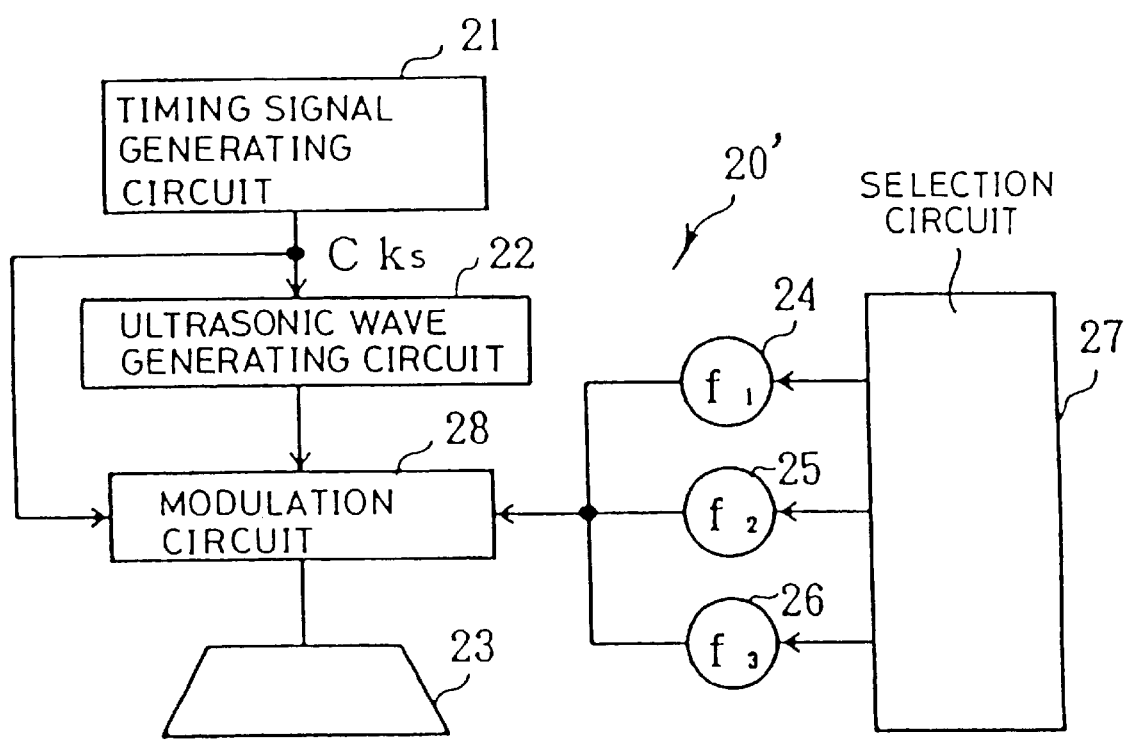
FIG. 9 is a diagram showing the constitution of a transmitter of another railroad crossing control apparatus which is a second embodiment of the present invention.

FIG. 9 shows the constitution of the transmitting apparatus of the second embodiment.

As shown in FIG. 9, an ultrasonic wave transmitting apparatus 20' of this embodiment is provided with: signal generators 24, 25 and 26 adapted to generate signals f1, f2 and f3 having different frequencies which correspond to the running patterns of the acceleration, deceleration and constant speed running types, respectively; a selection circuit 27 for selecting and driving one of the aforementioned signal generators 24, 25 and 26 according to the current running pattern; and a modulation circuit 28 for modulating the aforementioned frequency signals f1, f2 and f3, in addition to the timing signal generating circuit 21, the ultrasonic wave generating circuit 22 and the transmitter 23 of the first embodiment. The modulation circuit 28 modulates ultrasonic waves generated from the ultrasonic wave generating circuit 22 by using the frequency signals of the frequencies f1, f2 and f3 in synchronization with the timing signal CKs sent from the timing signal generating circuit 21. Further, the modulation circuit 28 outputs the modulated signals to the transmitter 23. Incidentally, the aforementioned signal generators 24, 25 and 26, the selection circuit 27 and the modulation circuit 28 compose a running pattern information transmitting device.

Figure 10:
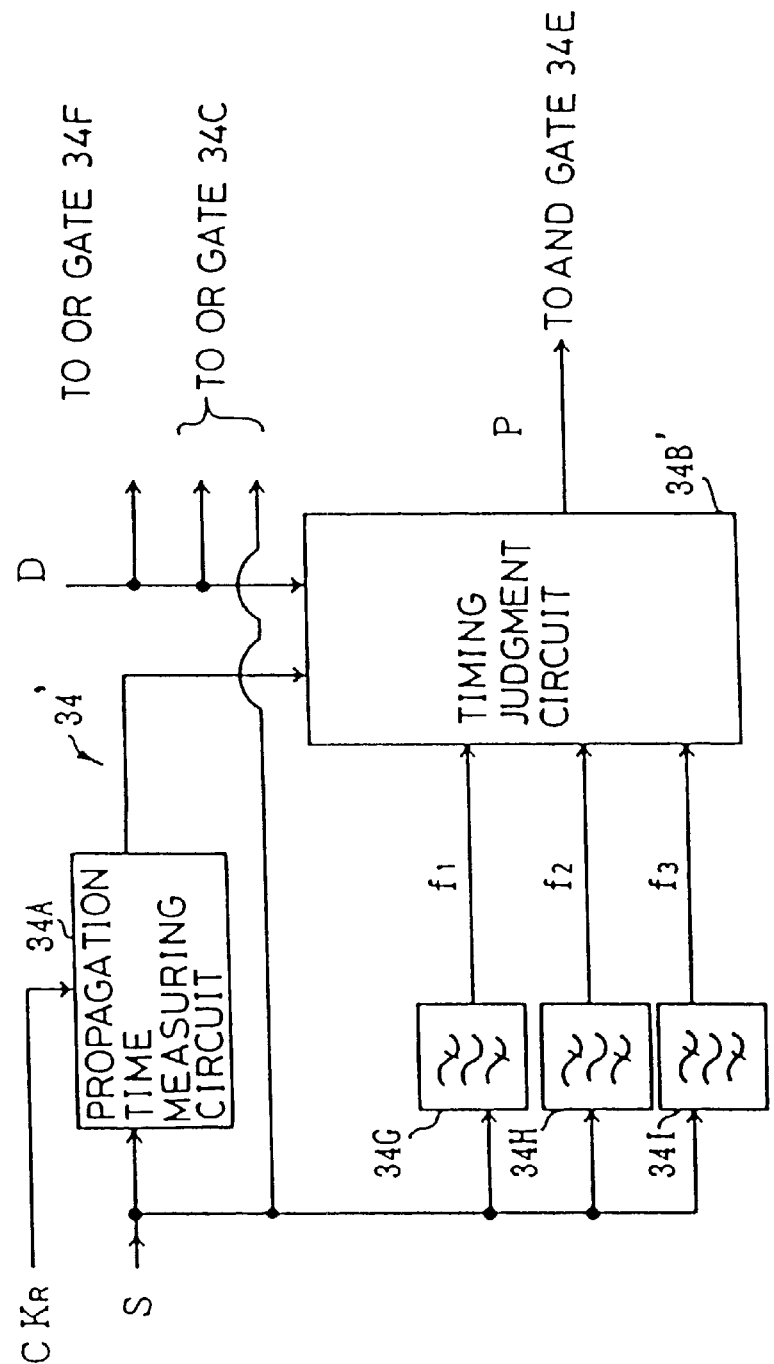
FIG. 10 is a diagram showing the constitution of a primary part of a signal processing circuit provided in a receiver of FIG. 9.

The receiving apparatus of the second embodiment is different from that of the first embodiment only in the constitution of the signal processing circuit. FIG. 10 shows the constitution of a primary part of the signal processing circuit of the receiving apparatus of the second embodiment.

As shown in FIG. 10, the signal processing circuit 34' of this embodiment is equipped with: band-pass filters 34G, 34H and 34I for filtering the aforementioned frequency signals f1, f2 and f3, respectively. Further, the functions of discriminating the running patterns transmitted from the train and of judging the sounding operation start timing on the basis of judgment conditions corresponding to each of the running patterns are imparted to the timing judgment circuit 34B'. Incidentally, the band-pass filters 34G, 34H and 34I and the timing judgment circuit 34B' compose a running pattern discriminating device. Moreover, the timing judgment circuit 34B' also has the functions of an individual running pattern boundary distance setting device, a selection device and a judgment device. Incidentally, the rest of the constitution of the signal processing circuit 34' is similar to the corresponding parts of the first embodiment, and thus the description is omitted.

Hereinafter, judgment conditions for making judgments in the cases of the constant speed and deceleration running patterns.

In these cases of employing the constant speed and deceleration running patterns, a judgment is made by comparing the value of the function f(t, Δt) with 0, similarly as in the aforementioned case of employing the acceleration running pattern.

In the case of employing the constant speed running pattern, the distance x', which the train runs at a speed v for the time period T0, is obtained by the following equation:

$$x'=vT0 \tag{5}$$

Therefore, in the case of employing the constant speed running pattern, the function f(t, Δt) is obtained by the following equation (6):

$$f(t, \Delta t)=Cmt-Cm\Delta tT0/tck \tag{6}$$

Further, when the train, whose speed is v, decreases the speed at the minimum deceleration a min, the distance x', which the train runs for the time period T0, is obtained by the following equation:

$$x'=vT0-(\alpha min T0^2)/2 \tag{7}$$

Incidentally, it is supposed that αmin>0.

Therefore, in the case of employing the deceleration running pattern, the function f(t, Δt) is obtained by the following equation (8):

$$f(t, \Delta t)=Cmt-L0-[Cm\Delta tT0/tck-(\alpha min T0^2)/2] \tag{8}$$

where L0 is a margin distance.

Figure 11:
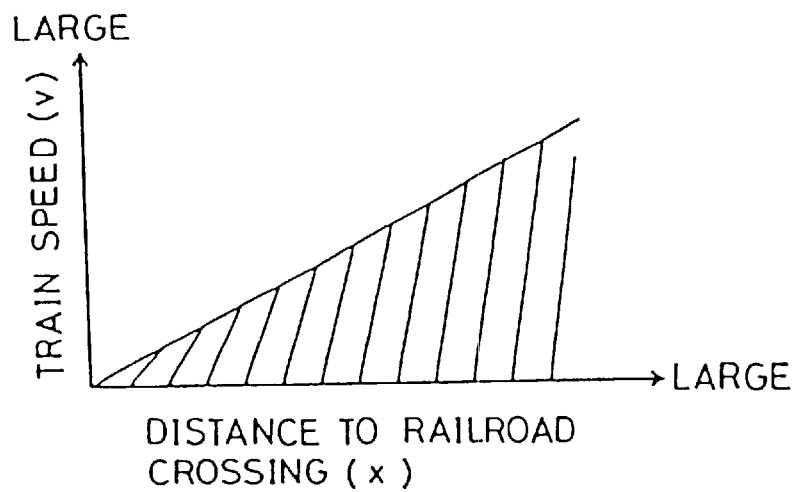
FIG. 11 is a diagram showing a range in which the time T0 can be secured when assuming a constant speed running pattern.
Figure 12:
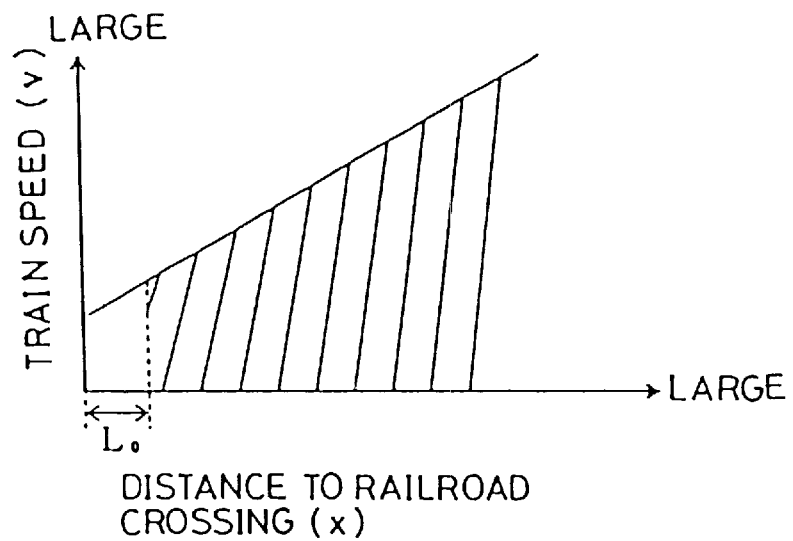
FIG. 12 is a diagram showing a range in which the time T0 can be secured when assuming a deceleration running pattern.

Furthermore, the condition for securing the time T0 is f(t, Δt)>0. In the case of employing the constant speed running pattern, this condition is met in a diagonally shaded portion in a graph of FIG. 11 which shows the relation between the train speed v and the distance x therefrom to the railroad crossing. Similarly, in the case of employing the deceleration running pattern, this condition is met in a diagonally shaded portion in a graph of FIG. 12 which shows the relation therebetween.

Next, a traversing inhibition timing control operation of the second embodiment will be described hereinbelow.

Ultrasonic waves are transmitted from the train 1 approaching the railroad crossing 3 at the period tck and are propagated through the rails 2. The aforementioned ultrasonic waves contain information on the running pattern of the train 1. For example, assuming that the corresponding relation between the frequency signals and the running patterns is in such a manner that the frequency signals f1, f2 and f3 correspond to the acceleration running pattern, the constant speed running pattern and the deceleration running pattern, respectively, the signal generator 24 is selected and driven by the selection circuit 27 and ultrasonic waves modulated by using the frequency signal f1 are transmitted in the case that the running pattern informed by the train 1 to the ground facility is the acceleration running pattern. In the cases of employing the constant speed running pattern and the deceleration running pattern, an ultrasonic wave modulated by using the frequency signal f2 and an ultrasonic wave modulated by using the frequency signal f3 are transmitted, respectively.

The receiving apparatus 30 receives the ultrasonic waves transmitted from the train 1 and inputs the reception signal S to the signal processing circuit 34'. The reception signal S is input to the propagation time measuring circuit 34A and is used to measure a propagation time and is filtered by each of the band-pass filters 34G, 34H and 34I, similarly as in the case of the first embodiment. Further, in the case of employing the acceleration running pattern, the frequency signal f1 is input from the band-pass filter 34G to the timing judgment circuit 34B'. Moreover, in the case of employing the constant speed running pattern, the frequency signal f2 is input from the band-pass filter 34H to the timing judgment circuit 34B'. Furthermore, in the case of employing the deceleration running pattern, the frequency signal f3 is input from the band-pass filter 34I to the timing judgment circuit 34B'.

Figure 13:
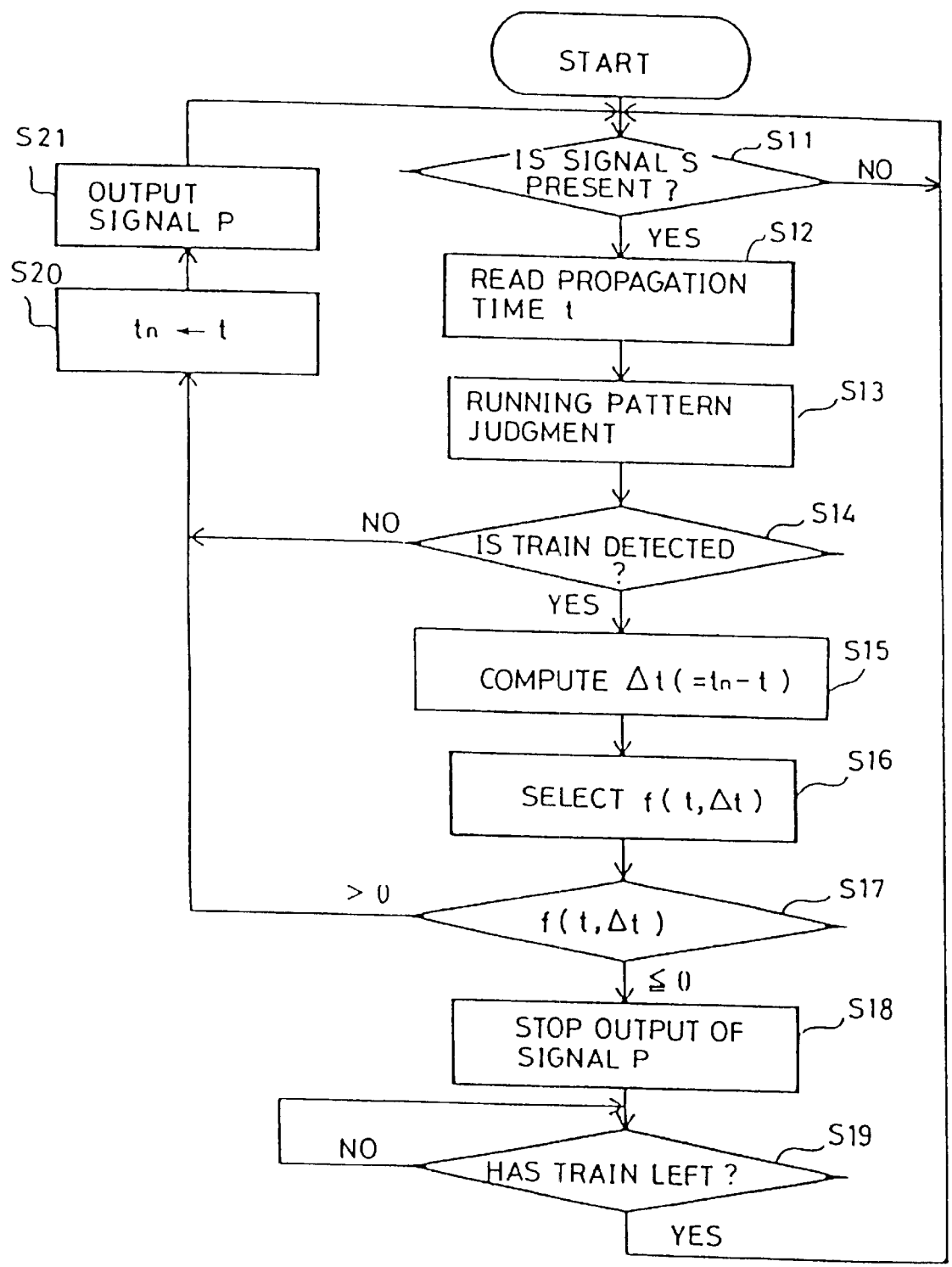
FIG. 13 is a flowchart illustrating a timing judgment operation of the second embodiment of the present invention.

The timing judgment circuit 34B' is operative to perform a traversing inhibition timing judgment process on the basis of each of the input signals according to a flowchart of FIG. 13.

In steps 11 and 12, similarly as in the case of the first embodiment, it is judged whether or not a reception signal S is input. If the reception signal S is input, a propagation time t is read In step 13, a running pattern notified from the train 1 is discriminated based on the frequency of a signal input from one of the band-pass filters 34G to 34I.

In steps 14 and 15, similarly as in the case of the first embodiment, it is judged whether or not a train is detected. If the train is detected, the propagation time difference Δt is computed.

In step 16, the condition function f(t, Δt) corresponding to the running pattern discriminated in step 13 is selected.

In step 17, it is judged based on the selected function f(t, Δt) instep 16 whether or not a sounding operation should be started. If f(t, Δt) 0, it is judged that it is time to start a sounding operation. Moreover, an output of the judgment signal P is stopped. Furthermore, the judgment signal P is held in a stopped state until it is detected that the train leaves the railroad crossing. when it is detected that the train leaves the railroad crossing, the timing judgment circuit 34B' is reset at the rising edge of a train detection signal D.

In contrast, if f(t, Δt)>0, it is judged that it is too early to start a sounding operation. Thus, similarly as in the case of the first embodiment, operations in steps 20 and 21 are performed.

With such a configuration, there can be provided a railroad crossing gate control apparatus with flexibility, which further has advantageous effects of being able to control the sounding operation start timing suitably and to deal with various running patterns, even in the case that the running patterns of the trains approaching the railroad crossing 3 are different from one another, in addition to the advantageous effects of the first embodiment.

Incidentally, in the case of the second embodiment, when the train travels by being accelerated even though the train has informed the ground facility that the train runs by being decelerated, there is the fear that the initiation of the sounding operation lags behind an appropriate start time because a time required for the train to reach the railroad crossing is shorter than the time computed by the ground facility. Therefore, in the case of the second embodiment, the train having informed the ground facility of the running pattern should follow the informed running pattern. Thus, the safety is further enhanced by imparting the speed limiting function for monitoring the running speed and restricting the train speed to a control speed set according to the informed running pattern.

Incidentally, each of the aforementioned embodiments is configured so that timing signals are generated by the ground facility and the train, respectively, and that the propagation time is measured by synchronizing the transmission and reception of ultrasonic waves with each other. The present invention is not limited thereto. For example, the apparatus may be adapted so that an ultrasonic wave transmitting apparatus is added to the ground facility, while an ultrasonic wave receiving apparatus is added to the train, the ground facility first transmits ultrasonic waves and subsequently, when the train receives such ultrasonic waves, the transmitting apparatus of the train transmits ultrasonic waves as a reply without delay, which are then received by the receiving apparatus of the ground facility, and the propagation time required for the ultrasonic wave to propagate the distance between the train and the railroad crossing based on a time between a moment, at which the ultrasonic wave is transmitted by the ground facility, and a moment at which the ground facility receives the ultrasonic wave transmitted thereto as the reply. In this case, there is no need for synchronizing the ground facility and the train with each other. Incidentally, the function of amplifying ultrasonic wave signal may as well be imparted to a repeating process.

Furthermore, the apparatus may be configured so that ultrasonic waves are transmitted from the ground facility and thereafter, the speed and position of the train are detected by receiving reflection waves from the train.

Figure 14A:
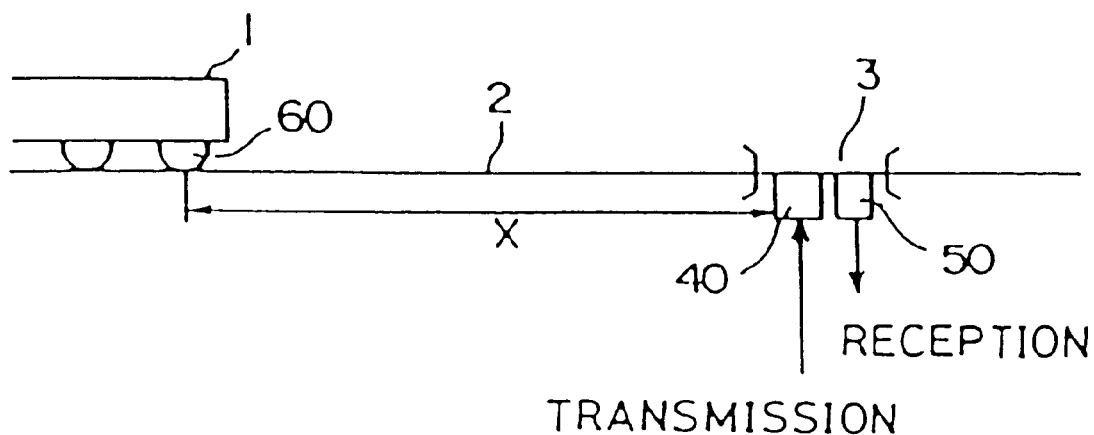
FIG. 14(A) is a diagram illustrating an example of the constitution in which ultrasonic waves are transmitted from a ground facility and a reflection wave from a train is received; and (B) a diagram showing a propagation time from the transmission to the reception.
Figure 14B:
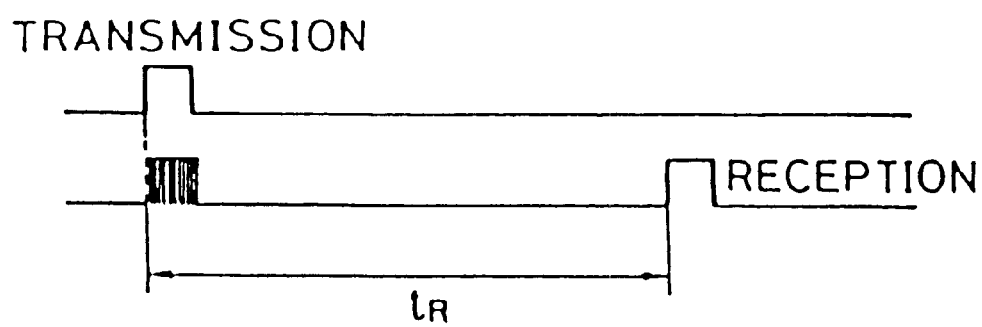

Namely, as shown in FIG. 14(A), an ultrasonic wave transmitting apparatus 40 and an ultrasonic wave receiving apparatus 50 are provided in portions of the rails 2 in the railroad crossing 3 at the side of the ground facility. Further, ultrasonic waves are transmitted at constant time intervals to the rails 2 from the ultrasonic wave transmitting apparatus 40. The ultrasonic waves are propagated through the rails 2 and are reflected by wheels 60 of the train 1. Then, the reflection waves are received by the ultrasonic wave receiving apparatus 50.

In this case, let x denote the distance between the railroad crossing and the train. Further, let tR designate the measured time between a moment, at which the transmission of ultrasonic waves is started, and a moment at which the ultrasonic waves are received. Furthermore, the measured time tR is given by:

$$t_R = 2x/C_m \qquad (9)$$

Thus, the distance x is obtained by:

$$x = t_R C_m / 2 \qquad (10)$$

Moreover, the train speed v can be obtained from the ultrasonic-wave generating period by using the equation (3).

Figure 15A:
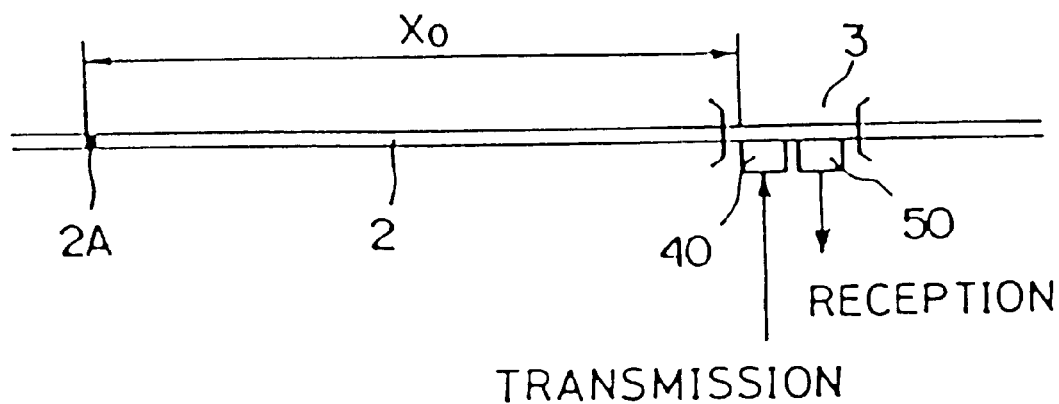
FIG. 15(A) is a diagram illustrating a check of the receiving ability of a receiving apparatus utilizing rail joints in the case of using the reflection wave; and (B) a diagram showing a propagation time from the transmission to the reception.
Figure 15B:
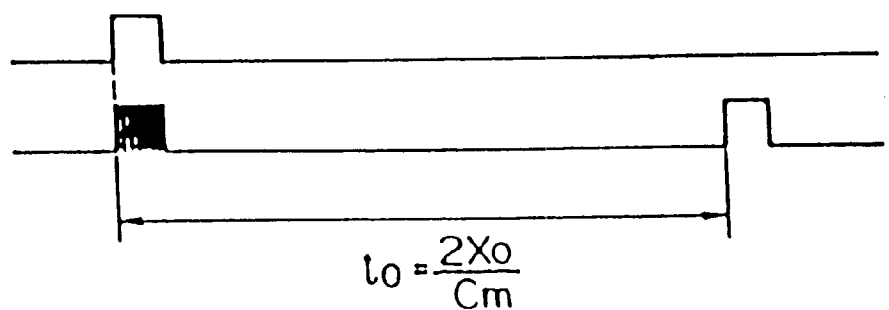

With such a constitution, the necessity for mounting the ultrasonic wave transmitting apparatus in the train is eliminated. Further, with such a constitution, for instance, when no train is present, the reception ability of the ultrasonic wave receiving apparatus 50 can be checked by utilizing a joint 2A of the rail 2, as illustrated in FIG. 15(A). The distance x0 to the joint 2A of the rail 2 is already known. Thus, as illustrated in FIG. 15(B), by verifying whether or not a reception signal is present at a predetermined time t0(=2x0/Cm), at which an ultrasonic wave reflected by the joint 2A is to be received after the ultrasonic waves are transmitted, it can be checked whether or not the receiving apparatus is normal.

Figure 16:
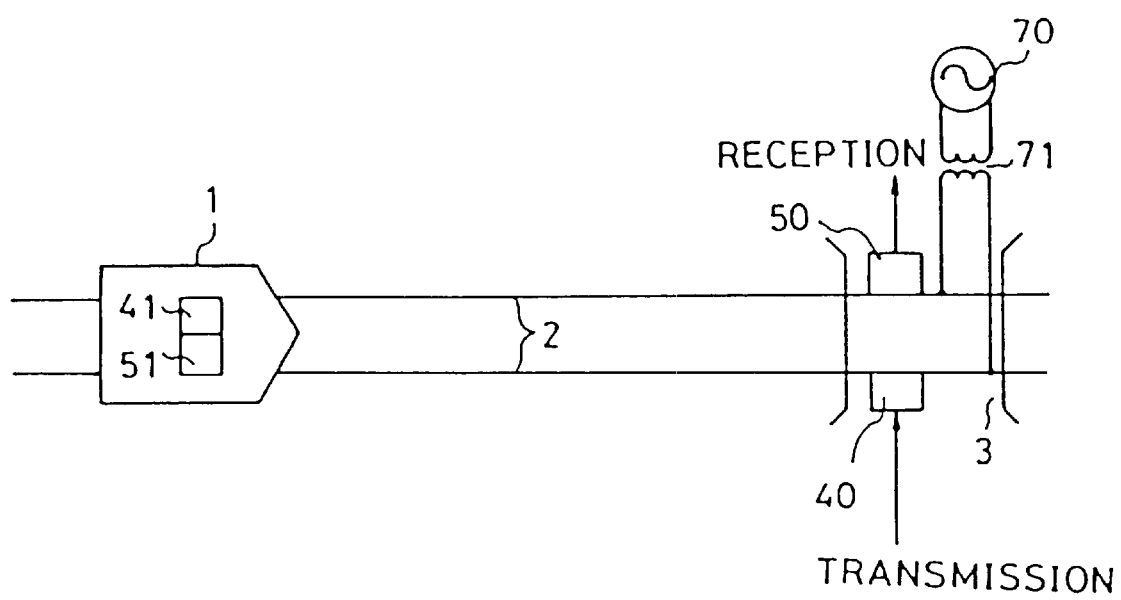
FIG. 16 is a diagram showing the constitution of still another embodiment of the railroad crossing control apparatus of the present invention.

Further, another embodiment is illustrated in FIG. 16 and will be described hereinbelow.

This embodiment is adapted so that electric signals are propagated through the rails together with ultrasonic waves.

As shown in FIG. 16, in the railroad crossing 3, the ultrasonic wave transmitting apparatus 40 and the ultrasonic wave receiving apparatus 50 are provided by bringing both of a transmitter and a receiver into contact with the rails 2. Moreover, a transmitter 70 for transmitting electric signals is connected to the rails 2 through a repeater 71. In the train 1, similarly, an ultrasonic wave transmitting apparatus 41 and an ultrasonic wave receiving apparatus 51 are provided. Moreover, a power receiver (not shown) for receiving electric signals is provided at a leading portion of the train by being directed to the rails. The transmitter and the receiver of the train 1 are provided therein by being directed toward the rails 2 in such a way as to be brought into non-contact therewith.

Next, an operation of the second embodiment will be described hereunder.

Ultrasonic wave and an electric signal are simultaneously transmitted to the train 1 through the rails 2 by the ultrasonic wave transmitting apparatus 40 and the transmitter 70 in the railroad crossing 3, which are synchronized with each other. The ultrasonic wave and the electric signal are different in propagation speed from each other. Thus, the distance from the railroad crossing 3 to the train 1 and the train speed can be calculated in the train 1 based on the time difference between the reception of the ultrasonic wave and that of the electric signal. When this distance and the train speed are calculated in the train 1, an electric signal representing a result of the calculation is transmitted from the train 1 to the railroad crossing 3 through the power receiver. Moreover, an ultrasonic wave is transmitted to the railroad crossing 3, simultaneously with the transmission of the result of the calculation. In a facility at the side of the railroad crossing 3, the distance from the train 1 to the railroad crossing 3 and the train speed are calculated based on the time difference between the receptions of the electric signal and the ultrasonic waver that are transmitted from the train 1. Further, information representing this distance and the train speed, which is transmitted from the train 1, is collated with the distance and the train speed, which are calculated in the facility provided at the railroad crossing 3. Incidentally, in the train 1, the train speed may be detected by using a vehicle-mounted tachogenerator.

Thus, each of the distance between the train 1 and the railroad crossing 3 and the train speed can be collated with the calculated distance and train speed and can be monitored at all times by combining an electric signal with an ultrasonic wave. Consequently, the reliability on the traversing inhibition timing control can be enhanced.

As above described, sounding operation start command information is generated by utilizing elastic waves. Thus, constrains on the speed of the train approaching the railroad crossing can be alleviated. Further, the efficiency in train operation can be enhanced. Moreover, the accuracy of the railroad crossing gate control operation can be improved. Furthermore, an alert time for vehicles and passengers, which traverse the railroad crossing, can be prevented from becoming longer than required.

Next, the cases of applying the present invention to an apparatus for detecting a mobile unit running on the movement path thereof will be described hereinbelow.

Figure 17:
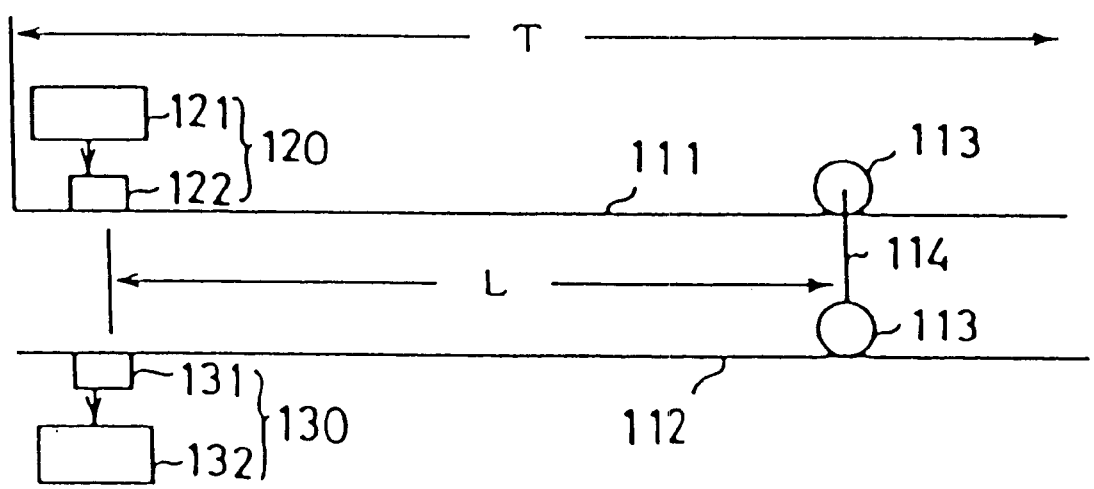
FIG. 17 is a diagram showing the constitution of a first embodiment in the case where the present invention is applied to a mobile unit detecting apparatus.

FIG. 17 is a diagram showing the constitution of a first embodiment in the case of applying the present invention to an apparatus for detecting a mobile unit.

As shown in FIG. 17, an ultrasonic wave transmitting apparatus 120 for transmitting, for example, ultrasonic waves as elastic waves is provided on one rail 111 of rails 111 and 112, which are parallel with each other, in a mobile unit detecting section T Further, an ultrasonic wave receiving apparatus 130 for receiving ultrasonic waves propagated through the other rail 112 is provided thereon.

Figure 18:
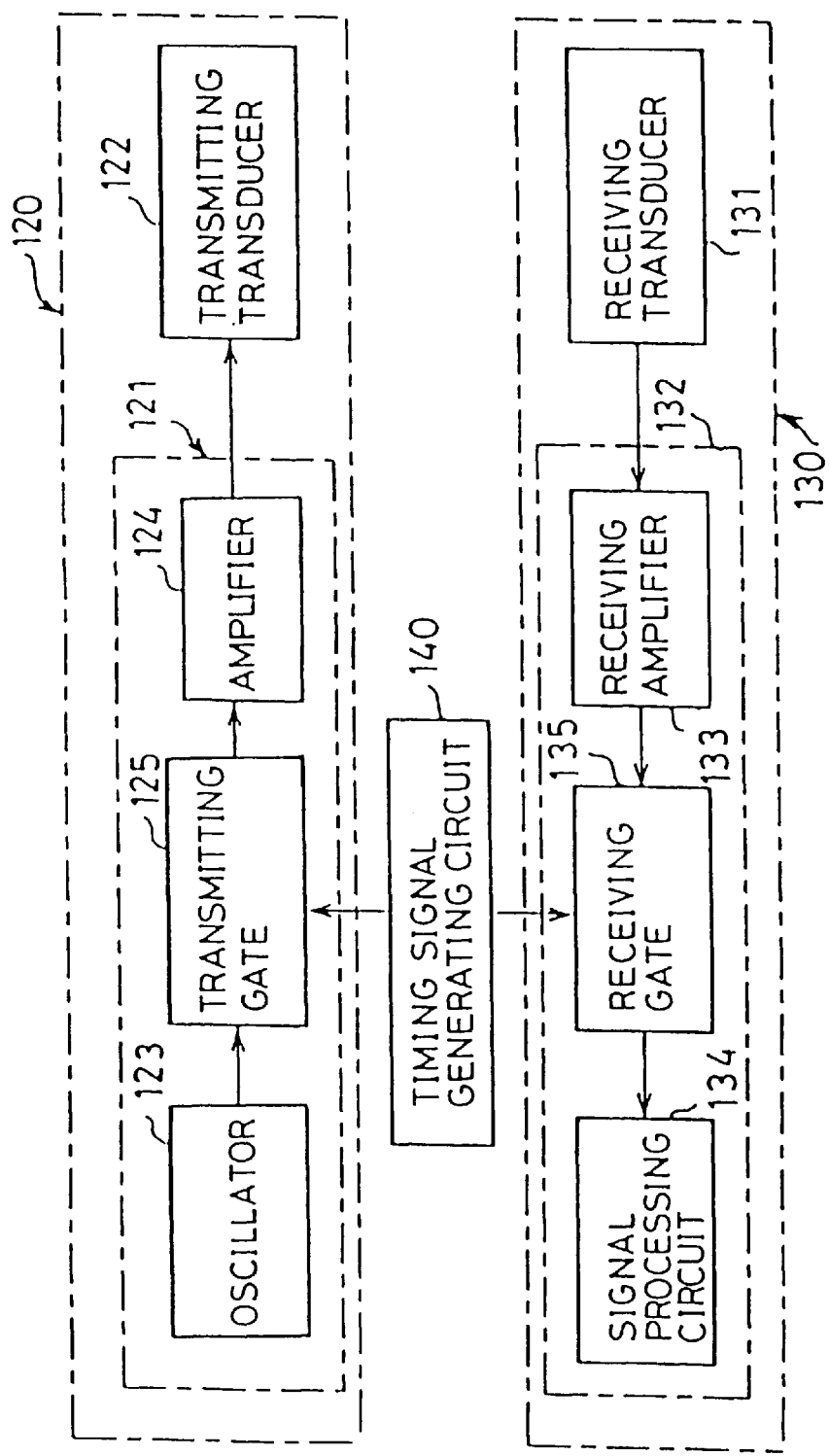
FIG. 18 is a diagram showing the constitution of each of a transmitting apparatus and a receiving apparatus of FIG. 17.

FIG. 18 shows an example of each of the ultrasonic wave transmitting apparatus 120 and the aforementioned ultrasonic wave receiving apparatus 130.

The ultrasonic wave transmitting apparatus 120 acting as an elastic wave transmitting device is composed of a main body 121 thereof; and a transmitting transducer 122, which is electric-signal/oscillation conversion device abutting against the rail 111 for transmitting ultrasonic waves to the rail 111 by converting an electric signal from the main body 121 into an oscillation. The aforementioned main body 121 of the transmitting apparatus consists of: an oscillator 123 for generating a high-frequency alternating current electric signal; an amplifier 124 for amplifying the alternating current electric signal and for transmitting the amplified electric signal to the transmitting transducer 122; and a transmitting gate 125 for controlling the timing with which the alternating current electric signal sent from the oscillator 123 to the amplifier 124 in response to the input of a timing signal generated by a timing signal generating circuit 140. For instance, a piezoelectric electrostrictive vibrator or a magnetostrictive vibrator can be used as the aforementioned transmitting transducer 122.

The ultrasonic wave receiving apparatus 130 acting as an elastic wave receiving device is comprised of a receiving transducer 131, which is oscillation/electric-signal conversion device abutting against the rail 112 for receiving ultrasonic waves, which are propagated through the rail 112, therefrom by converting an oscillation into an electric signal; and a main body 132 thereof for receiving an electric signal from the receiving transducer 131. The aforementioned main body 132 of the transmitting apparatus consists of: a receiving amplifier 133 for amplifying an electric signal sent from the receiving transducer 131; a signal processing circuit 134 for processing the amplified signal sent from the receiving amplifier 133 and for judging the presence of a train serving as the mobile unit and the position of the train; and a receiving gate 135 for controlling the timing with which the amplified signal sent from the receiving amplifier 133 is input to the signal processing circuit 134 in synchronization with the transmitting gate 125 in response to the input of a timing signal generated by a timing signal generating circuit 140. Incidentally, the aforementioned signal processing circuit 134 corresponds to the information generating device having the function of the detection device for detecting the presence/absence of the mobile unit.

Additionally, a method of measuring the propagation time of the ultrasonic waves by extracting a signal, which is delayed by a predetermined time, from reception signals after transmitting ultrasonic waves by using the timing signal generating circuit is not limited to that illustrated in FIG. 18 and is publicly known in general.

Next, an operation of this embodiment will be described hereinafter.

Alternating current electric signals generated in the main body 121 of the ultrasonic wave transmitting apparatus 120 are converted by the transmitting transducer 122 into ultrasonic waves and then, the ultrasonic waves are transmitted to the rail 111. Subsequently, the ultrasonic waves are propagated through the rail 111. In the case that no trains are present in the section T, since the ultrasonic waves propagated through the rail 111 are not transmitted to the rail 112, the ultrasonic waves are not received by the ultrasonic wave receiving apparatus 130. On the contrary, if a train is present in the section T, the rails 111 and 112 are connected to each other through the wheels 113 and the axle 114 of the train as shown in FIG. 17. Therefore, the ultrasonic waves propagated through the rail 111 are propagated to the rail 112 through the wheels 113 and the axle 114 and are then received by the ultrasonic wave receiving apparatus 130. Incidentally, the amplification of the ultrasonic wave signal may as well be performed in the train in this ultrasonic wave transmitting process. Namely, an ultrasonic wave signal received through the one rail 111 of the rails is amplified and then, the amplified signal is transmitted to the other rail 112.

Generally, the ultrasonic wave transmitting apparatus 120 and the ultrasonic wave receiving apparatus 130 compose a pulse radar. Therefore, in the signal processing circuit 134, the rail propagation speed of an ultrasonic wave is nearly constant and is previously stored in the apparatus. Then, the propagation time between a moment, at which an ultrasonic wave is transmitted, and a moment, at which the ultrasonic wave is received, is measured based on a timing signal generated by the timing signal generating circuit 140. Subsequently, the distance L illustrated in FIG. 17, namely, the distance L from the transmitting or receiving point to the train can be determined from the measured time and the stored value of the propagation speed according to the aforementioned equation (10).

By the mobile unit detecting apparatus having such a constitution, not only the presence/absence of a train but also the position of the train in the train detecting section T can be detected.

Further, as compared with an ultrasonic air radiation pulse radar adapted to measure such a distance by radiating ultrasonic waves into the air and receiving reflection waves from a mobile unit, the pulse radar system of this embodiment using the rails has many advantages as will be described hereinbelow.

First, the distance is measured accurately because of the fact that the propagation of ultrasonic waves is not affected by wind. Second, the notification of a result of a detection the position of a mobile unit can be achieved at a high speed because of the fact that the propagation speed of ultrasonic waves in the rail is higher than the propagation speed thereof in the air and that the time between a moment, at which the transmission of an ultrasonic wave is started, and a moment at which a result of detection of the position of a mobile unit is obtained, is shortened. Third, in the case of the system of the present invention, the distance can be measured with the running or travel path length of a mobile unit to good precision because of the facts that although the distance to a mobile unit is measured as a linear distance from an ultrasonic oscillation source, an ultrasonic wave is propagated along the rail and thus the distance can be measured in such a manner as to be equivalent to the length of the running locus of the mobile unit. Fourth, a range, in which a mobile unit is detected, is limited by the range of directional angles in the case of the ultrasonic air radiation pulse radar, whereas, in the case of the pulse radar of the present invention, there is not such limitation imposed on the range in which a mobile unit is detected.

In addition, in the case that rupture occurs in the rails 111 and 112, no ultrasonic waves are propagated, otherwise, the reflection of ultrasonic waves is caused on a ruptured surface. In this manner, a change in the propagation condition of ultrasonic waves is caused. Thus, rupture in the rails can be detected by detecting such a change. Incidentally, the detection of rupture in the rails using elastic waves will be described later.

Figure 19:
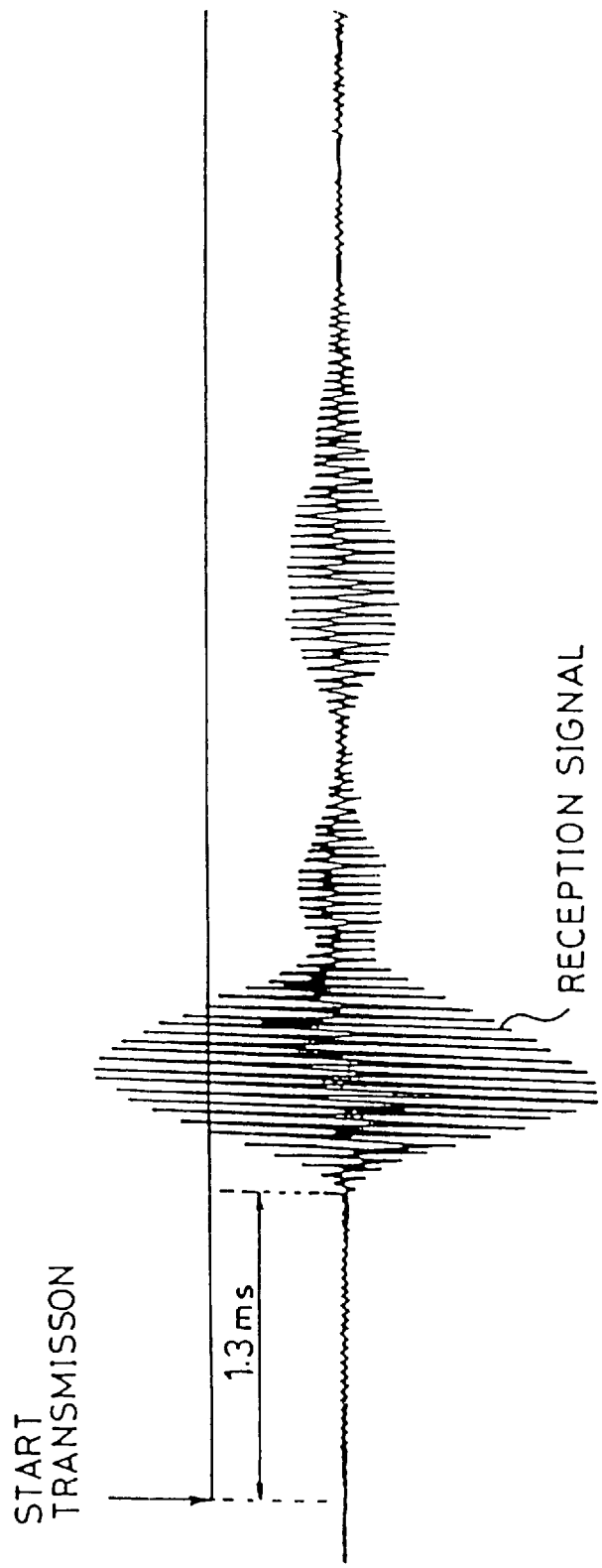
FIG. 19 is a waveform chart showing the waveform of a reception signal at the time when elastic waves are propagated through the rails.

FIG. 19 shows the manner of a reception signal at the time when the transmitting transducer and the receiving transducer are spaced and brought into abutting engagement with the rails and elastic waves are transmitted to the rails. Incidentally, elastic waves (or sounds) are transmitted in the rails as longitudinal waves.

Measurement conditions were as follows: the distance between the transmitting transducer and the receiving transducer was 3 m; the transmitting frequency of elastic waves was 25 kHz; and 20 pulses or so were transmitted. The waveform of the reception signal was obtained as a result of amplifying thereof with about 50 dB.

Time between the start of the transmission and the emergence of a reception signal was about 1.3 ms. Thus, the computed sound velocity in the rails was approximately 2.3 km/s. The result of this experiment reveals that the elastic waves could be transmitted and received through the rails.

Figure 20:
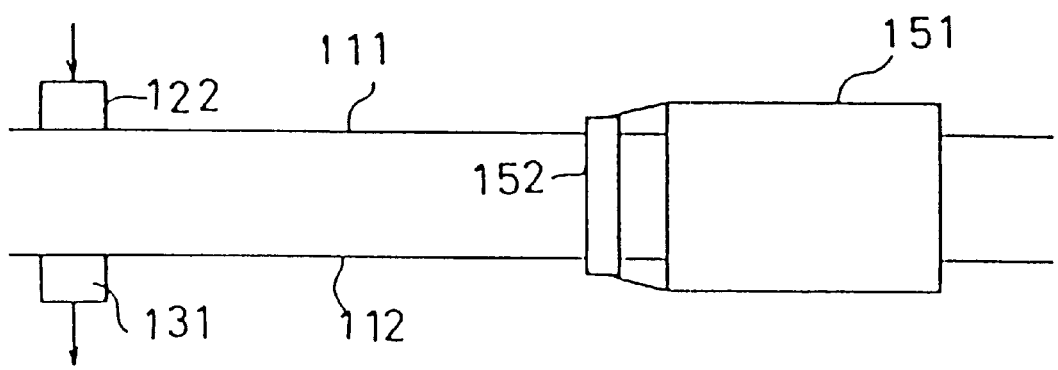
FIG. 20 is a diagram showing the constitution of a second embodiment of the mobile unit detecting apparatus of the present invention.

FIG. 20 illustrates a second embodiment of the mobile unit detecting apparatus of the present invention which will be described hereunder. Incidentally, like reference numerals designate same components of the first embodiment of the mobile unit detecting apparatus of the present invention and thus the description is omitted.

As shown in FIG. 20, in the case of this embodiment, the elastic wave propagated through the wheels and the axle is largely attenuated. Thus, for the purpose of alleviating such attenuation, a metallic plate 152 serving as a sliding contact member, which rides astride and slides on both of the rails 111 and 112, is attached to the front portion of the train 151 acting as the mobile unit.

With such a constitution, the metallic plate 152 connects between the rails 111 and 112 when the train 151 enters the train detection section T. Thus, ultrasonic waves transmitted from the transmitting transducer 122 to the rail 111 are propagated from the rail 111 to the rail 112 through the metallic plate 152 and are then received by the receiving transducer 131.

Figure 21:
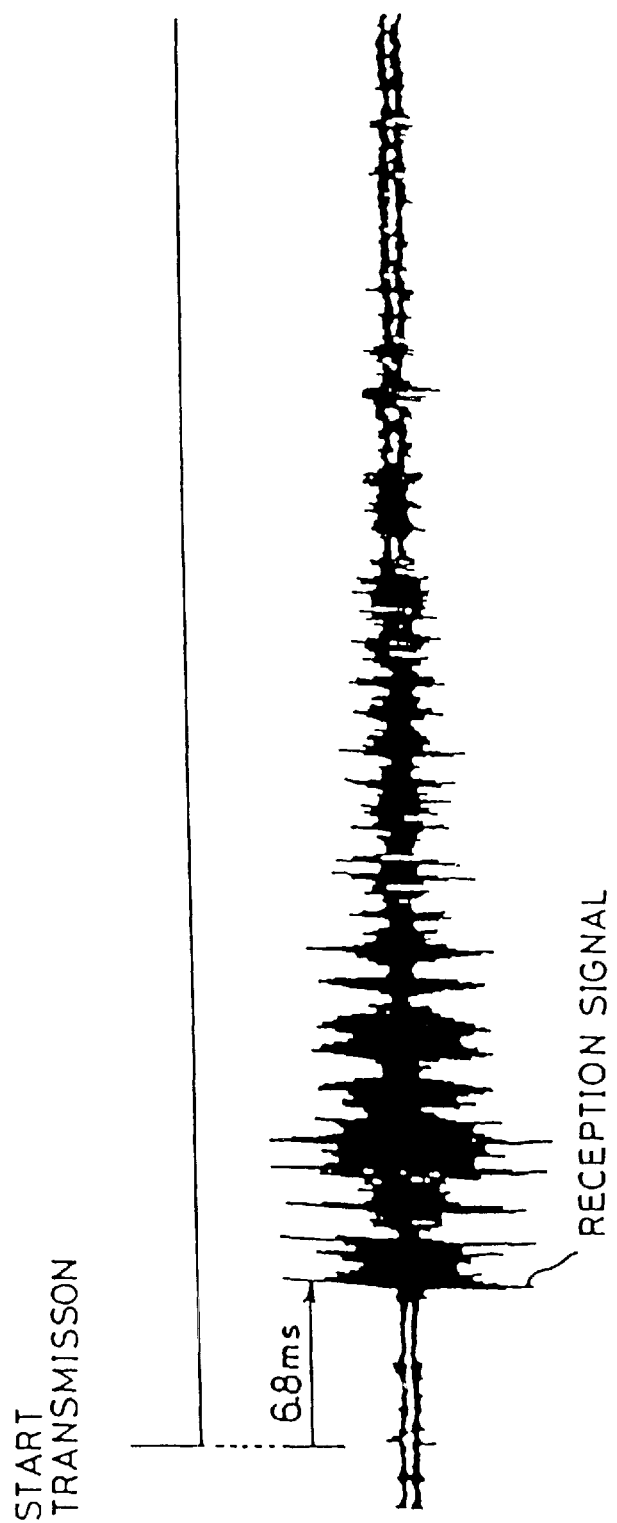
FIG. 21 is a waveform chart showing the waveform of a reception signal at the time when elastic waves are propagated by connecting between rails through the use of an iron plate.
Figure 22:
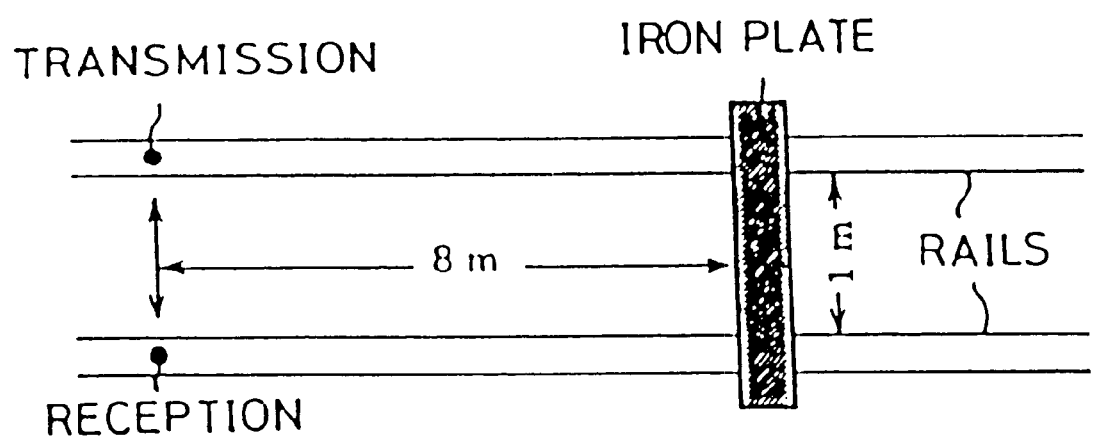
FIG. 22 is a diagram illustrating experiment conditions in the case of FIG. 21.

FIG. 21 shows the manner of a reception signal at the time when the metallic plate is pressed between the rails and the transmitting transducer and the receiving transducer are pushed against the running surfaces of the rails.

Measurement conditions were as follows: the distance between the rails was about 1 m. Further, an iron plate of several tens Kg was pressed against the running surfaces of the rails. Moreover, the measurement was performed by pushing the transmitting transducer and the receiving transducer against parts of the running surfaces of the rails, which were at a distance of about 8 m from the iron plate. Furthermore, the transmitting and receiving conditions for transmitting and receiving elastic waves are similar to those in the case of the experiment illustrated in FIG. 19. Namely, the frequency of elastic waves was 25 kHz, and 20 pulses or so were transmitted. The waveform of the reception signal was obtained as a result of amplifying thereof with about 50 dB.

As a consequence, the time delay between the initiation of the transmission and the emergence of the reception signal is 6.8 ms. Assuming that the sound velocity in the rail was 2.3 km/s, the path length obtained from the propagation time of the elastic wave is 6.8×2.3=15.7 (incidentally, the actual path length was 8+1+8=17 m).

Results of such an experiment exhibits that elastic waves are propagated through the rails even if a metallic material is pushed against the rails at a predetermined pressure or more and connects between the rails.

Figure 23:
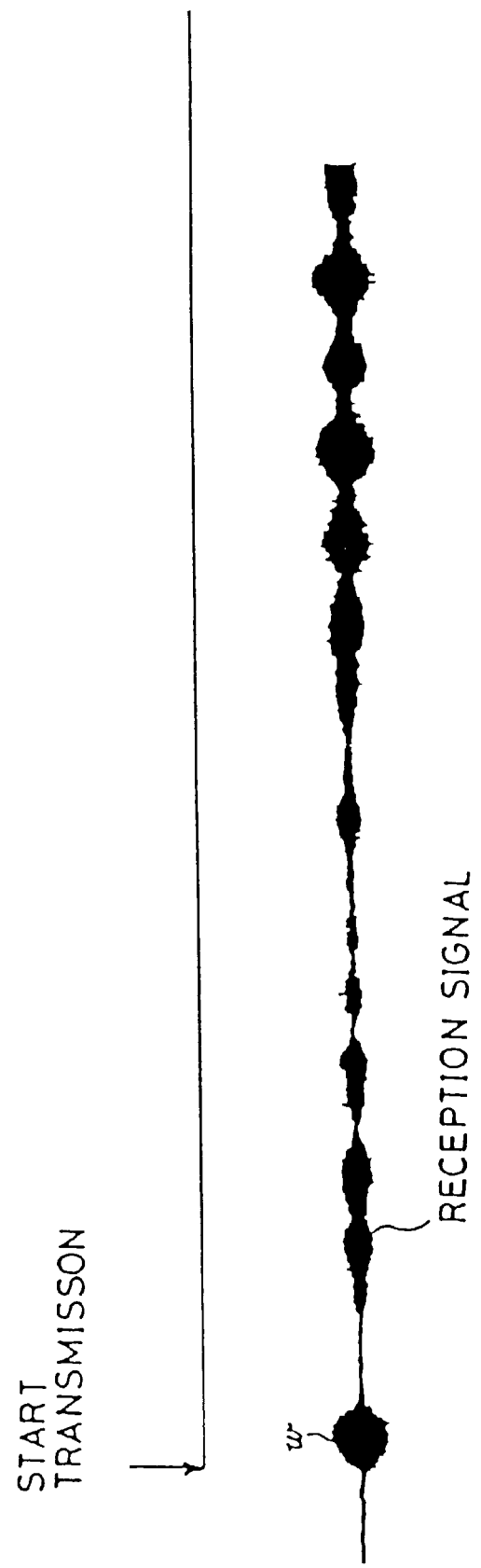
FIG. 23 is a waveform chart showing the waveform of a reception signal at the time when elastic waves are propagated through wheels of the train.

FIG. 23 shows the manner of a reception signal in the case that elastic waves are propagated through the rails by way of the wheel portions of the current train.

Process of the measurement was as follows. Namely, a transmitting transducer and a receiving transducer were directly pushed against the running surface of one of the wheels and against the running surface of the other wheel of the actually used train, respectively. Thus, an ultrasonic wave was propagated from one of the wheels to the other wheel through the axle. Transmission condition and the receiving condition of ultrasonic waves were set in such a manner as to be similar to those in the case of the experiment illustrated in FIG. 19.

Structure of the wheel portion of the currently used train is very complex. As is seen from FIG. 23, elastic waves are largely attenuated in the process of the propagation thereof from one of the wheels to the other wheel. Incidentally, the waveform of a signal ω appearing immediately after the transmission of an elastic wave corresponds to a leakage of a transmission signal, which is resulted from the electric connection (namely, the electrostatic coupling) between the transmitting transducer and the receiving transducer.

As is understood from the results of the experiments respectively illustrated in FIGS. 21 and 23, the second embodiment of the mobile unit detection apparatus, which is illustrated in FIG. 20 and a metallic sliding contact member is provided at the front portion of the train and is made to slide and touch the rails and ultrasonic waves are propagated through this sliding contact member, has better propagation characteristic and is more desirable for detecting the presence and position of a train.

Figure 54:
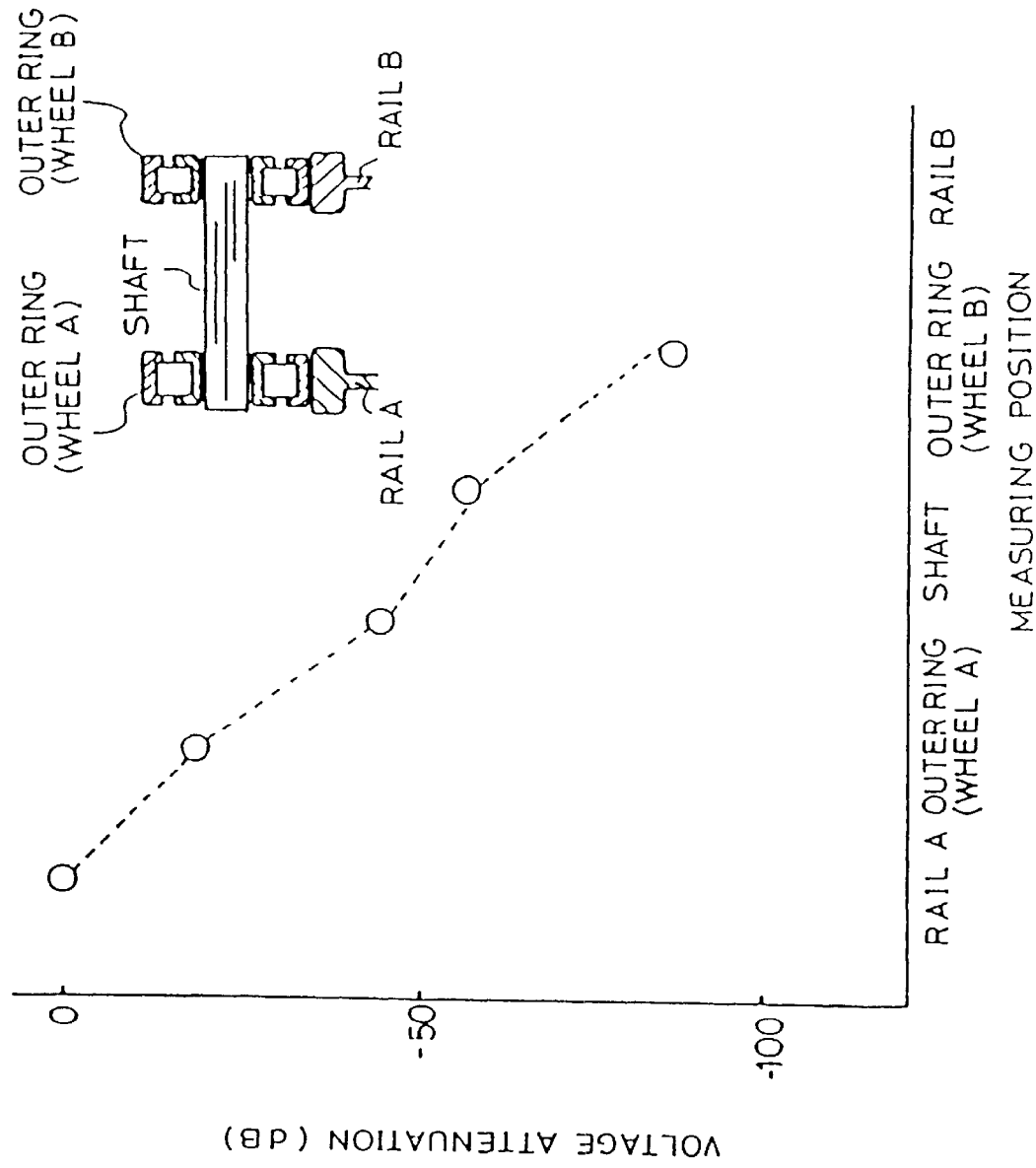
FIG. 54 is a graph illustrating the inter-rail elastic wave propagation characteristic in the case that the rails are intervened by the wheel and shaft of the train.

Incidentally, FIG. 54 is a graph illustrating results of measurement of the elastic wave propagation characteristics in the case where the propagation path was established in such a manner as to connect a rail A through a bearing outer ring (namely, a wheel) A, a bearing, a shaft, a bearing and a bearing outer ring (namely, a wheel) B to a rail B as illustrated in this figure. If the shaft is fixed to the mobile unit, the shaft corresponds to a supporting portion of a wheel. This case corresponds to the case that an elastic wave propagated from one rail A of the rails through the supporting portion to the other rail B. Elastic wave is attenuated in both of a part between the rail and the bearing outer ring (namely; a wheel) and a part between the bearing outer ring (namely, the wheel) and the shaft (namely, a bearing inner ring). As shown in FIG. 54, in a propagation path between the rail A and the shaft, the elastic wave is attenuated by about 50 dB. Further, in a propagation path between the shaft and the rail B, the elastic wave is attenuated by 40 dB or so. Thus, in a propagation path between the rails A and B, the elastic wave is attenuated by 90 dB or so. Furthermore, in the case that the two wheels are connected with each other directly by using the shaft without using the bearings, elastic waves are propagated through the path connecting the rail A, the wheel A, the shaft, the wheel B and the rail B. Therefore, in this case, it is conjectured that the elastic wave is attenuated by about 50 dB or so between the rails A and B.

Figure 24:
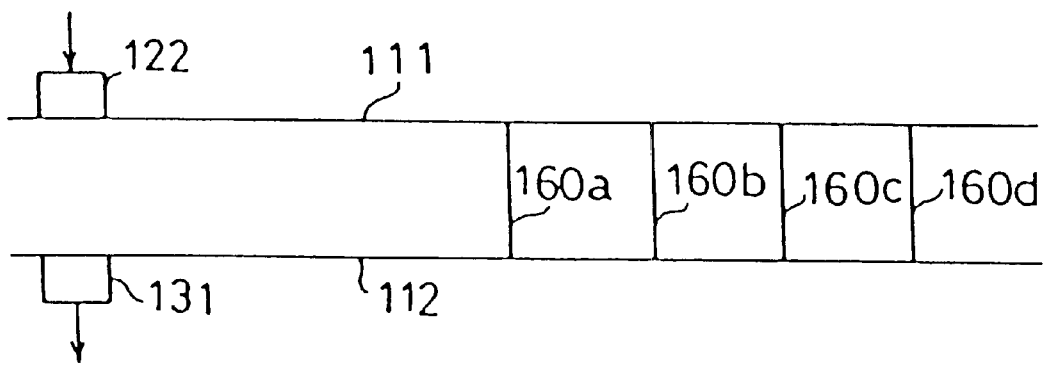
FIG. 24 is a diagram showing the constitution of a third embodiment of the mobile unit detecting apparatus of the present invention.

Referring next to FIG. 24, there is shown a third embodiment of the mobile unit detecting apparatus of the present invention. Incidentally, in this figure, like reference numeral designates like components of the first embodiment illustrated in FIG. 17. Thus, the description of such components will be omitted herein.

As shown in FIG. 24, a plurality of connecting members 160a, 160b, 160c and 160d, which are made of a same material and are used to connect between the rails 111 and 112, are provided in such a way as to be away from the transmitting transducer 122 of the ultrasonic wave transmitting apparatus 120, which abuts against the rail 111, and the receiving transducer 131 of the ultrasonic wave receiving apparatus 130, which abuts against the rail 112, by previously set distances, respectively. Further, the intervals among the connecting members 160a, 160b, 160c and 160d are established, for instance, at a same value. Incidentally, although this figure illustrates the case that the number of the connecting members is 4, needless to say, the number of the connecting members is not limited thereto.

Next, an operation of the third embodiment of the mobile unit detecting apparatus will be described hereunder.

Ultrasonic waves transmitted from the transmitting transducer 122 to the rail 111 are propagated to the receiving transducer 131 through each of the connecting members 160a, 160b, 160c and 160d. The connecting members 160a, 160b, 160c and 160d are made of the same material, so that the propagation speeds of ultrasonic waves respectively are nearly equal to one another. Let Sa, Sb, Sc and Sd denote reception signals respectively obtained through the connecting members 160a, 160b, 160c and 160d. Thus, the reception signals Sa, Sb, Sc and Sd are received in this order by the receiving transducer 131 with time delays respectively corresponding to the intervals among the connecting members. If the train approaches the railroad crossing from the right as viewed in this figure, when the train passes through a part between the mounting positions of the adjacent connecting members, a reception signal, to which a signal component due to the wheel/the axle of the train or to an inter-rail ultrasonic wave transmitting medium provided therein is added, is received. Distances from the transmitting/receiving apparatuses to the connecting members 160a, 160b, 160c and 160d and the length (corresponding to the distance between the rails) of each of the connecting members 160a, 160b, 160c and 160d are already known. Thus, the propagation time of each of the reception signals Sa, Sb, Sc and Sd is already known. Therefore, the position of the train is determined between the adjoining ones of the connecting members 160a, 160b, 160c and 160d. Consequently, the reliability of detection of the position of a train can be enhanced.

Figure 25:
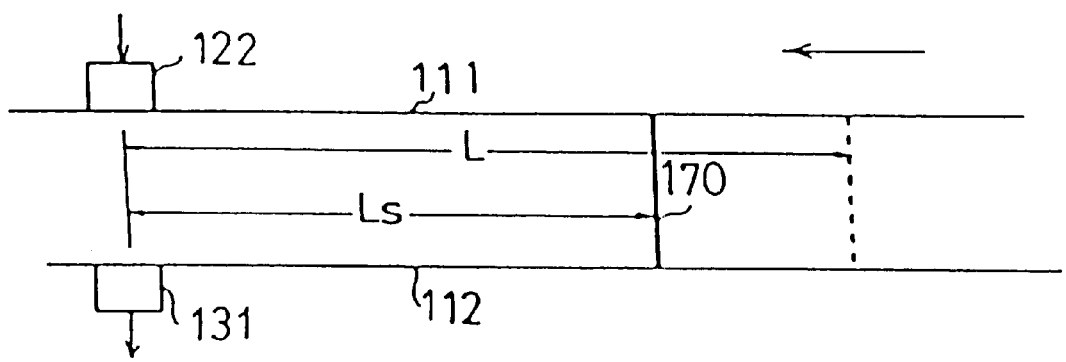
FIG. 25 is a diagram showing the constitution of a fourth embodiment of the mobile unit detecting apparatus of the present invention.

FIG. 25 shows a fourth embodiment of the mobile unit detecting apparatus. Incidentally, in this figure, like reference numeral designates like components of the first embodiment. Thus, the description of such components will be omitted herein.

As shown in FIG. 25, a connecting member 170 for compensating the detected position of a mobile unit, which permits ultrasonic waves to be propagated therethrough, is provided at a preset reference distance Ls from the transmitting transducer 122 and the receiving transducer 131 and is used to connect between the rails 111 and 112. The ultrasonic wave propagation characteristics of the rails 111 and 112 vary with a change in ambient conditions, especially, in ambient temperature. The aforementioned connecting member 170 is used to compensate the measured position of a mobile unit when the propagation characteristics of the rails 111 and 112 varies with a change in temperature and so forth.

Next, an operation of the fourth embodiment of the mobile unit detecting apparatus will be described hereinbelow.

Ultrasonic waves transmitted from the transmitting transducer 122 to the rail 111 are propagated to the rail 112 through the connecting member 170 and are then received by the receiving transducer 131. At that time, the propagation time of the ultrasonic wave corresponds to the preset distance Ls to the connecting member 170.

Incidentally, it is now assumed that ta designates a propagation time in accordance with the standard time in the case of propagating ultrasonic waves through the connecting member 170 and tb denotes the propagation time of a reception signal obtained by connecting the rails 111 and 112 at a position, which is indicated by a dashed line, by a train approaching the railroad crossing, the position L of the train (namely, the distance from the transmitting/receiving point to the train) is given by the following equation:

$$L = tb \times Ls/ta \quad (11)$$

Incidentally, it is supposed that the ultrasonic wave propagation speed characteristic of the connecting member 170 is nearly the same as of the train.

When the propagation time of an ultrasonic wave propagated through the connecting member 170 varies by $\pm \Delta ta$ with a change in temperature or the like, the distance L is given by:

$$L = tb \times Ls/(ta \pm \Delta ta) \quad (12)$$

Thus, the position of the train can be measured based on the change in the propagation time of the reception signal through the connecting member 170 by employing the position of the connecting member 170 as a reference.

With such a constitution, this embodiment has an advantage in that the position of the train can be detected accurately without being affected by the change in the ultrasonic wave propagation speed characteristic of the rails 111 and 112.

Further, for instance, in the railroad crossing gate control system, it is sometimes demanded to know that a train approaches a predetermined distance from a railroad crossing. In the case of wishing to know that a train passes through a train position to be detected, namely, a place which is at a predetermined distance from the transmitting/receiving point in this manner, the connecting member 170 of FIG. 25 is mounted on the rails at a place which is at a predetermined distance therefrom.

Figure 26:
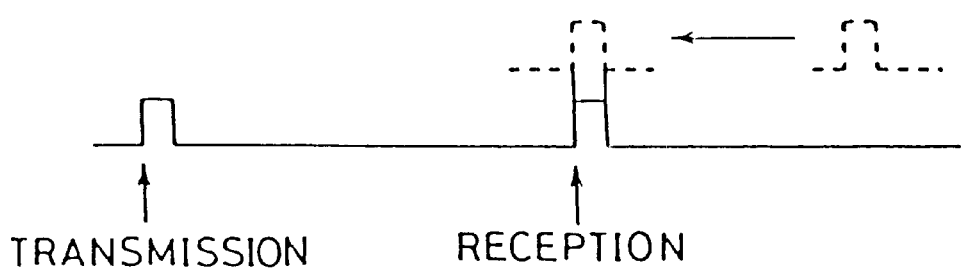
FIG. 26 is a diagram illustrating an example of a mobile unit detecting operation at the time when specifying the detection position of the mobile unit.

With such a constitution, as shown in FIG. 26, the propagation time of a reception signal (indicated by dashed lines in FIG. 25) from the train, which approaches the connecting member 170 from afar, is reduced as the train comes closer there. When the train passes through the point, at which the connecting member 170 is placed, the propagation time of such a reception signal is matched with that of a reception signal passed through the connecting member 170 (indicated by solid lines in FIG. 26). Thus, whether or not the train reaches the point, which is at the aforesaid predetermined distance, can be detected only by detecting whether or not the reception signal propagated through the connecting member 170 is matched with the reception signal propagated through the train. Therefore, there is no necessity for computing the distance by using the propagation time. Consequently, the detection of the position of a train can be achieved extremely easily.

Incidentally, in this case, a circuit for notifying the position of a train may as well be configured so that, for instance, the reception signal propagated through the connecting member and the reception signal propagated through the train are input to an AND gate, that when an output of the AND gate becomes logical value "1", this circuit generates a notification signal indicating that the train reaches the place which is at the predetermined distance.

Meanwhile, if the rails are connected by using a non-metallic material in place of a metallic material such as an iron plate, the ultrasonic wave propagation time can be extended. Thus, the reception of an ultrasonic signal can be delayed substantially. Therefore, the connecting member can be utilized as a delay element by forming the connecting member by the use of a non-metallic material.

When wishing to know that the train reaches a place which is at the predetermined distance, the connecting member can be placed at a place which is closer to a receiving point than the place which is at the predetermined distance, if a material whose ultrasonic wave propagation speed is lower than those of the materials of the train and the rail, for example, a non-metallic material is used as the material of the connecting member.

For instance, the connecting member is placed in such a manner as to be close to the transmitting transducer and the receiving transducer. Further, the propagation speed characteristic of the connecting member is selected so that the propagation time of an ultrasonic wave propagated through the connecting member is equal to the propagation time of an ultrasonic wave propagated through the train.

With such a configuration, whether or not the train reaches a predetermined, can be detected only by sensing whether or not the reception signal propagated through the connecting member is matched with the reception signal propagated through the train, similarly as in the aforementioned case. In addition, the connecting member can be positioned at a place, which is closer to the transmitting/receiving point than the point where a train is actually detected, by utilizing the connecting member as a delay element. Thus, this embodiment has advantages in that an installation operation of the apparatus and a maintenance operation thereof after the installation are facilitated.

Figure 27:
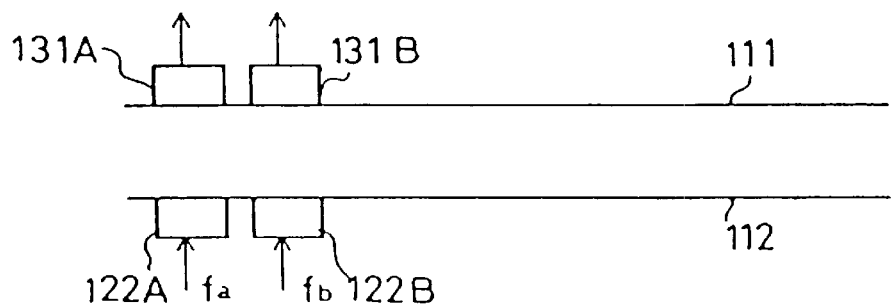
FIG. 27 is a diagram showing a constitution of the apparatus in the case of reducing the influence of a reflection wave on end surfaces of the rails.
Figure 28:
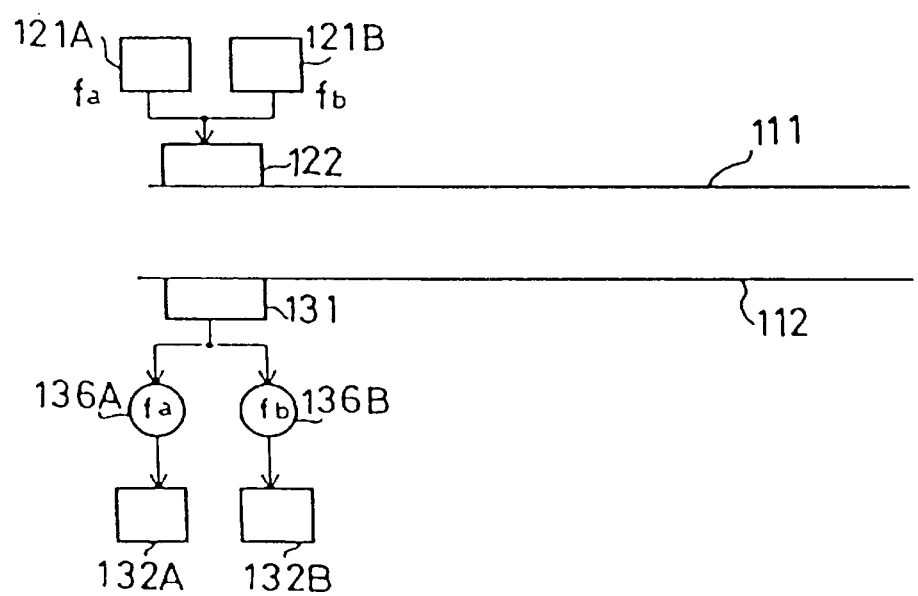
FIG. 28 is a diagram showing another constitution of the apparatus in the case of reducing the influence of a reflection wave on end surfaces of the rails.

Meanwhile, in the case that elastic waves are propagated to the rail in the apparatus having the constitution of FIG. 17, a reflection wave reflected at an end of the rail is received. This reflection wave is difficult to attenuate, because reverberations are present as a result of the reflections of this wave occurring at both ends of the rail. To reduce the influence of this reflection wave, it is suffice to constitute the apparatus as illustrated in FIG. 27 or 28. Incidentally, in these figures, like reference numerals denote like components illustrated in FIG. 17. Thus, the description of such components is omitted herein.

In FIG. 27, a plurality of sets, for instance, 2 sets of ultrasonic wave transmitting apparatuses and ultrasonic wave receiving apparatuses are provided therein. Further, the ultrasonic wave transmitting frequencies of the respective sets are set in such a way as to be different from one another. Moreover, ultrasonic waves having a frequency fa are transmitted from a transmitting transducer 122A of one of the transmitting apparatuses, while ultrasonic waves having a frequency fb are transmitted from a transmitting transducer 122B of the other transmitting apparatus.

With such a constitution, the apparatus may as well be adapted so that transmission pulses are transmitted in sequence at different moments from the transmitting transducers 122A and 122B and the position of a train is measured by using first reception signals corresponding to the transmission pulses transmitted from the transducers, respectively.

In FIG. 28, a single transmitting transducer 122 and a single receiving transducer 131 are used in common by the transmitting and receiving apparatuses. In the transmitting apparatus, two main bodies 121A and 121B thereof, which are operative to generate electric signals having different transmitting frequencies fa and fb, respectively, are provided. On the other hand, in the receiving apparatus, two filters 136A and 136B, which are operative to discriminate the frequencies fa and fb, respectively, and two main bodies thereof 132A and 132B, to which signals output from the filters 136A and 136B are input, respectively.

Transmitting and receiving operations are the same as that of the embodiment shown in FIG. 27, and thus the description of the transmitting and receiving operations of the embodiment of FIG. 28 is omitted herein.

With the constitutions of FIGS. 27 and 28, the number of received reflection waves can be increased, in comparison with the case of utilizing a single frequency. Consequently, the train detection accuracy can be enhanced.

Incidentally, the apparatus may be adapted so that the detection of a train is performed by providing the transmitting transducer at an end portion of one of a pair of the rails in a train detecting section, and providing the receiving transducer at the other end portion thereof. In such a constitution, when no train is present in the section, ultrasonic waves transmitted from the transmitting transducer to the rail are received by the receiving transducer almost without being attenuated. On the other hand, when a train is present, similarly, ultrasonic waves are received by the receiving transducer, but the transmission loss of ultrasonic waves is increased due to the train wheel on a pair of rails, so that the signal level of a reception signal is lowered. Therefore, the presence/absence of a train can be judged by performing a level check by comparing the received signal level of the reception signal with a previously set threshold value. However, in such a constitution, the position of a train cannot be specified.

Further, in the case of the detection of a train by using elastic waves, there is no necessity for forming a closed loop configuration like a track circuit, the detection of a train can be achieved by using only one rail. Consequently, the detection of a train in a point can be realized, as shown in FIG. 29.

Figure 29:
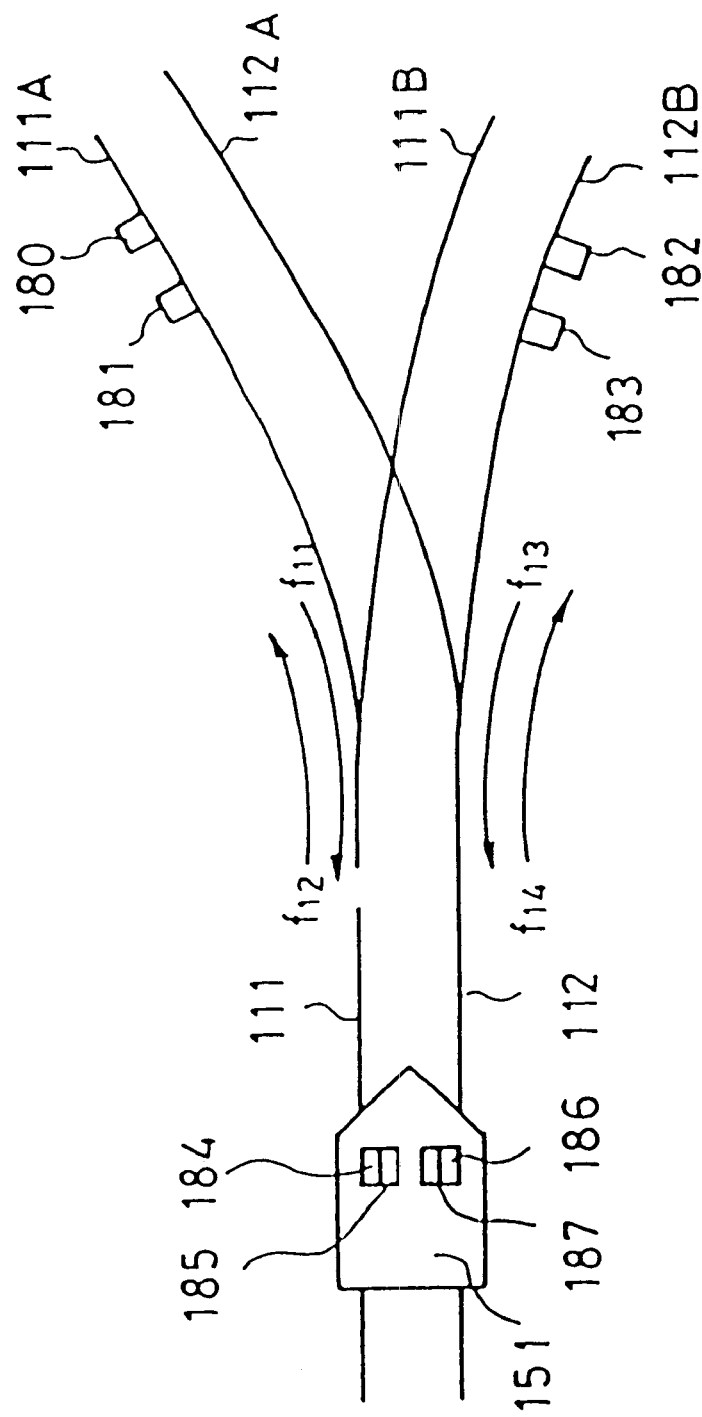
FIG. 29 is a diagram illustrating an example of a train detection operation at a point portion.

In FIG. 29, it is assumed that the rails 111 and 112 are branched into a pair of rails 111A and 112A and a pair of rails 111B and 112B, respectively. Further, an ultrasonic wave transmitting apparatus 180 and an ultrasonic wave receiving apparatus 181 are provided on the rail 111A. Furthermore, an ultrasonic wave transmitting apparatus 182 and an ultrasonic wave receiving apparatus 183 are provided on the rail 112B. On the other hand, ultrasonic wave transmitting apparatuses 184 and 186 and ultrasonic wave receiving apparatuses 185 and 187 are provided in the train 151. Moreover, the transmitting frequencies of the ultrasonic wave transmitting apparatuses 180, 184, 182 and 186 are made to be different from one another, and are $f_{11}$, $f_{12}$, $f_{13}$ and $f_{14}$, respectively.

With such a constitution, ultrasonic waves are transmitted at frequencies $f_{11}$ and $f_{13}$ from the ultrasonic wave transmitting apparatuses 180 and 182 to the train 151 through the rails 111A and 112B, respectively. When the train receives the aforementioned ultrasonic wave signals at frequencies $f_{11}$ and $f_{13}$, ultrasonic wave signals are transmitted from the ultrasonic wave transmitting apparatuses 184 and 186 at frequencies $f_{12}$ and $f_{14}$ through the rails 111A and 112B without delay, respectively.

With such a constitution, even at the point portions at each of which the rails are branched, the train 151 can be detected at each of a set of branch rails 111A and 112A and a set of branch rails 111B and 112B.

As above described, a mobile unit can be detected by using elastic waves. Further, the position of a mobile unit can be detected by measuring the propagation time of a reception signal. Moreover, as compared with the system for detecting a mobile unit by utilizing the reflection of an elastic wave radiated in the air, the propagation of an elastic wave is not affected by wind and thus the accuracy of detecting the position of a mobile unit is high. Furthermore, the propagation speed of an elastic wave is high, so that the notification of a result of detection of the position of a mobile unit can be performed at a high speed. Additionally, because an elastic wave is propagated along the rails in this embodiment, high-precision distance measurement along a running locus can be achieved. Besides, this embodiment has many merits, for example, in that, even in a point portion at which a rail is branched, a train can be detected at an individual branch rail.

Figure 30:
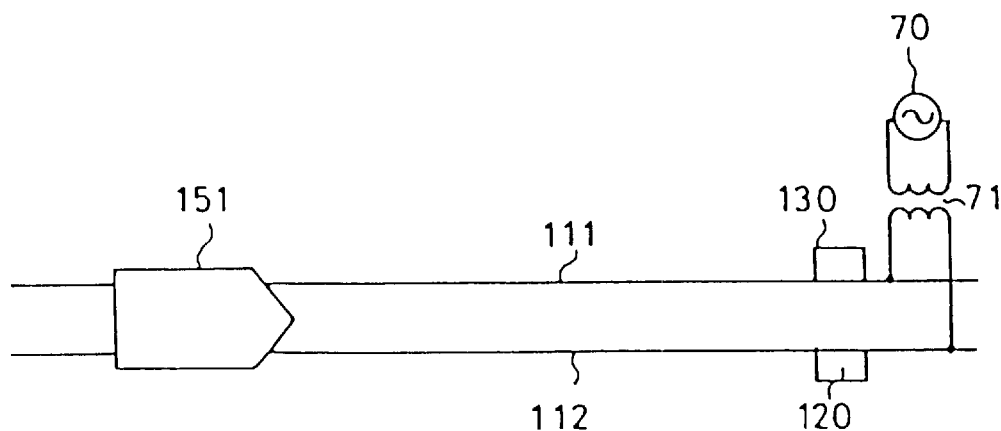
FIG. 30 is a diagram showing the configuration of an embodiment using both of a method of detecting a train by using ultrasonic waves and a method of detecting a train by using a track circuit.

Referring next to FIG. 30, there is illustrated an embodiment, which employs both of a train detecting system using ultrasonic waves and a conventional train detecting system using a track circuit and which will be described hereinbelow.

As shown in FIG. 30, for instance, the ultrasonic wave transmitting apparatus 120 is provided on the rail 112, while the ultrasonic wave receiving apparatus 130 is provided on the rail 111. Further, a transmitter 70 is connected through a repeater 71 to the rails 111 and 112 in a terminating end portion, from which the train leaves, of a block section, similarly as in the case of the conventional track circuit. Incidentally, a track relay is connected to the rails 111 and 112 in a beginning end portion (not shown), where the train enters, of the block section.

Next, an operation of this embodiment will be described hereinbelow.

When the train 151 is not present in the block section, an electric signal is transmitted from the transmitter 70 to the beginning end portion of the block section, so that the track relay is raised and a signal indicating the absence of a train is generated. Further, ultrasonic waves transmitted from the ultrasonic wave transmitting apparatus 120 are not received by the ultrasonic wave receiving apparatus 130, as above described.

In contrast, when the train 151 enters the block section, the rails 111 and 112 are short-circuited by the wheels. As a result, the track relay falls, so that the train is detected. Moreover, ultrasonic waves transmitted from the ultrasonic wave transmitting apparatus 180 to the rail 112 are propagated to the rail 111 through the wheels and the axle of the train 151 and are received by the ultrasonic wave receiving apparatus 130. Consequently, the presence of the train is known.

In the case of the train detecting system of detecting a train according to the presence/absence of an electric signal based on the short-circuit of a track similarly in the case of the conventional track circuit, it is difficult to configure a duplex train detecting system. However, a duplex train detecting system can be easily constituted by using ultrasonic waves and employing both of the conventional track detecting system and the train detecting system using ultrasonic waves, according to this embodiment. Further, as a result of using ultrasonic waves, both of the position and speed of the train 151 can be detected as above described. Thus, the reliability of the train detecting system can be enhanced. In addition, the efficiency of the train operation can be increased.

Figure 31:
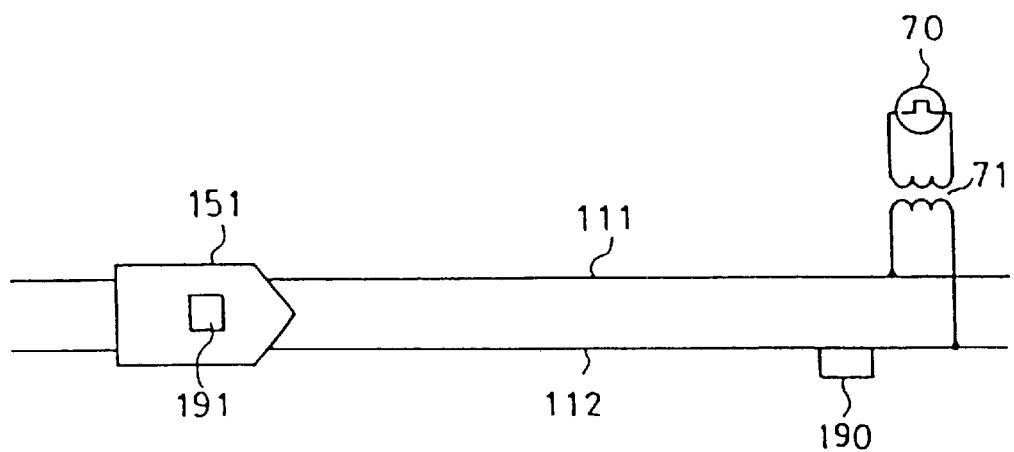
FIG. 31 is a diagram showing the constitution of another embodiment of the train detecting apparatus of the present invention.

Moreover, as illustrated in FIG. 31, an ultrasonic wave transmitting apparatus 190 is provided on the rail 112, while an ultrasonic wave receiving apparatus 191 is provided in the train 151. Furthermore, the transmitter 70 for transmitting electric signals is connected to the rails 111 and 112. Additionally, the aforementioned ultrasonic wave transmitting apparatus 190 and the transmitter 70 are synchronized with each other and transmit an ultrasonic wave and an electric signal, respectively. Incidentally, the ultrasonic wave transmitting apparatus 190 and the ultrasonic wave receiving apparatus 191 of this embodiment may be asynchronous with each other. Thus, the transmitting gate 125 and the receiving gate 135 of FIG. 18 are unnecessary.

In such a constitution, an ultrasonic wave and an electric signal are simultaneously transmitted from the ultrasonic wave transmitting apparatus 190 and the transmitter 70 to the train 151 through the rails, respectively. The ultrasonic wave is different in propagation speed from the electric signal. Thus, in the train 151, the distance from the ultrasonic wave transmitting apparatus 190 to the train 151 and the speed of the train 151 can be calculated based on the time difference between a moment, at which the ultrasonic wave is received, and a moment at which the electric signal is received.

Therefore, a direction center for managing train operations provided in the ground facility, can keep track of the position of each train by transmitting information on the calculated position and information on the calculated speed of the train thereto. Thereby, a train can obtain information on the position and speed of a precedent train continuously by transmitting an ultrasonic wave or an electric signal, on which precedent train information is superimposed, to the train. Thus, if a train can keep track of its own position and the position of a precedent train continuously, a movement block system can be realized. Moreover, efficient train operation control can be achieved.

Incidentally, in the constitution of FIG. 31, accurate notices concerning the approach of a train and other kinds of information (concerning the degree of congestion, an upset of the train schedule, an accident and a trouble) can be provided to passengers at each station by transmitting information on the position and speed of a train, which has been transmitted to the direction center, from the direction center to each station.

Next, the case, in which the present invention is applied to the detection of rupture in the movement path of a mobile unit, will be described hereunder.

Figure 32:
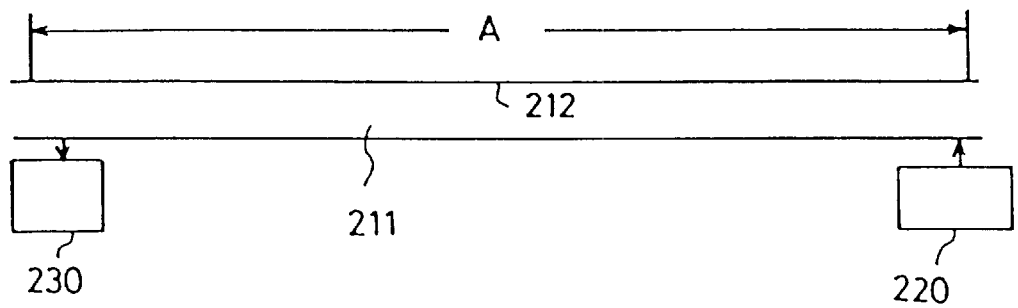
FIG. 32 is a schematic diagram showing the entire constitution of a first embodiment in the case where the information generating apparatus of the present invention is applied to a rupture detecting apparatus.

FIG. 32 illustrates the principle of detection in a first embodiment of a rupture detecting apparatus of the present invention, which is an example of utilizing the attenuation of an elastic wave in a rupture detecting operation, in the case that both of an elastic wave transmitting apparatus and an elastic wave receiving apparatus are placed on the running path.

As shown in FIG. 32, a rail 211 is insulated from a mechanism by, for example, being spaced a predetermined distance. Section between such insulated portions is assumed to be a rupture checking section A. An ultrasonic wave transmitting apparatus 220 serving as an elastic wave transmitting device is placed at an end portion of the rail 211, namely, at the beginning end side (where a train enters) of the rupture checking section A, that is, at the right-hand side as viewed in this figure. An ultrasonic wave receiving apparatus 230 serving as an elastic wave receiving device is placed at a terminating end portion (from which a train leaves), namely, at the left-hand side as viewed in this figure.

Figure 33:
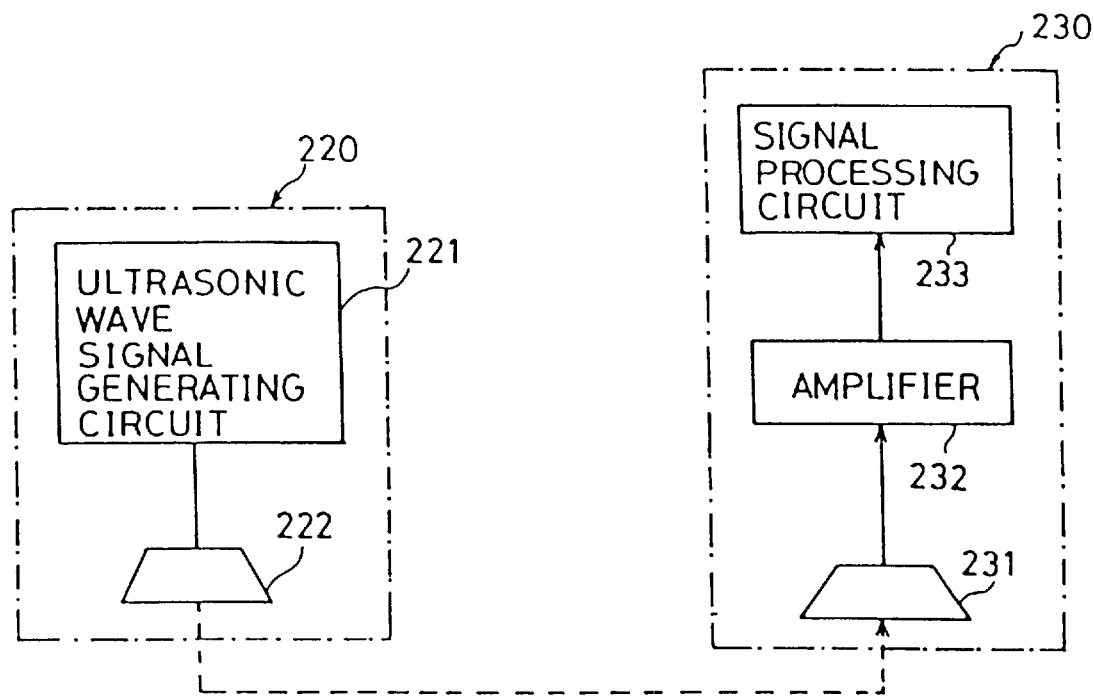
FIG. 33 is a diagram showing the constitution of each of an ultrasonic transmitting apparatus and an ultrasonic receiving apparatus of FIG. 32.

FIG. 33 shows the constitution of each of the aforementioned ultrasonic wave transmitting apparatus 220 and the aforesaid ultrasonic wave receiving apparatus 230.

As shown in FIG. 33, the ultrasonic wave transmitting apparatus 220 is constituted by comprising an ultrasonic wave signal generating circuit 221 and a transmitter 222. The transmitter 222 abuts against the rail 211 and radiates ultrasonic waves thereto as elastic waves. The ultrasonic wave receiving apparatus 230 is constituted by comprising: a receiver 231 and an amplifier 232 which serve as a receiving portion; and a signal processing circuit 233 acting as a judgment portion. The receiver 231 abuts against the rail 211 and receives ultrasonic wave signals propagated through the rail 211. The signal processing circuit 233 receives a signal from the amplifier 232 and compares the signal level of the received signal with a preset threshold value to thereby judge whether or not rupture occurs in the rail 211. Therefore, the foregoing signal processing circuit 233 corresponds to an information generating device that has the function of judgement device.

Next, an operation of this embodiment will be described hereunder.

Figure 34:
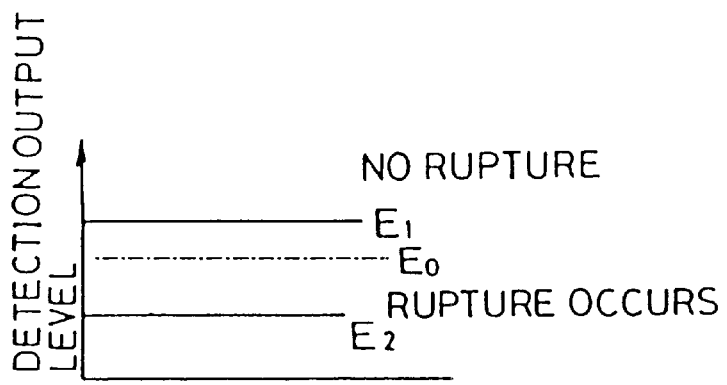
FIG. 34 is a diagram illustrating an operation of the first embodiment of the rupture detecting apparatus.

Ultrasonic wave signals radiated from the transmitter 222 to the rail 211 are propagated to the terminating end of the checking section A through the rail 211 and are then received by the receiver 231. Subsequently, the received ultrasonic wave signals are amplified by the amplifier 232 and are then input to the signal processing circuit 233. It is now assumed that the signal level of a reception signal to be compared with the threshold value E0 by the signal processing circuit 233 is represented in terms of a detection output level. In the case where no rupture occurs in the rail 211, the level E1 of the reception signal becomes higher than the threshold value E0, as shown in FIG. 34. In contrast, in the case that a rupture 212 has occurred in the rail 211 as shown in FIG. 32, even if the surfaces of a rupture are in contact with each other, the pressure applied to such surfaces is low and the area of each of intimate contact parts of such surfaces is small. Gap is almost formed between the remaining parts of such surfaces of the rupture. Therefore, ultrasonic waves are propagated only through the intimate contact parts and are attenuated. Consequently, the level E2 of the reception signal input to the signal processing circuit 233 becomes lower than the threshold value E0. If the level of the reception signal is checked in the signal processing circuit 233, an output signal, which indicates that there is no rupture when the rupture 212 is not present, is generated from the signal processing circuit 233. If there is the rupture 12 in the rail, such an output signal is not generated. The degree of attenuation of the ultrasonic wave becomes higher as the area of the rupture becomes larger.

With such a constitution, even in the case where there is an incomplete rupture, the surfaces of which are partly in contact with each other, in the rail 211, the rupture 212 can be reliably detected.

Figure 35:
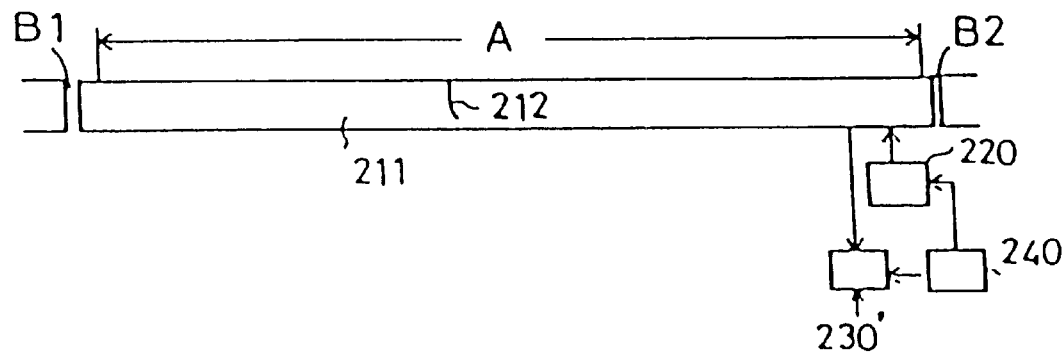
FIG. 35 is a schematic diagram showing the constitution of a second embodiment of the rupture detecting apparatus of the present invention.

Referring next to FIG. 35, there is shown a second embodiment of the rupture detecting apparatus of the present invention.

This embodiment is an example of utilization of the reflection of an elastic wave on the surface of a rupture in the detection of the rupture. In this figure, like reference numerals denote like components illustrated in FIG. 32. Thus, the description of such components is omitted herein.

As shown in FIG. 35, the ultrasonic wave transmitting apparatus 220 and an ultrasonic wave receiving apparatus 230' are placed, for example, at the terminating end portion (incidentally, may be placed at the beginning end portion) of the checking section A. Further, there is provided a timing signal generating circuit 240 that is operative to generate a timing signal for synchronizing the transmitting apparatus 220 with the receiving apparatus 230'. In this figure, B1 and B2 designates rail joints provided at the beginning end side and the terminating end side of the checking section A, respectively.

The ultrasonic wave transmitting apparatus 220 has a configuration as illustrated in FIG. 32. Further, as illustrated in FIG. 36, a timing signal output from the timing signal generating circuit 240 is input to the ultrasonic wave signal generating circuit 221 which generates ultrasonic waves in synchronization with the input of the timing signal. On the other hand, the ultrasonic wave receiving apparatus 230' has a receiving gate circuit 234 for controlling an input of an amplification signal from the amplifier 232 to the signal processing circuit 233 in addition to the constitution illustrated in FIG. 32. The receiving gate circuit 234 is enabled in synchronization with the timing signal, and prevents an influence of noises at the time other than the time of transmitting ultrasonic waves.

Next, an operation of this embodiment will be described hereinbelow.

Figure 37:
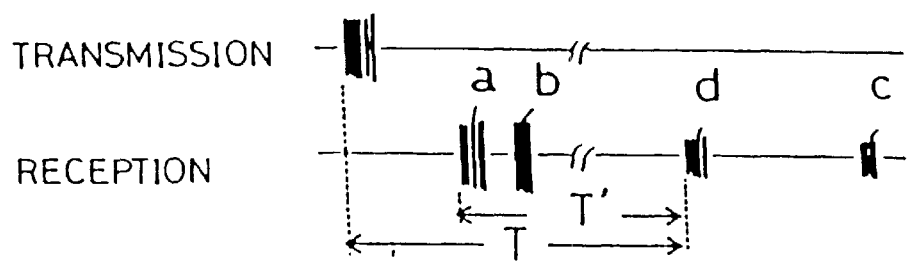
FIG. 37 is a diagram illustrating an operation of the second embodiment of the rupture detecting apparatus of the present invention.

Ultrasonic wave signals radiated from the transmitter 222 to the rail 211 are propagated through the rail 211 and are input directly to the receiver 231. Further, reflection waves are caused at the joints B1 and B2 of the rail 211 in an end part of the checking portion A. Therefore, when no rupture exists in the rail 211, the reception signal input to the receiver 231 is the combination of a reception signal a to be directly input thereto, a reception signal b caused due to the reflection at the terminating end side joint B2 and a reception signal c caused due to the reflection at the beginning end side joint B1. In contrast, when the rupture 212 exists in the rail 211, the reception signal input to the receiver 231 is the combination of the aforementioned reception signals a, b and c and a reception signal d caused due to the reflection at the surface of the rupture 212 as illustrated in FIG. 37.

Time between the generation of an ultrasonic wave and the reception of the signals a, b and c can be previously known by presetting each of the distance from the ultrasonic wave transmitting apparatus 220 to the ultrasonic wave receiving apparatus 230', the distance therefrom to the rail joint B1 and the distance therefrom to the rail joint B2. If time data representing this known time is previously stored, when the reception signal is received by the ultrasonic wave receiving apparatus 230', the propagation time of this reception signal is measured and then the measured propagation time is compared with the stored data. Thereby, the reception signal d due to the rupture 212 can be discriminated from the other reception signals a, b and c. Thus, it can be known whether or not a rupture exists in the rail. Further, this embodiment has an advantage in that the position of the rupture 212 can be known according to the aforementioned equation (10) by measuring the time T between the generation of the ultrasonic wave and the reception of the signal d due to the rupture 212. Moreover, even when the distance between the transmitting apparatus 220 and the receiving apparatus 230' is unknown, the position of the rupture 212 can be known by measuring the time interval T' between the reception signal a, which is received directly by the receiving apparatus 230', and the reception signal d caused due to the rupture 212.

Further, in the case of this embodiment, the amplification function of the signal processing circuit 233 of the receiving apparatus 230' can be checked by using the reception signal c that is caused by the reflection at the rail joint Bi which is farther from the transmitting apparatus 220 than the rail joint B2. Namely, the reception signal c is received in a low level. Moreover, the reception time thereof can be previously known. Furthermore, in the case where this reception signal c is detected, the amplification function of the circuit 233 is judged as being normal and that if the reception signal c is not detected, the amplification function of the circuit 233 is judged as being degraded. Therefore, the signal processing circuit 233 can act as a checking device for checking the receiving function.

Figure 38:
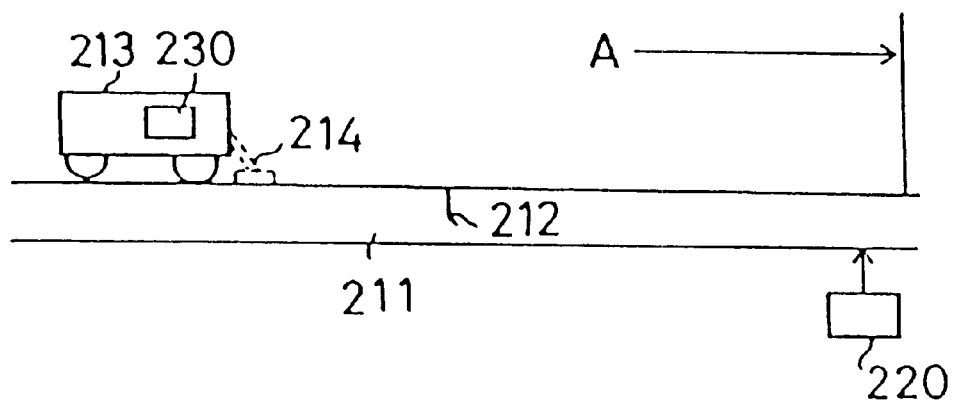
FIG. 38 is a schematic diagram showing the constitution of a third embodiment of the rupture detecting apparatus of the present invention.

Referring next to FIG. 38, there is shown a third embodiment of the rupture detecting apparatus of the present invention.

This embodiment is an example in which one of the ultrasonic wave transmitting apparatus and the ultrasonic wave receiving apparatus is provided on the running path on the ground, while the other of these transmitting and receiving apparatuses is mounted in the mobile unit, and the attenuation of an elastic wave is utilized. Incidentally, in this figure, like reference characters designates like composing elements illustrated in FIG. 32. Thus, the description of such composing elements is omitted herein.

As shown in FIG. 38, at the terminating end portion of the checking section A, for example, the ultrasonic wave transmitting apparatus 220 is provided. In the train 213 acting as a mobile unit, the ultrasonic wave receiving apparatus 230 is mounted. The receiver 231 of the ultrasonic receiving apparatus 230 is provided on the wheel axle (not shown) of the train 213 in such a way as to be in contact with the axle, and receives ultrasonic wave signals from the rail 211 through the axle and the wheel. Alternatively, the apparatus may be adapted so that, as indicated by dashed lines in this figure, an elastic wave transmitting slider 214 being operative to slide on and to be in contact with the rail 211 is provided at a leading end portion of the train 213, and the signals are received by the receiver 231 through this slider 214. Each of the ultrasonic wave transmitting apparatus 220 and the ultrasonic receiving apparatus 230 has a configuration similar to that of the corresponding unit of FIG. 33, and thus the description of these units is omitted herein.

Next, an operation of this embodiment will be described hereinafter.

Ultrasonic wave signals radiated from the ultrasonic wave transmitting apparatus 220 are propagated through the rail 211 from the terminating end to the beginning end of the checking section A. On the other hand, the train 213 enters the checking section A from the beginning end and then receives the ultrasonic wave signal, which are propagated through the rail 211, at the receiving apparatus 230 through the wheel and axle. Incidentally, in the case that the train 213 is provided with the foregoing dedicated slider 214, the ultrasonic wave signal is received by the receiving apparatus 230 through the slider 214. The level of the reception signal is checked by the signal processing circuit 233, similarly as in the embodiment illustrated in FIG. 32. Thus, in the case that the rupture 212 does not exists in the rail 211, the level of the reception signal received by the receiving apparatus 230 is higher than the threshold value. In contrast, in the case that the rupture 212 exists in the rail 211, the reception signal is attenuated by the rupture 212. Thus, the level of the reception signal received by the receiving apparatus 230 is lower than the threshold value. Consequently, the rupture 212 can be detected.

Figure 39:
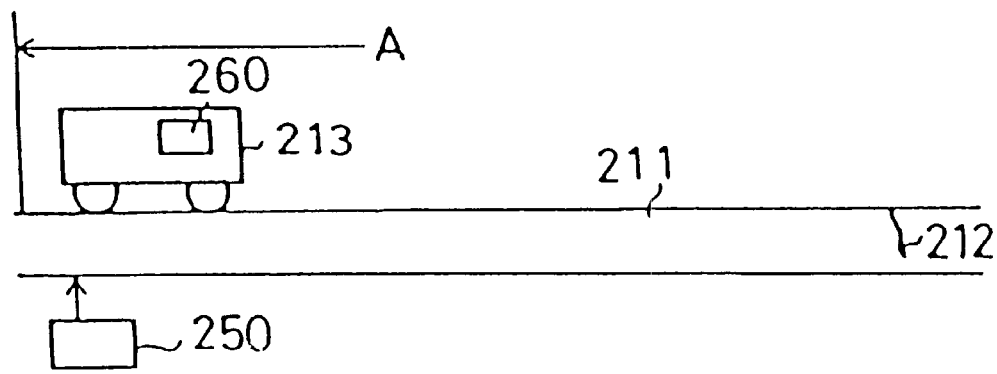
FIG. 39 is a schematic diagram showing the constitution of a fourth embodiment of the rupture detecting apparatus of the present invention.

Referring next to FIG. 39, there is illustrated a fourth embodiment of the rupture detecting apparatus of the present invention.

This embodiment is an example in which one of the ultrasonic transmitting apparatus and the ultrasonic wave receiving apparatus is disposed on the running path on the ground and the other apparatus is mounted in the mobile unit, and which the reflection of an elastic wave is utilized. Incidentally, in this figure, like reference numerals indicate like composing element s illustrated in FIG. 38. Thus, the description of such composing elements is omitted herein.

As shown in FIG. 39, at the beginning end portion of the checking section A, for example, an ultrasonic wave transmitting apparatus 250 is provided. In the train 213 acting as a mobile unit, an ultrasonic wave receiving apparatus 260 is mounted.

FIG. 40 illustrates the constitution of each of the ultrasonic wave transmitting apparatus 250 and the ultrasonic wave receiving apparatus 260 of this embodiment. Incidentally, for instance, techniques previously proposed by the Applicant of the present application in the Japanese Patent Application No. 8-1682 can be applied to the ultrasonic wave transmitting apparatus and the ultrasonic wave receiving apparatus, which are used for performing transmission/reception operations between the train (namely, the mobile unit) and the ground facility.

The ultrasonic wave transmitting apparatus 250 is provided with a timing signal generating circuit 253 for controlling the ultrasonic wave generating timing of an ultrasonic wave signal generating circuit 251; a calibration signal receiving circuit 254 being operative to receive a calibration signal for periodically calibrating the synchronization between the timing signal generating circuit 253 and a timing signal generating circuit 265 (to be described later) of the receiving apparatus 260; and an antenna 255 for receiving, for example, a calibration signal from a calibration signal generating source (not shown) on the ground and for inputting the received calibration signal to a calibration signal receiving circuit 254, in addition to the ultrasonic wave signal generating circuit 251 and a transmitter 252.

The ultrasonic wave receiving apparatus 260 is provided with a timing signal generating circuit 265 for controlling a timing of enabling a receiving gate circuit 263 and for synchronizing the timing with the generation of the ultrasonic signal; a calibration signal receiving circuit 266 being operative to receive a calibration signal for periodically calibrating the synchronization of the timing signal generating circuit 265; and an antenna 267 for receiving a calibration signal from the aforesaid calibration signal generating source at the mobile unit and for inputting the received calibration signal to the calibration signal receiving circuit 266, in addition to a receiver 261, an amplifier 262, the receiving gate circuit 263 and a signal processing circuit 264. The receiver 261 is provided on a wheel axle (not shown) of the train 213 in such a manner as to be in contact therewith and is operative to receive ultrasonic wave signals from the rail 211 through the axle and the wheel. Further, ultrasonic wave signals may be received by the train through the slider 214 as illustrated in FIG. 38.

Next, an operation of this embodiment will be described hereunder.

Ultrasonic wave signals radiated from the ultrasonic wave transmitting apparatus 250 are propagated through the rail 211 from the beginning end to the terminating end of the checking section A. On the other hand, the train 213 enters the checking section A from the beginning end and then receives the ultrasonic wave signal propagated through the rail 211, at the receiving apparatus 260 through the wheel and axle. The distance between both ends of the checking section A is already known. Thus, a reception signal caused by the reflection at the rail joint provided at the terminating end side and a reception signal caused by the reflection at the rupture 212 can be discriminated according to the propagation time of each of such signals from one another by measuring the distance to the train which has entered the checking section A from the beginning end thereof. Therefore, the existence of the rupture 212 in the rail 211 can be detected.

Incidentally, needless to say, in the case of the third and fourth embodiments of the rupture detecting apparatus of the present invention, the ultrasonic wave transmitting apparatus 250 and the ultrasonic wave receiving apparatus 260 may be replaced with each other.

Figure 41:
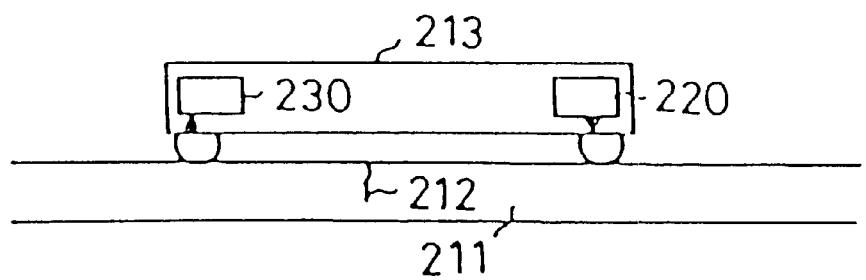
FIG. 41 is a schematic diagram showing the constitution of a fifth embodiment of the rupture detecting apparatus of the present invention.

Next, FIG. 41 shows a fifth embodiment of the rupture detecting apparatus of the present invention.

This embodiment is an example in which both of the ultrasonic wave transmitting apparatus and the ultrasonic wave receiving apparatus are mounted in the mobile unit and the attenuation of an elastic wave is utilized. Incidentally, in this figure, like reference numerals designate like composing elements illustrated in FIG. 32. Thus, the description of such composing elements is omitted herein.

As shown in FIG. 41, the ultrasonic wave transmitting apparatus 220 and the ultrasonic wave receiving apparatus 230, each of which has a configuration similar to that of FIG. 32, are mounted at a front portion and a rear portion of the train 213, respectively. The transmitter 221 and the receiver 231 are placed in such a manner as to abut against the wheel axle (not shown), and transmits and receives ultrasonic waves, respectively, through the axle and the wheel.

With such a constitution, ultrasonic waves radiated from the ultrasonic transmitting apparatus 220 are transmitted to the rail 211 through the axle and the wheel, and then propagated through the rail 211 and are subsequently received by the ultrasonic wave receiving apparatus 230 through the wheel and the axle. If a rupture 212 exists in the propagation path of an ultrasonic wave signal, the received level of a reception signal is lowered by the attenuation caused at the rupture 212. Consequently, the existence of the rupture 212 can be detected.

Figure 42:
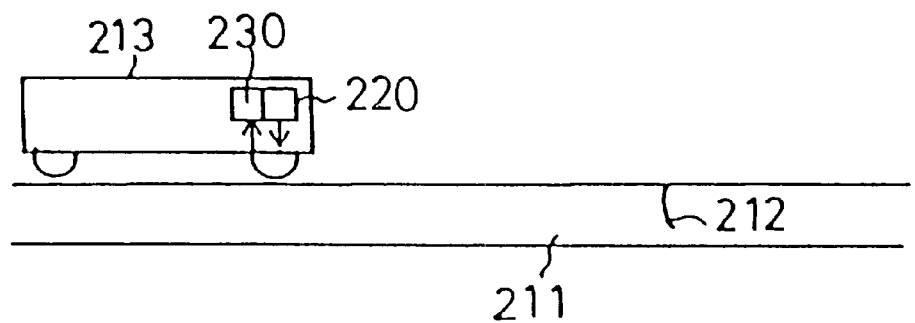
FIG. 42 is a schematic diagram showing the constitution of a sixth embodiment of the rupture detecting apparatus of the present invention.

Next, FIG. 42 shows a sixth embodiment of the rupture detecting apparatus of the present invention.

This embodiment is another example in which both of the ultrasonic wave transmitting apparatus and the ultrasonic wave receiving apparatus are mounted in the mobile unit and the attenuation of an elastic wave is utilized. Incidentally, in this figure, like reference numerals designate like composing elements illustrated in FIG. 32. Thus, the description of such composing elements is omitted herein.

As shown in FIG. 42, the ultrasonic wave transmitting apparatus 220 and the ultrasonic wave receiving apparatus 230 are mounted on an end portion, for instance, the front portion of the train 213. The transmitter 221 and the receiver 231 are placed in such a manner as to abut against the axle (not shown), and transmits and receives ultrasonic waves, respectively, through the axle and the wheel.

With such a constitution, ultrasonic wave signals radiated from the ultrasonic wave transmitting apparatus 220 are transmitted to the rail 211 through the axle and the wheel, and are propagated through the rail 211 and are then reflected at the rail joint and are subsequently received by the ultrasonic wave receiving apparatus 230. The distance across the checking section A is already known. Thus, a reception signal caused by the reflection at each of the rail joints respectively provided at the beginning end side and the terminating end side and a reception signal caused by the reflection at the rupture 212 can be discriminated according to the propagation time of each of such signals from one another by measuring the distance from each of the beginning end and the terminating end of the section A to the train. Therefore, the existence of the rupture 212 in the rail 211 can be detected.

In the case of the fifth and sixth embodiments of the rupture detecting apparatus, the ultrasonic wave transmitting apparatus and the ultrasonic wave receiving apparatus are mounted only in a train running on the rail 211. There is no necessity for placing the ultrasonic wave transmitting apparatus and the ultrasonic wave receiving apparatus in the ground facility. Thus, there is no need for placing the transmitting apparatus and the receiving apparatus in each checking section. Consequently, these embodiments have an advantage in that the cost of equipment can be reduced considerably.

Figure 43:
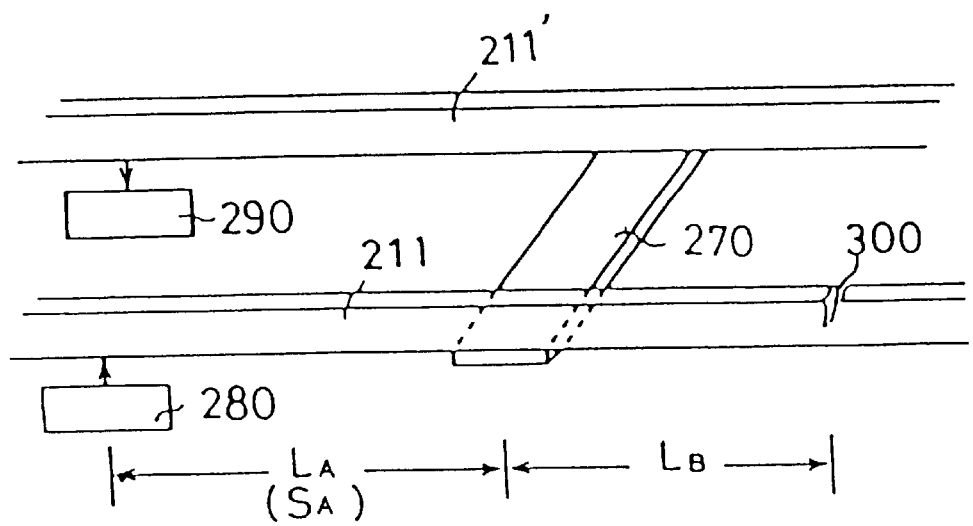
FIG. 43 is a schematic diagram showing the constitution of a seventh embodiment of the rupture detecting apparatus of the present invention.

FIG. 43 illustrates a seventh embodiment of the rupture detecting apparatus of the present invention.

As shown in FIG. 43, in the checking section A, a connecting member 270, through which ultrasonic waves can be propagated, connects between the rails 211 and 211' which are parallel with each other. As long as the connecting member 270 permits elastic waves to be propagated therethrough, any connecting member may be employed.

Further, in an end portion of the checking section A, an ultrasonic wave transmitting apparatus 280 is provided on one rail 211 of the rails, while an ultrasonic wave receiving apparatus 290 is provided on the other rail 211'. The ultrasonic wave transmitting apparatus 280 and the ultrasonic wave receiving apparatus 290 are synchronized by a timing signal from the timing signal generating circuit (not shown), with each other.

Next, an operation of this embodiment will be described hereinbelow.

Ultrasonic waves radiated from the ultrasonic wave transmitting apparatus 280 are propagated through the rail 211, the connecting member 270 and the rail 211' and are then received by the ultrasonic wave receiving apparatus 290. Incidentally, if a rupture exists farther than the connecting member 270 when viewed from, for example, the transmitting apparatus 280 and the receiving apparatus 290, a reflection wave reflected on the surface of the rupture is received by the receiving apparatus 290. Thus, the rupture can be detected by the presence of the reception signal corresponding to the received reflection wave.

Figure 44:
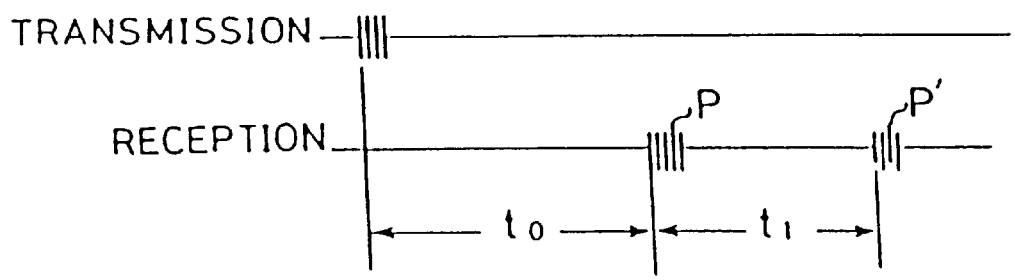
FIG. 44 is a diagram illustrating an operation of the embodiment of the rupture detecting apparatus of the present invention of FIG. 43.

FIG. 44 is a time chart illustrating the transmission/reception of ultrasonic waves in this case.

In FIG. 44, P designates a reception signal having been propagated through the rail 211, the connecting member 270 and the rail 211'; P' a reception signal propagated through the connecting member 270 after reflected on the surface of the rupture; to time required to receive the reception signal P; and t1 a time delay between the reception of the reception signal P and that of the reception signal P'.

Let $L_A$, $L_B$, $L_X$, $C_m$ and $C_X$ designate the distance of the section $S_A$ in the distance between the connecting member 270 and each of the transmitting apparatus 280 and the receiving apparatus 290, the distance between the connecting member 270 and a rupture 300, the length of the connecting member 270, the propagation speed of ultrasonic waves in the rails 211 and 211' and the propagation speed of ultrasonic waves in the connecting member 270, respectively. The aforementioned times t0 and t1 are given by the following equations:

$$t0 = (2L_A/C_m) + (L_X/C_X) \qquad (13)$$

$$t1 = 2L_B/C_m \qquad (14)$$

where $L_A$, $L_X$, $C_m$ and $C_X$ are constant. Thus, the time t0 is nearly constant, and the reception signal P can be discriminated. Consequently, the distance $L_B$ can be calculated by measuring the time t1, so that the existing position of the rupture 300 can be detected.

With such a constitution, the presence of the reception signal P indicates that the transmitting apparatus 280 and the receiving apparatus 290 are normal, the mounting of the connecting member 270 on the rails 211 and 211' is normal and thus, the apparatus has the ability of detecting the existence of the rupture 300 if the rupture 300 occurs at a place which is farther than the connecting member 270.

Incidentally, in the case that rupture occurs in the section $S_A$ between the connecting member 270 and each of the transmitting apparatus 280 and the receiving apparatus 290, the reception signal P is not received or the reception level of the signal P is lowered. Thus, wherever rupture occurs in the rails 211 and 211', the rupture can be detected by checking the level of the reception signal by the use of the threshold value. Namely, the detection of rupture can be achieved by, for example, inputting a rupture detection signal, which is obtained by the detection of a reflection wave P', and a rupture detection signal, which is obtained by the detection of the level of a reception signal, to the OR circuit and by employing a logical OR output signal of the OR circuit as a detection signal indicating the detection of rupture in the rails. Moreover, to cope with the case that a reflection wave caused at the rupture 300 cannot be received by the receiving apparatus 290, another receiving apparatus may as well be provided in such a way as to be connected with the rail 211 in the vicinity of the transmitting apparatus 280. This results in secure reception of a reflection wave from the rupture 300 caused in the rail 211. Consequently, the rupture 300, which is farther than the connecting member 270, can be detected securely.

Alternatively, the transmitting apparatus 280 and the receiving apparatus 290 may be mounted on the train. In this case, the distance $L_A$ between the train (namely, each of the transmitting apparatus and the receiving apparatus) and the connecting member 270 may be calculated by using the following equation:

$$L_A = C_m(t0 - tx)/2 \qquad (15)$$

where $tx = L_X/C_X$ (namely, is constant). The distance $L_A$ can be calculated from the measured value of the time t0 according to the equation (15).

Furthermore, the distance $(L_A + L_B)$ between the train (namely, each of the transmitting apparatus and the receiving apparatus) and the rupture is given by the following equation:

$$L_A + L_B = C_m(t0 + t1 - tx)/2 \qquad (16)$$

Therefore, the distance between the train and the rupture can be obtained by measuring the time t1.

Figure 45:
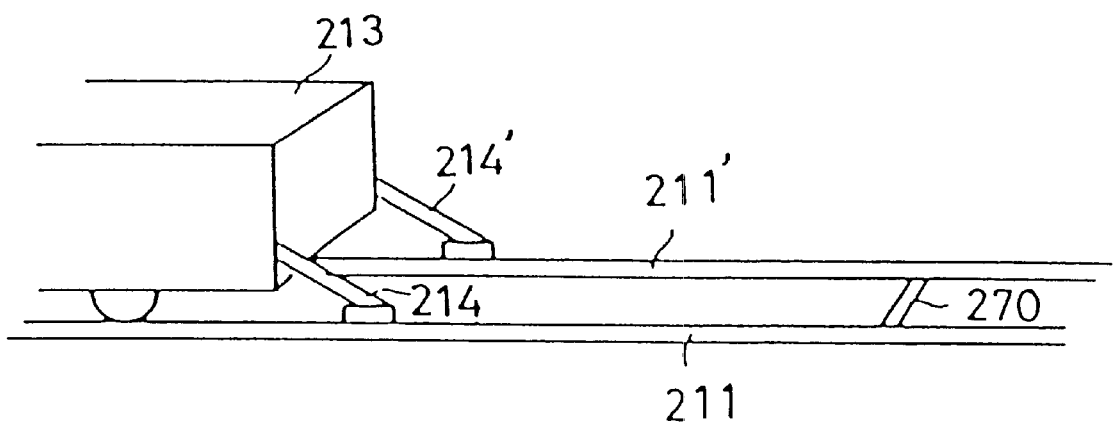
FIG. 45 is a schematic diagram showing the constitution of an eighth embodiment of the rupture detecting apparatus of the present invention.

Incidentally, needless to say, rupture can be detected similarly, even if one of the ultrasonic transmitting apparatus and the ultrasonic receiving apparatus is mounted in the train and the other is disposed on the rail. Further, in the case that the ultrasonic transmitting apparatus and the ultrasonic receiving apparatus are mounted in the train, the ultrasonic-wave transmitting path between the train and the rail may as well be established by providing sliders 214 and 214' at the front end portion of the train 213 in such a way as to slide on and be in contact with the rails 211 and 211', respectively, similarly as in the case of the eighth embodiment illustrated in FIG. 45. Further, the transmission and reception of ultrasonic waves are performed by transmitting ultrasonic waves to the rail 211 (or 211') through one of the sliders 214 (or 214') and by taking in the ultrasonic waves from the rail 211' (or 211) through the other slider 214' (or 214).

As above described, the detection of rupture can be performed while confirming from the presence of a normal reception signal P that the rupture detecting ability of the rupture detecting apparatus is normal, by connecting the two rails by device of a material, through which an elastic wave can be propagated, and detecting a rupture based on the reflection condition of ultrasonic waves and the attenuation thereof. Consequently, the reliability of the apparatus is enhanced.

Incidentally, in the case that the rails and the conventional track circuit, which employs a rail as an energizing path, are used, both of a rail rupture detecting system using ultrasonic waves and a train detecting system using a track circuit, can be utilized by using an insulating matter, which does not transmit electricity but transmit elastic waves as the connecting member 270 for connecting between the rails 211 and 211'.

Figure 46:
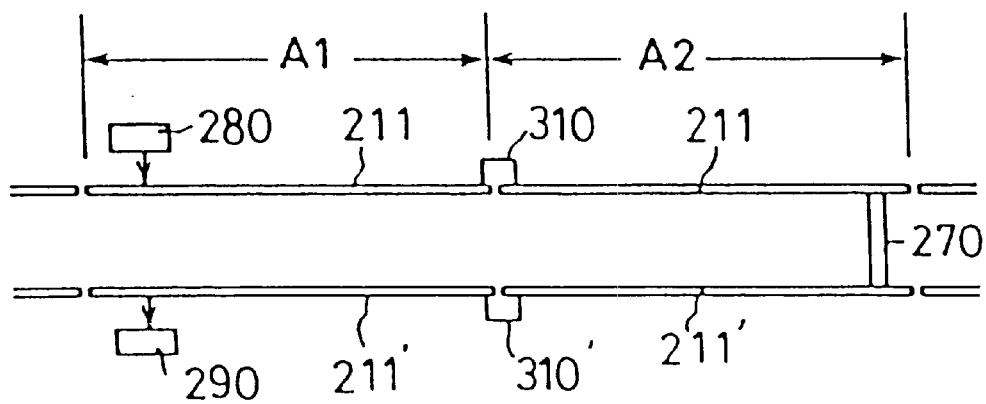
FIG. 46 is a schematic diagram showing the constitution of a ninth embodiment of the rupture detecting apparatus of the present invention.

FIG. 46 shows a ninth embodiment of the rupture detecting apparatus of the present invention.

This embodiment is suitable for the case that the rupture detecting apparatus is used together with the conventional track circuit. Incidentally, in this figure, like reference numerals designate like composing elements illustrated in FIG. 43. Thus, the description of such composing elements is omitted herein.

In FIG. 46, A1 and A2 denote running or travel sections which are electrically insulated at rail joints. The ultrasonic wave transmitting apparatus 280 is provided on one rail 211 at the beginning end side (namely, an end portion at the side where the train enters) of the section A1, while the ultrasonic wave receiving apparatus 290 is provided on the other rail 211'. In the section A2, the connecting member 270 made of an insulating matter for connecting the rails 211 and 211' is provided. End portions, which are placed close to each other, of the sections A1 and A2 are connected by bypass propagation media 310 and 310', which are made of insulating matters and bypass the rail joints and allow elastic waves to be propagates therethrough. The propagation speed of ultrasonic waves propagated through the bypass propagation media 310 and 310' are set in such a manner as to be different from that of ultrasonic waves propagated through rails 311 and 311'.

Next, an operation of this embodiment will be described hereinafter.

In the case where the rail joints of the sections A1 and A2 are separated from each other, similarly as in the usual case, ultrasonic waves radiated from the ultrasonic wave transmitting apparatus 280 are propagated through the rail 211 of the section A1, the bypass propagation medium 310, the rail 211 of the section A2, the connecting member 270, the rail 211' of the section A2, the bypass propagation medium 310' and the rail 211' of the section A1 in this order. Then, these ultrasonic waves are received by the ultrasonic wave receiving apparatus 290. Similarly as in the seventh embodiment of FIG. 43, an occurrence of rupture can be detected based on the reception condition of a reception signal, namely, based on the reception level or the propagation time of a reception signal in the ultrasonic wave receiving apparatus 290.

With such a constitution, in the case that this apparatus is used together with the conventional track circuit, rupture in the rail of each of a plurality of electrically insulated running or travel sections can be monitored by using a set of the ultrasonic wave transmitting apparatus 280 and the ultrasonic wave receiving device 290. Consequently, the cost of the equipment can be reduced considerably.

Incidentally, in the foregoing description, it has been described that this embodiment is configured so as to monitor the two sections A1 and A2. However, needless to say, in the apparatus of the present invention, the number of the running sections to be monitored may be three or more.

Additionally, in the case of this embodiment, the propagation speed of ultrasonic waves in the bypass propagation media 310 and 310' is different from that of ultrasonic waves in the rails 211 and 211'. Thus, when the rail joints, which are placed close to each other, of the sections A1 and A2 are brought into contact with each other owing to variation with time, the ultrasonic waves are propagated not only through the bypass propagation media 310 and 310' but also through the rail joints which have been in contact with each other. Further, for instance, if the propagation speed corresponding to the rails is higher than that corresponding to the bypass propagation media, ultrasonic waves propagated through the rail joints reach the receiving apparatus 290 before the ultrasonic waves propagated through the bypass propagation media 310 and 310' reach there. Therefore, in the case that the rail joints are in contact with each other, the time, at which the first reception signal reach there, is earlier than that at which the reception signal reach there in the case where the rail joints are spaced normally. Consequently, this embodiment has an advantage in that abnormality in the running path, in which the rail joints are in contact with each other, can be detected simultaneously.

As above stated, even in the case where the rupture is in an incomplete condition in which intimate contact portions exist in the running path, the existence of a rupture can be detected securely by performing the rupture detecting process for detecting a rupture in the running path for the mobile unit by utilizing elastic waves. Consequently, the present invention has an advantage in that the safety of train operations can be enhanced considerably by applying this embodiment to the detection of rupture in rails for trains.

Next, hereinafter, there will be described examples of application of the present invention to various train control systems such as an automatic train stop (hereunder referred to as ATS) system, an automatic train control (hereunder referred to as ATC) system or an automatic train operation (hereunder referred to as ATO) system.

Figure 47:
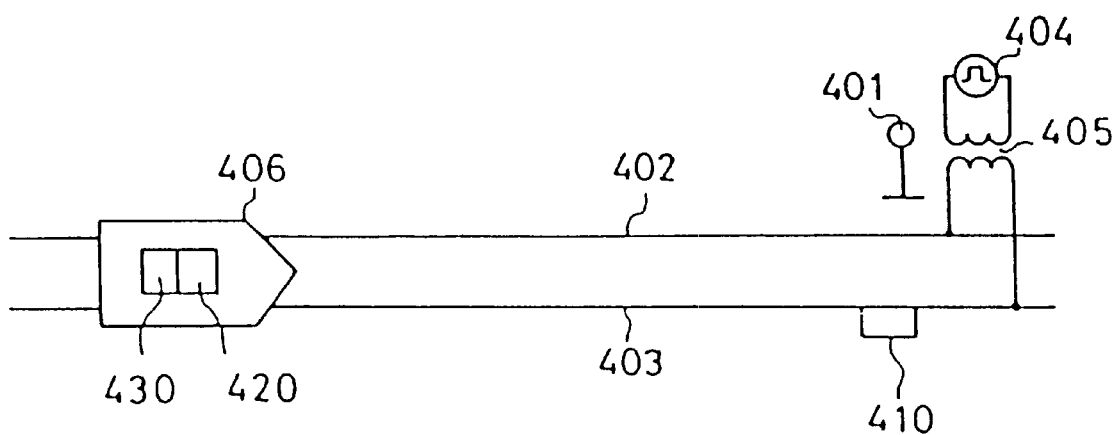
FIG. 47 is a diagram showing an example of ATS system to which the present invention is applied.

FIG. 47 illustrates an embodiment which is an example of the application of the present invention to the ATS system.

As shown in FIG. 47, a transmitter 404 for sending electric signals is connected to rails 402 and 403 in the vicinity of a home signal 401 through a repeater 405. Further, an ultrasonic wave transmitting apparatus 410 is provided on one of the rails (in the case of this embodiment, the rail 403). A train 406 is provided with an ultrasonic wave receiving apparatus 420 and with an information storage apparatus 430 for storing information on the speed pattern corresponding to the distance from the home signal 401. Incidentally, a power receiving device for receiving electric signals and a receiver for receiving ultrasonic waves are mounted at a leading end portion of the train 406.

In such a configuration, an electric signal is sent from the transmitter 404 of the ground facility to the rails 402 and 403. Further, an ultrasonic wave is transmitted from the ultrasonic wave transmitting apparatus 420 to the rail 403 in synchronization with the sending of the electric signal. The train 406 receives the electric signal and the ultrasonic wave propagated through the rail. The distance to the home signal 401 and the train speed can be obtained on the basis of the reception time difference from the difference between the propagation speeds of the electric signal and the ultrasonic wave. Then, it is judged from the obtained position and speed information and pattern information previously stored in the information storage apparatus 430 whether or not the actual train speed is appropriate. Moreover, for instance, if the actual speed of the train exceeds the pattern speed set correspondingly to the position of the train in a stop aspect, the train 406 is stopped emergently by operating a breaking device.

With such a configuration, the ground facility can detect the position or distance of the train from the signal continuously. Consequently, there is provided an ATS system which excels in safety and reliability.

Incidentally, the system of FIG. 47 is configured so that the ultrasonic wave transmitting apparatus 410 and the transmitter 404 are equipped in the proximity of the home signal: However, train position information representing continuous positions of the train can be obtained by providing these units, namely, the ultrasonic wave transmitting apparatus 410 and the transmitter 404 in each of the track circuits, though the train position information would represent only discrete spot information in the conventional system. Thus, the accuracy of what are called ATO onboard patterns and "Just Detection" operation in the ATO system can be improved. Furthermore, as a result of superimposing information on an ultrasonic wave, a ground (control) unit with a power supply, which is used for transmitting information to the train, becomes unnecessary.

Figure 48:
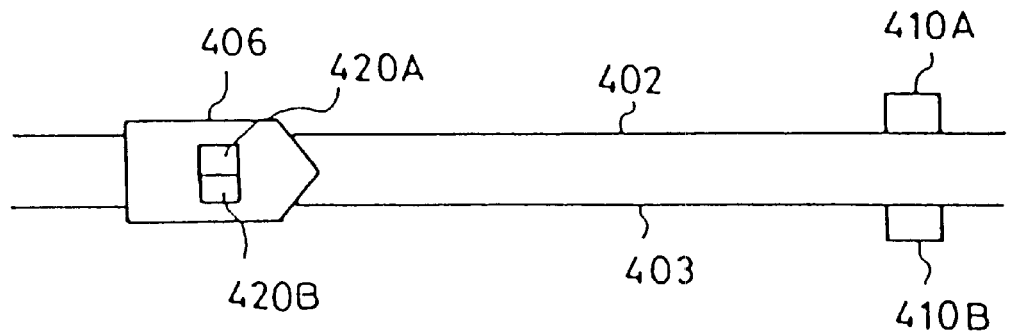
FIG. 48 is a diagram showing an example of ATC system to which the present invention is applied.

FIG. 48 illustrates an embodiment which is an example of the application of the present invention to the ATC system.

As shown in FIG. 48, ultrasonic wave transmitting apparatuses 410A and 410B are provided on the rails 402 and 403 at the terminating end side of a block section, respectively, while ultrasonic receiving apparatuses 420A and 420B are mounted on the train 406. Incidentally, receivers for receiving ultrasonic waves propagated through the rails 402 and 403 are mounted at the lateral side portions of the leading end portion of the train 406.

In such a configuration, ultrasonic waves, to which speed limit information on the limit speed of the train in the running section is imparted, are transmitted from the ultrasonic wave transmitting apparatuses 410A and 410B of the ground facility to the rails 402 and 403. The transmitted ultrasonic waves are received by the ultrasonic wave receiving apparatuses 420A and 420B of the train 406 through the receivers. Thus, as above described, the speed information on the speed of the train 406 can be obtained.

In the conventional ATC system, the limit speed information is obtained by feeding an electric signal, on which the limit speed information is imparted, through the rails and then receiving the electric signal in the train. Thus, electric signals to be fed through the rails 402 and 403 cannot be made to be independent of each other by short-circuiting the axle. Consequently, it is difficult to constitute as a duplex system. However, if the limit speed information is obtained on the train by using ultrasonic waves as illustrated in FIG. 48, ultrasonic waves to be transmitted through the two rails 402 and 403 can be made to be independent of each other. Thus, a duplex ATC system can be easily realized. Consequently, the safety and reliability of the ATC system can be enhanced.

Figure 49:
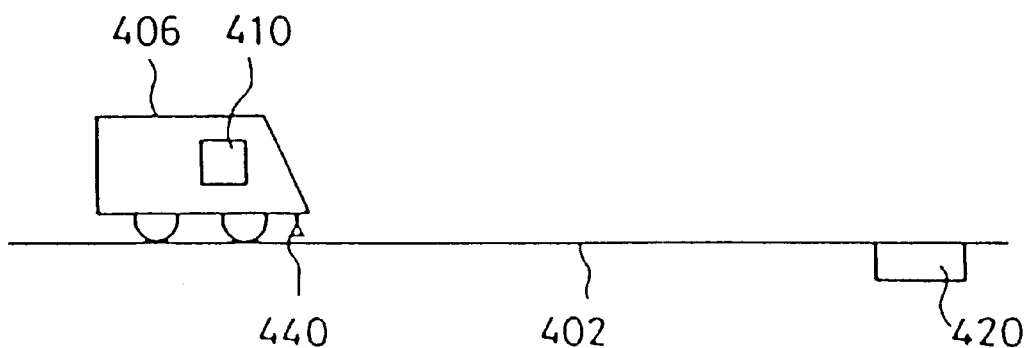
FIG. 49 is a diagram showing an example of the case where train number information is transmitted from the train to the ground facility.

Incidentally, if the ultrasonic wave transmitting apparatus 410 is provided in the train 406 as illustrated in FIG. 49, ultrasonic waves are transmitted from the transmitter 440 to the rail 402 and are received by the ultrasonic wave receiving apparatus 420 at the rail 402, the train number of the train 406 can be obtained in the ground facility by adding train number information to, for instance, ultrasonic waves transmitted from the train 406.

Figure 50:
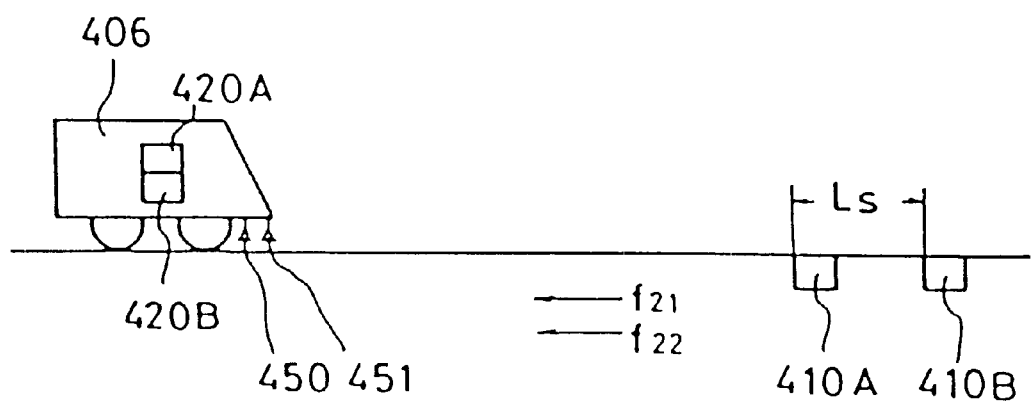
FIG. 50 is a diagram showing an example of the constitution of the apparatus in which temperature compensation for a change in ultrasonic wave propagation due to a variation in temperature.

FIG. 50 shows another embodiment in the case that a change in ultrasonic wave propagation speed, which is caused owing to a variation in the rail temperature, is compensated without using the connecting member 170.

As shown in FIG. 50, ultrasonic wave transmitting apparatuses 410A and 410B respectively transmitting ultrasonic waves having different frequencies $f_{21}$ and $f_{22}$ are provided on the ground facility, for example, the rail 402 in such a way as to be spaced by a preset reference distance from each other. Further, ultrasonic wave receiving apparatuses 420A and 420B for receiving the ultrasonic waves, which respectively have the frequencies $f_{21}$ and $f_{22}$, through corresponding receivers 450 and 451 are provided in the train 406. Incidentally, the receiver 450 is constituted in such a manner as to be able to receive only an ultrasonic wave having a frequency $f_{21}$, while the receiver 451 is constituted in such a manner as to be able to receive only an ultrasonic wave having a frequency $f_{22}$.

In such a configuration, an ultrasonic wave having a frequency $f_{21}$ and an ultrasonic wave having a frequency $f_{22}$ are transmitted from the ultrasonic wave transmitting apparatus 410A and the ultrasonic wave transmitting apparatus 410B, respectively, in synchronization with each other to the rails simultaneously. In the train 406, the ultrasonic waves are received by the receivers 450 and 451, and are then input to the ultrasonic wave receiving apparatuses 420A and 420B, respectively. The ultrasonic wave propagation time of a reference distance Ls in normal condition is previously stored in the ultrasonic wave receiving apparatuses 420A and 420B.

Therefore, the influence of a change in the rail temperature can be eliminated by comparing the difference between the time, at which the ultrasonic wave receiving apparatus 420A receives the ultrasonic wave, and the time, at which the ultrasonic wave receiving apparatus 420B receives the ultrasonic wave, with the stored ultrasonic wave propagation, and correcting the calculated distance and so on according to the difference as the result of the comparison. Consequently, accurate distance and train speed information can be obtained.

Additionally, although the system provided with the two receivers has been described in the foregoing description, the number of the receivers may be only one. In this case, there is the need for using a broad-band receiver and for providing a narrow-band filter corresponding to the frequencies $f_{21}$ and $f_{22}$ in the receiving apparatus.

Figure 51:
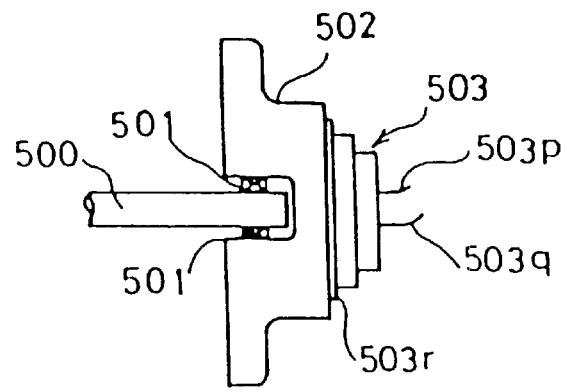
FIG. 51 is a diagram showing another mounting structure of the transmitter and the receiver.
Figure 52:
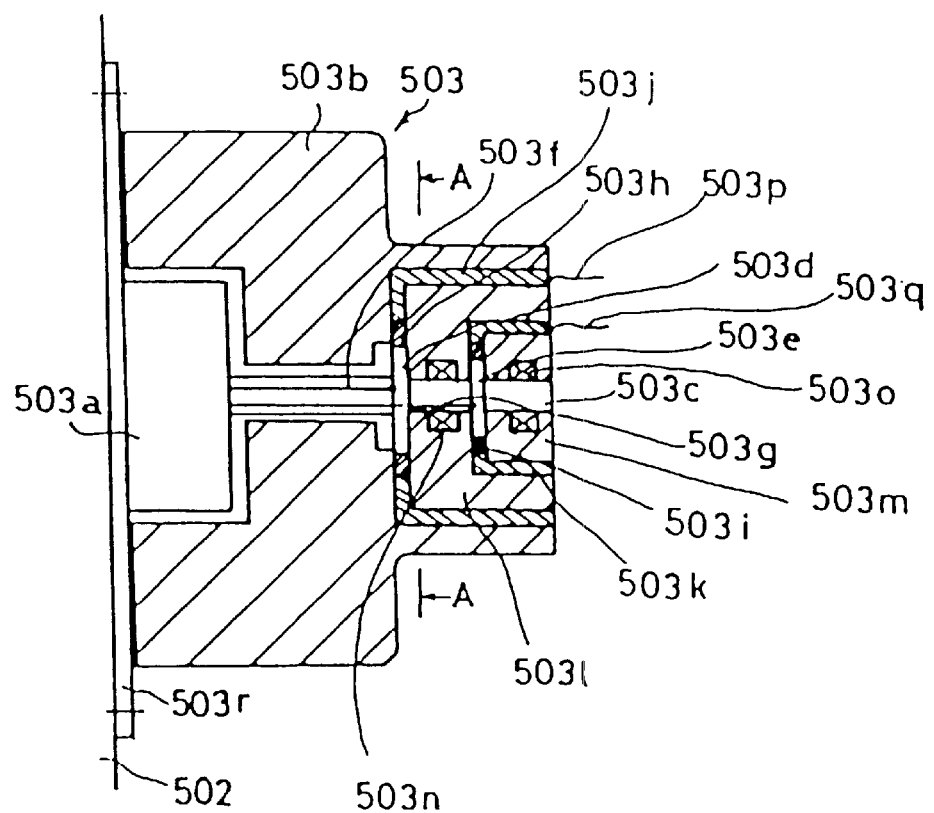
FIG. 52 is an enlarged sectional view of the transmitter and the receiver of FIG. 51.
Figure 53:
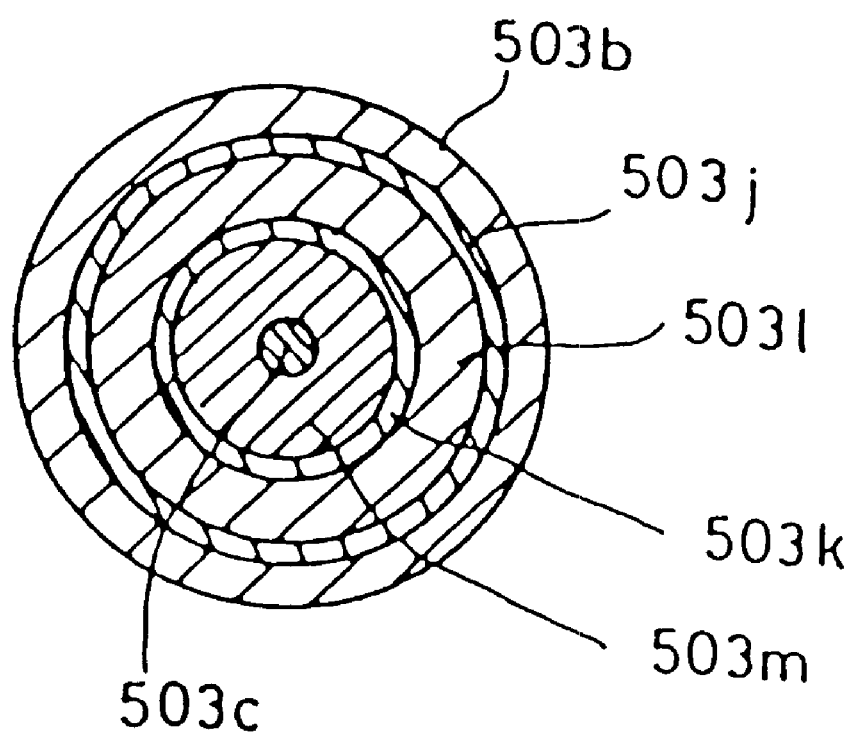
FIG. 53 is a sectional view taken in the direction of arrows along the line A—A of FIG. 52.

Incidentally, in the aforementioned embodiments, elastic waves may be transmitted between the rail and the receiver of the mobile unit either through air or through the wheels. In the latter case, the transmitter and the receiver may be mounted through bearings on a supporting portion for supporting the wheels. Alternatively, the transmitter and the receiver may be mounted on the rotating wheel or on the axle connected to the wheels, without bearings. Example of the mounting configuration, which does not use bearings, as illustrated in FIGS. 51 to 53 has been devised. Transmitter having this mounting configuration will be described hereinbelow by way of example. However, it is the same with the receiver.

As shown in FIG. 51, a transmitter 503 is mounted on a side surface of a wheel 502 attached to an axle 500 through bearing 501. In this case, the transmitter 503 has a structure, as illustrated in, for example, FIG. 52.

Namely, a main part 503*a* of the transmitter is fixed to the side surface of the wheel 502 through a mounting flange 503*r* by using bolts in such a way as to cause a wave transmitting surface thereof to abut against the side surface. Insulating matter 503*b* covers the main part 503*a* and the mounting flange 503*r* in such a manner that there is provided a gap between the insulating matter 503*b* and a combination of the main part 503*a* and the mounting flange 503*r*. Two metallic disk-like members 503*d* and 503*e*, which are spaced and insulated from each other, are mounted on the axle 503*c* fitted into the main part 503*a* of the transmitter. The aforementioned disk-like members 503*d* and 503*e* are electrically connected with the main part 503*a* of the transmitter through leads 503*f* and 503*g* provided along the axle 503*c*. The disk-like members 503*d* and 503*e* are in contact with a nearly-ring-like outer electrode 503*j* and a nearly-ring-like inner electrode 503*k* through sliders 503*h* and 503*i*, respectively, as illustrated in FIG. 53. The outer electrode 503*j* and the inner electrode 503*k* are insulated from each other by an insulating matter 503*l*. The axle 503*c* is supported or journaled in the insulating matters 503*l* and 503*m* through the bearings 503*n* and 503*o*. Further, the insulating matters 503*b*, 503*l* and 503*m* and both of the electrodes 503*j* and 503*k* are fixed to a stationary element (not shown) provided in the neighborhood thereof. Thus, the main part 503*a* of the transmitter, the axle 503*c* and the metallic disk-like members 503*d* and 503*e* are adapted to be rotatable through the bearings 503*n* and 503*o* with respect to the insulating matters 503*b*, 503*l* and 503*m* and both of the electrodes 503*j* and 503*k* and are operative to rotate together with the wheels 502 as a single body. In this figure, reference numerals 503*p* and 503*q* designate leads for supplying power, which are connected to the outer electrode 503*j* and the inner electrode 503*k*, respectively.

In such a mounting configuration of each of the transmitter and the receiver, ultrasonic waves can be transmitted between the rails without being transmitted by the bearings between the axle 500 and each of the wheels 502.

Incidentally, in the foregoing description of the aforementioned embodiments, although there have been described examples of applying the present invention to various control apparatuses in the railroad transportation system, the present invention can be applied in systems other than the railroad transportation system, for example, the information transmission system using elastic waves according to the present invention can be constructed by utilizing piping in a chemical plant, or embedded pipe arrangement for supplying gas or water.

INDUSTRIAL APPLICABILITY

The present invention has many advantageous effects in transmitting information as a result of transmitting and receiving elastic waves through a transmission medium, as compared with the prior art. Consequently, the industrial applicability of the present invention is high.

What is claimed is:

1. An information generating apparatus using elastic waves, which employs a rail for a train as a transmission medium, comprising:

elastic wave transmitting means for transmitting elastic waves to said rail;

elastic wave receiving means for receiving elastic waves transmitted from said elastic wave transmitting means through said rail; and information generating means for generating information that is necessary for controlling/monitoring associated elements of a control system for performing control operations on said train, based on an elastic wave reception signal received by said elastic wave receiving means, wherein said information generating means has detection means for detecting presence/absence of said train in said rail, based on a reception condition of an elastic wave received by said elastic wave receiving means and for generating information representing presence/absence of said train in said rail, and wherein said elastic wave transmitting means is placed at an end portion of one of two rails which are parallel with each other, and said elastic wave receiving means is placed at an end portion, which is on the same side as said elastic wave transmitting means, of the other of said two rails, and, when an elastic wave is transmitted from the one of the two rails to the other thereof through wheels of said train and is then received by said elastic wave receiving means, said detection means generates train presence information.

2. An information generating apparatus using elastic waves as set forth in claim 1, wherein a transmitter of said elastic wave transmitting means and a receiver of said elastic wave receiving means are in contact with said rail.

3. An information generating apparatus using elastic waves as set forth in claim 1, wherein a sliding contact member, which rides astride and slides on said two rails and exhibits an elastic wave propagation speed characteristic being superior than that of said train, is provided at a front portion of said train.

4. An information generating apparatus using elastic waves as set forth in claim 1, wherein a connecting member for connecting between rails is provided at a rail position that is a previously set distance away from said elastic wave transmitting means and said elastic wave receiving means.

5. An information generating apparatus using elastic waves as set forth in claim 4, wherein an elastic wave propagation speed characteristic of said connecting member is slower than that of said train.

6. An information generating apparatus using elastic waves as set forth in claim 1, wherein said detection means has distance calculating means for calculating a distance to said train, based on a propagation time from initiation of the transmission of an elastic wave and reception of the elastic wave.

7. An information generating apparatus using elastic waves as set forth in claim 1, wherein a branch portion, at which said rail branches, has elastic wave transmitting/receiving means for transmitting elastic waves, which are different in frequency from one another, to branch paths of said rail and for receiving elastic waves, which are different in frequency from one another, from said branch paths, whereas said train is provided with elastic-wave transmitting/receiving means for transmitting elastic waves to said branch paths and for receiving elastic waves from said branch paths, respectively.

8. An information generating apparatus using elastic waves, which employs a rail for a train as a transmission medium, comprising:
- elastic wave transmitting means for transmitting elastic waves to said rail;
- elastic wave receiving means for receiving elastic waves transmitted from said elastic wave transmitting means through said rail; and
- information generating means for generating information that is necessary for controlling/monitoring associated elements of a control system for performing control operations on said train, based on an elastic wave reception signal received by said elastic wave receiving means,
- wherein said information generating means has detection means for detecting presence/absence of said train, based on a result of a comparison made between a level of a received elastic wave from said elastic wave receiving means and a previously set threshold value to generate train presence/absence information.

9. An information generating apparatus using elastic waves as set forth in claim 8, wherein said elastic wave transmitting means is placed at an end portion of one of two rails which are parallel with each other, and said elastic wave receiving means is placed at an end portion, which is at the same side as said elastic wave transmitting means, of the other of said two rails, a plurality of connecting members, which are superior to said train in elastic wave propagation speed characteristic, are established in such a way as to be spaced from one another and to connect between said two rails, and wherein a distance from said elastic wave transmitting means to each of said connecting members and a distance from said elastic wave receiving means to each of said connecting members are previously set.

10. An information generating apparatus using elastic waves as set forth in claim 8, wherein said elastic wave transmitting means is placed at an end side of said rail, while said elastic wave receiving means is placed at the other end side thereof.

11. An information generating apparatus using elastic waves as set forth in claim 1, wherein said detection means is established in a block section equipped with a track circuit for detecting a train, and a system of detecting a train by using a track circuit is utilized together with a system of detecting a train by using an elastic wave.

12. An information generating apparatus using elastic waves as set forth in claim 8, wherein said detection means is established in a block section equipped with a track circuit for detecting a train, and a system of detecting a train by using a track circuit is utilized together with a system of detecting a train by using an elastic wave.

* * * * *